United States Patent
Higashino

(10) Patent No.: US 12,002,489 B2
(45) Date of Patent: Jun. 4, 2024

(54) RECORDING MEDIUM, RECORDING APPARATUS, RECORDING METHOD, REPRODUCING APPARATUS, AND REPRODUCTION METHOD

(71) Applicant: Sony Group Corporation, Tokyo (JP)

(72) Inventor: Satoru Higashino, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/033,749

(22) PCT Filed: Dec. 23, 2021

(86) PCT No.: PCT/JP2021/047778
§ 371 (c)(1),
(2) Date: Apr. 25, 2023

(87) PCT Pub. No.: WO2022/158237
PCT Pub. Date: Jul. 28, 2022

(65) Prior Publication Data
US 2023/0402061 A1    Dec. 14, 2023

(30) Foreign Application Priority Data

Jan. 21, 2021  (JP) ................................ 2021-008225

(51) Int. Cl.
*G11B 20/12*  (2006.01)
*G11B 20/18*  (2006.01)

(52) U.S. Cl.
CPC .......... *G11B 20/1217* (2013.01); *G11B 20/18* (2013.01)

(58) Field of Classification Search
CPC ..... G11B 20/1217; G11B 20/18; G11B 20/10; G11B 20/12; G11B 20/14; G11B 20/1833; G11B 27/00
See application file for complete search history.

(56) References Cited

U.S. PATENT DOCUMENTS 5,537,382 A   7/1996   McLaughlin et al.
6,816,447 B1  11/2004  Lee et al.
(Continued)

FOREIGN PATENT DOCUMENTS

| JP | 2002-319242 A | 10/2002 |
| WO | WO 2017/204001 A1 | 11/2017 |
| WO | WO 2020/090457 A1 | 5/2020 |

*Primary Examiner* — Andrew Sasinowski
(74) *Attorney, Agent, or Firm* — Paratus Law Group, PLLC

(57) ABSTRACT

There is provided a recording medium, a recording apparatus, a recording method, a reproducing apparatus, and a reproduction method that make it possible to correctly reproduce multilevel codes recorded at high density. A multilevel code of at least three ML values produced by coding user data into a (d,k)-RLL code of the ML values and a particular pattern of the ML values that includes a run of repeated codes which is greater than a maximum run k of the multilevel code are recorded on a recording medium. In addition, reproduction is performed from the recording medium, and the multilevel code is decoded according to the particular pattern. For example, the present technology can be applied to a recording medium, a recording/reproducing apparatus that performs recording on and reproduction from the recording medium, and the like.

13 Claims, 37 Drawing Sheets

(56) References Cited

U.S. PATENT DOCUMENTS

| | | | | |
|---|---|---|---|---|
| 7,715,135 B1* | 5/2010 | Sutardja | ............... | G11B 5/6005 360/75 |
| 8,879,182 B2* | 11/2014 | Haratsch | ............ | G11B 20/1423 360/48 |
| 2011/0075289 A1* | 3/2011 | Ozdemir | .......... | G11B 20/10398 360/48 |
| 2016/0027468 A1* | 1/2016 | Kikugawa | .......... | G11B 20/1833 369/59.23 |
| 2019/0385094 A1* | 12/2019 | Alex | ...................... | G06N 20/20 |

\* cited by examiner

FIG. 8

| BINARY DATA (DECIMAL) | MULTILEVEL EDGE CODES (4CELL) |
|---|---|
| 0 | 1111 |
| 1 | 2111 |
| 2 | 3111 |
| 3 | 1211 |
| 4 | 2211 |
| 5 | 4211 |
| 6 | 1311 |
| 7 | 3311 |
| 8 | 4311 |
| 9 | 2411 |
| 10 | 3411 |
| 11 | 4411 |
| 12 | 1121 |
| 13 | 2121 |
| 14 | 3121 |
| 15 | 1221 |
| 16 | 2221 |
| 17 | 4221 |
| 18 | 1321 |
| 19 | 3321 |
| 20 | 4321 |
| 21 | 2421 |
| 22 | 3421 |
| 23 | 4421 |
| 24 | 1131 |
| 25 | 2131 |
| 26 | 3131 |
| 27 | 1231 |
| 28 | 2231 |
| 29 | 4231 |
| 30 | 1331 |

| 31 | 3231 |
|---|---|
| 32 | 4231 |
| 33 | 2431 |
| 34 | 3431 |
| 35 | 4431 |
| 36 | 1112 |
| 37 | 2112 |
| 38 | 3112 |
| 39 | 1212 |
| 40 | 2212 |
| 41 | 4212 |
| 42 | 1312 |
| 43 | 3312 |
| 44 | 4312 |
| 45 | 2412 |
| 46 | 3412 |
| 47 | 4412 |
| 48 | 1122 |
| 49 | 2122 |
| 50 | 3122 |
| 51 | 1222 |
| 52 | 2222 |
| 53 | 4222 |
| 54 | 1322 |
| 55 | 3322 |
| 56 | 4322 |
| 57 | 2422 |
| 58 | 3422 |
| 59 | 4422 |
| 60 | 1142 |

| 61 | 2142 |
|---|---|
| 62 | 3142 |
| 63 | 1242 |
| 64 | 2242 |
| 65 | 4242 |
| 66 | 1342 |
| 67 | 3342 |
| 68 | 4342 |
| 69 | 2442 |
| 70 | 3442 |
| 71 | 4442 |
| 72 | 1113 |
| 73 | 2113 |
| 74 | 3113 |
| 75 | 1213 |
| 76 | 2213 |
| 77 | 4213 |
| 78 | 1313 |
| 79 | 3313 |
| 80 | 4313 |
| 81 | 2413 |
| 82 | 3413 |
| 83 | 4413 |
| 84 | 1123 |
| 85 | 2133 |
| 86 | 3133 |
| 87 | 1233 |
| 88 | 2233 |
| 89 | 4233 |
| 90 | 1333 |

| + | 3 | 4 | 4 | 4 | 4 | 4 | 4 | 4 | 4 | 3 | 1 | 0 | 0 | 0 | 0 | 0 | 0 | 0 | 1 |
|---|---|---|---|---|---|---|---|---|---|---|---|---|---|---|---|---|---|---|---|
| − | 1 | 0 | 0 | 0 | 0 | 0 | 0 | 0 | 0 | 1 | 3 | 4 | 4 | 4 | 4 | 4 | 4 | 4 | 3 |

FIG.19

A  G-100CELL

| 2 | 3 | 4 | 1 | 3 | 3 | 0 | 2 | 4 | 4 | 4 | 2 | 2 | 2 | 4 | 3 | 4 | 1 | 1 | 3 | 0 | 0 | 3 | 0 | 0 | 4 | 3 |
| 1 | 3 | 4 | 4 | 0 | 3 | 1 | 4 | 4 | 4 | 2 | 4 | 3 | 0 | 0 | 4 | 1 | 0 | 2 | 4 | 2 | 3 | 3 | 0 | 3 | 1 | 3 |
| 3 | 0 | 3 | 3 | 2 | 1 | 2 | 2 | 2 | 2 | 3 | 0 | 1 | 0 | 0 | 3 | 3 | 3 | 2 | 4 | 2 | 4 | 4 | 2 | 4 | 4 | 3 |
| 0 | 2 | 1 | 2 | 3 | 0 | 2 | 2 | 4 | 0 | 3 | 4 | 1 | 0 | 0 | 1 | 3 | 0 | 2 | 4 | 0 | 4 | 4 | 0 | 3 | 3 | 2 |
| 1 | 1 | 1 | 2 | 1 | 1 | 2 | 3 | 1 | 1 | 0 | 3 | 1 | 0 | 0 | 1 | 0 | 3 | 0 | 0 | 0 | 0 | 1 | 0 | 3 | 2 | 2 |
| 0 | 0 | 2 | 2 | 1 | 2 | 2 | 1 | 3 | 0 | 1 | 2 | 3 | 1 | 1 | 3 | 0 | 0 | 2 | 2 | 0 | 0 | 1 | 0 | 2 | 2 | 2 |

B  L-100CELL

| 3 | 4 | 4 | 0 | 0 | 3 | 3 | 4 | 0 | 0 | 2 | 2 | 2 | 3 | 4 | 2 | 2 | 3 | 0 | 0 | 1 | 2 | 2 | 0 | 0 | 0 | 2 |
| 3 | 4 | 4 | 1 | 0 | 3 | 4 | 4 | 0 | 4 | 1 | 1 | 2 | 3 | 3 | 0 | 3 | 1 | 3 | 1 | 2 | 3 | 3 | 3 | 0 | 3 | 0 |
| 1 | 4 | 3 | 2 | 2 | 2 | 1 | 2 | 1 | 3 | 0 | 2 | 2 | 0 | 2 | 2 | 0 | 3 | 0 | 3 | 4 | 3 | 3 | 0 | 3 | 3 | 0 |
| 4 | 3 | 2 | 2 | 3 | 4 | 4 | 2 | 0 | 3 | 3 | 2 | 4 | 3 | 2 | 0 | 2 | 0 | 2 | 3 | 2 | 2 | 0 | 3 | 1 | 3 | 0 |
| 3 | 2 | 4 | 3 | 0 | 1 | 4 | 4 | 4 | 0 | 2 | 4 | 2 | 2 | 2 | 1 | 1 | 3 | 3 | 0 | 3 | 4 | 3 | 0 | 0 | 0 | 0 |
| 0 | 4 | 3 | 1 | 0 | 3 | 0 | 0 | 0 | 0 | 4 | 4 | 0 | 1 | 0 | 0 | 3 | 1 | 1 | 4 | 2 | 2 | 0 | 1 | 3 | 3 | 4 |

(Note: numerical contents transcribed from rotated figure; exact values may vary.)

| ADDR | 20 | 21 | 25 | 29 | ... | 257 | 261 | 262 | ... | 498 | 502 | 503 | ... | ... | ... |
|---|---|---|---|---|---|---|---|---|---|---|---|---|---|---|---|
| LVL0 | DCC1 | 0 1340 | 1431 | 1234 | ... | 2220 | DCC2 0 3043 | 0 3041 | ... | 1243 | DCC3 0 4404 | 0 4404 | ... | ... | ... |
| DSV | | -4 | | | | -76 | -8 | | | -40 | -14 | | | | |
| LVL1 | | 1 2431 | 2042 | 2310 | ... | 2321 | 1 4102 | 1 4102 | ... | 2304 | 1 0010 | 1 0010 | ... | ... | ... |
| DSV | | -2 | | | | -4 | -6 | | | -38 | -12 | | | | |
| LVL2 | | 2 3012 | 3103 | 3421 | ... | 4442 | 2 0213 | 2 0213 | ... | 3410 | 2 1121 | 2 1121 | ... | ... | ... |
| DSV | | 0 | | | | 58 | -4 | | | 84 | -10 | | | | |
| LVL3 | | 3 4123 | 4214 | 4032 | ... | 0303 | 3 1324 | 3 1324 | ... | 4021 | 3 2232 | 3 2232 | ... | ... | ... |
| DSV | | 2 | | | | 30 | -2 | | | -24 | 8 | | | | |
| LVL4 | | 4 0234 | 0320 | 0143 | ... | 1114 | 4 2430 | 4 2430 | ... | 0132 | 4 3343 | 4 3343 | ... | ... | ... |
| DSV | | 4 | | | | -8 | 0 | | | -32 | 6 | | | | |

RECORDING MEDIUM, RECORDING APPARATUS, RECORDING METHOD, REPRODUCING APPARATUS, AND REPRODUCTION METHOD

CROSS REFERENCE TO PRIOR APPLICATION

This application is a National Stage Patent Application of PCT International Patent Application No. PCT/JP2021/047778 (filed on Dec. 23, 2021) under 35 U.S.C. § 371, which claims priority to Japanese Patent Application No. 2021-008225 (filed on Jan. 21, 2021), which are all hereby incorporated by reference in their entirety.

TECHNICAL FIELD

The present technology relates to a recording medium, a recording apparatus, a recording method, a reproducing apparatus, and a reproduction method, and in particular, relates to a recording medium, a recording apparatus, a recording method, a reproducing apparatus, and a reproduction method that make it possible to correctly reproduce multilevel codes recorded at high density, for example.

BACKGROUND ART

The present applicant proposed, in the past, recording and reproduction of multilevel codes of ML values that can assume any one of at least three ML values, the multilevel codes being suited for high-density recording (see PTL 1, for example).

CITATION LIST

Patent Literature

[PTL 1]
PCT Patent Publication No. WO 2020/090457

SUMMARY

Technical Problem

PTL 1 does not discloses a specific method of correctly reproducing multilevel codes recorded at high density.

The present technology has been made in view of such a situation, and aims to make it possible to correctly reproduce multilevel codes recorded at high density.

Solution to Problem

A recording medium according to the present technology is a recording medium having recorded thereon a multilevel code of at least three ML values produced by coding user data into a (d,k)-RLL code of the ML values, and a particular pattern of the ML values that includes a run of repeated codes which is greater than a maximum run k of the multilevel code.

The recording medium according to the present technology has recorded thereon a multilevel code of at least three ML values produced by coding user data into a (d,k)-RLL code of the ML values, and a particular pattern of the ML values that includes a run of repeated codes which is greater than a maximum run k of the multilevel code.

A recording apparatus according to the present technology is a recording apparatus including a coding section that codes user data into a multilevel code which is a (d,k)-RLL code of at least three ML values, and a recording section that records, on a recording medium, the multilevel code and a particular pattern of the ML values that includes a run of repeated codes which is greater than a maximum run k of the multilevel code.

A recording method according to the present technology is a recording method including coding user data into a multilevel code which is a (d,k)-RLL code of at least three ML values, and recording, on a recording medium, the multilevel code and a particular pattern of the ML values that includes a run of repeated codes which is greater than a maximum run k of the multilevel code.

In the recording apparatus and the recording method according to the present technology, user data is coded into a multilevel code which is a (d,k)-RLL code of at least three ML values, and the multilevel code and a particular pattern of the ML values that includes a run of repeated codes which is greater than a maximum run k of the multilevel code are recorded on a recording medium.

A reproducing apparatus according to the present technology is a reproducing apparatus including a reproducing section that performs reproduction from a recording medium having recorded thereon a multilevel code of at least three ML values produced by coding user data into a (d,k)-RLL code of the ML values, and a particular pattern of the ML values that includes a run of repeated codes which is greater than a maximum run k of the multilevel code, and a decoding section that decodes the multilevel code according to the particular pattern.

A reproduction method according to the present technology is a reproduction method including performing reproduction from a recording medium having recorded thereon a multilevel code of at least three ML values produced by coding user data into a (d,k)-RLL code of the ML values, and a particular pattern of the ML values that includes a run of repeated codes which is greater than a maximum run k of the multilevel code, and decoding the multilevel code according to the particular pattern.

In the reproducing apparatus and the reproduction method according to the present technology, reproduction is performed from a recording medium having recorded thereon a multilevel code of at least three ML values produced by coding user data into a (d,k)-RLL code of the ML values, and a particular pattern of the ML values that includes a run of repeated codes which is greater than a maximum run k of the multilevel code, and the multilevel code is decoded according to the particular pattern.

The recording apparatus and the reproducing apparatus may be discrete apparatuses, or may be internal blocks included in one apparatus.

In addition, the recording apparatus and the reproducing apparatus can be realized by causing a computer to execute a program. The program can be distributed by being recorded on a recording medium or by being transferred via a transfer medium.

BRIEF DESCRIPTION OF DRAWINGS

FIG. 8 is a figure depicting an example of a code LUT in which 512 block codes as k=4/ML=5 9-bit/4-cell codes are registered.

Figure 9:
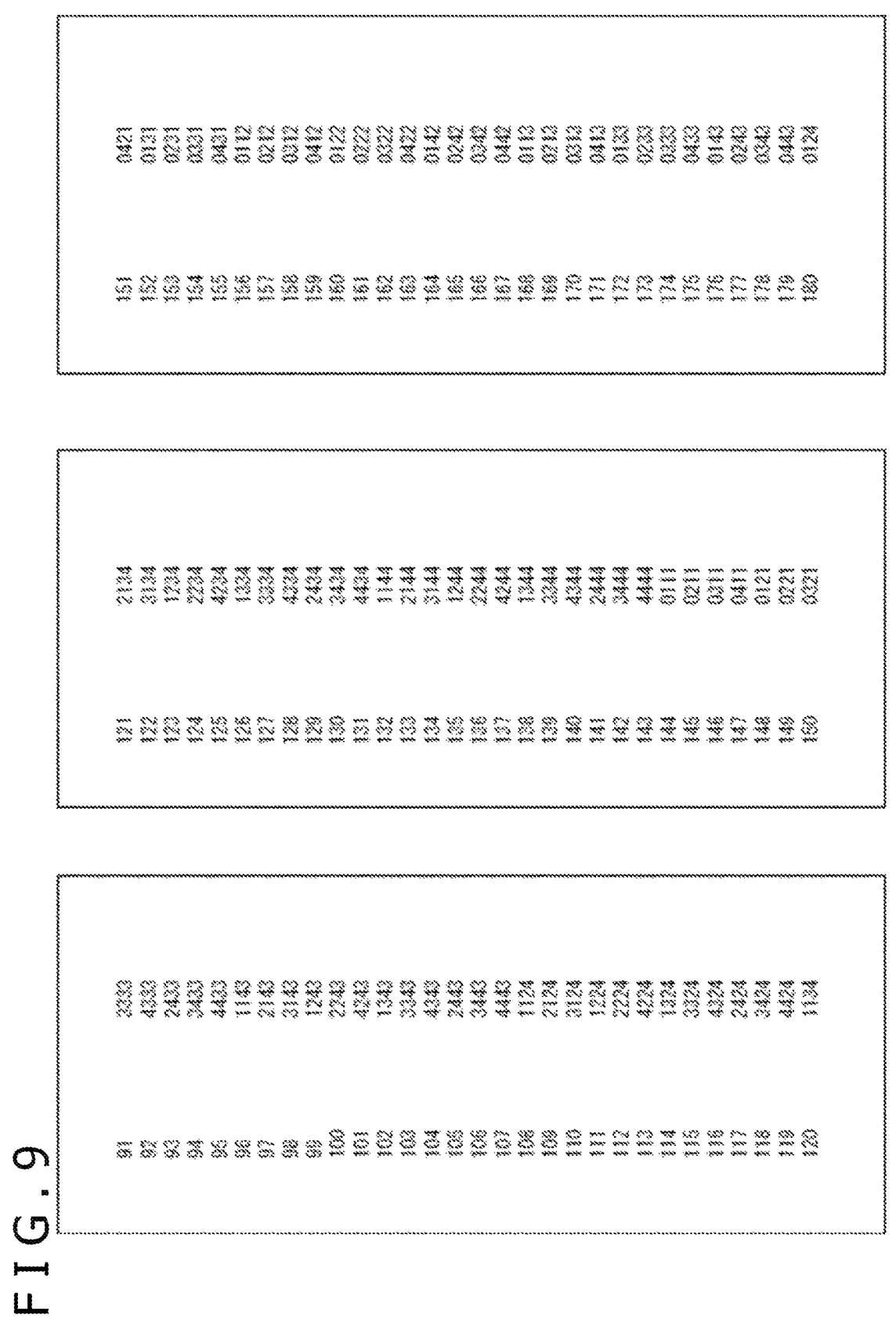

FIG. 9 is a figure depicting the example of the code LUT in which 512 block codes as k=4/ML=5 9-bit/4-cell codes are registered.

Figure 11:
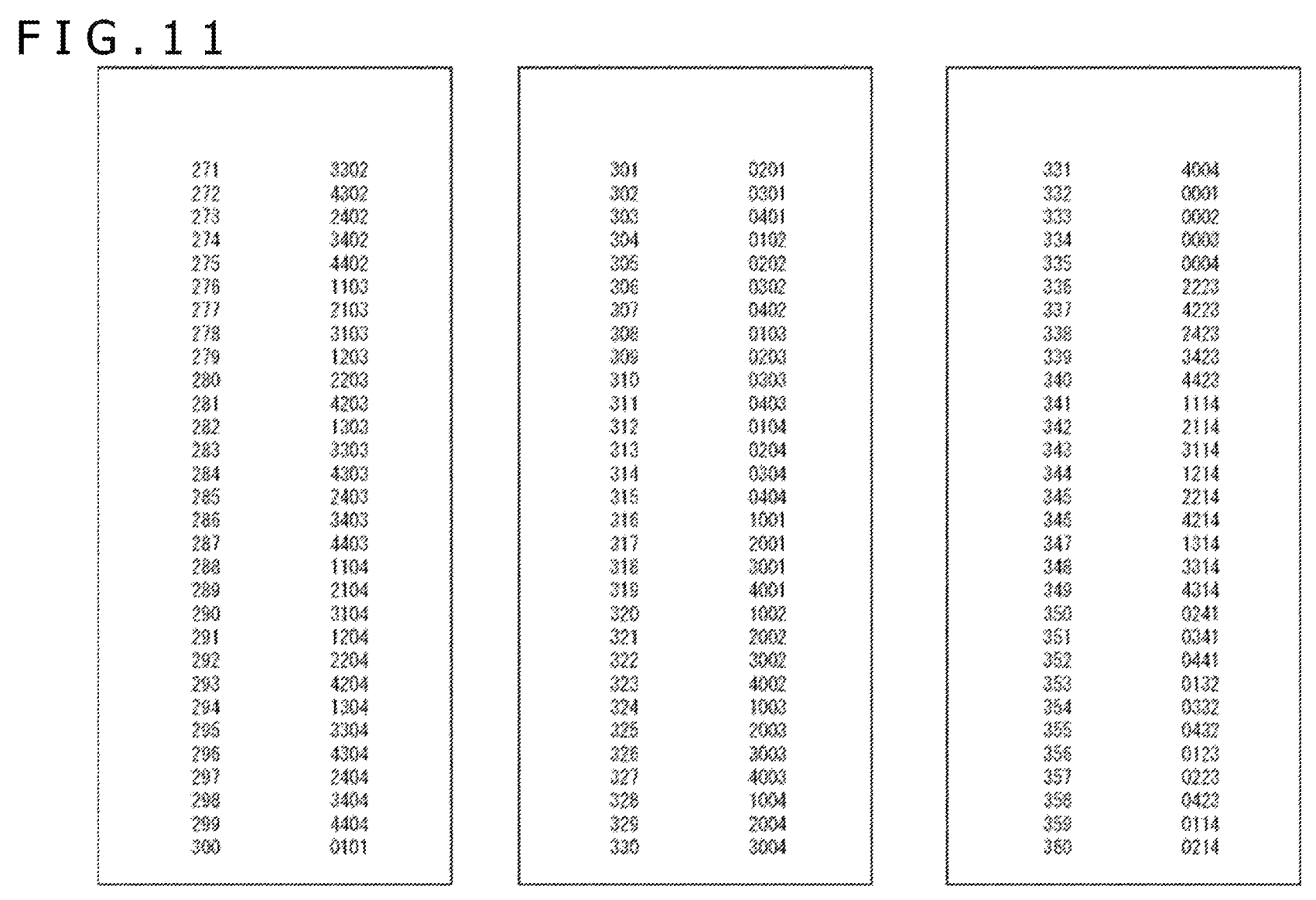

FIG. 11 is a figure depicting the example of the code LUT in which 512 block codes as k=4/ML=5 9-bit/4-cell codes are registered.

FIG. 16 is a figure depicting an example of an FS.

FIG. 18 is a figure depicting configuration examples of a Run-in.

FIG. 19 is a figure depicting configuration examples of G-100CELLs included in a GAptn and a GBptn as well as L-100CELLs included in an LAptn and an LBptn.

FIG. 20 is a figure depicting configuration examples of SY0's.

FIG. 21 is a figure depicting configuration examples of NC0's.

FIG. 22 is a figure depicting configuration examples of 4-cell patterns and 2-2 cell patterns.

FIG. 26 is a figure depicting specific examples of frame configuration and DC control performed by the frame configuring section 13.

DESCRIPTION OF EMBODIMENT

<Embodiment of Recording/Reproducing Apparatus to which Present Technology is Applied>

Figure 1:
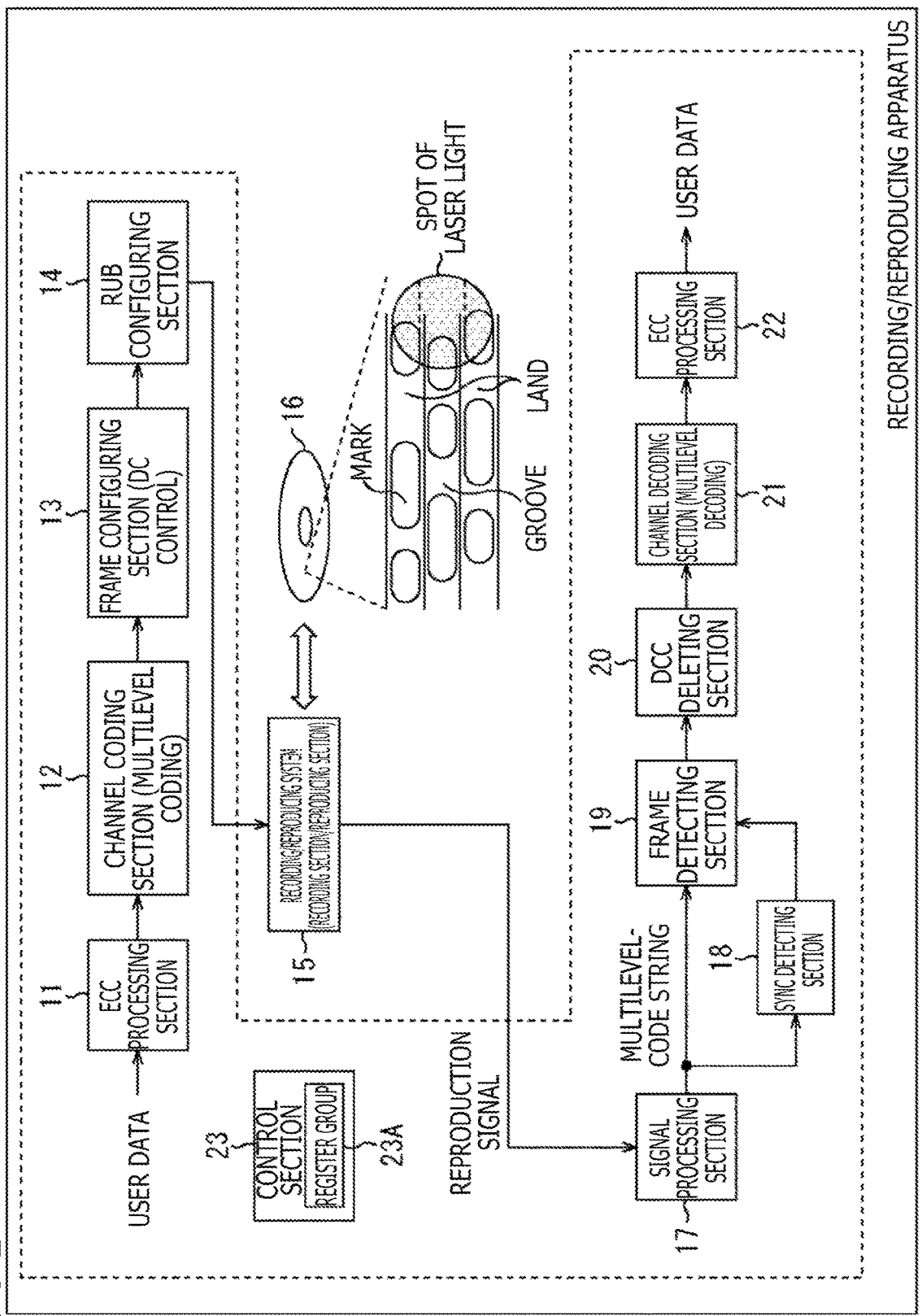
FIG. 1 is a block diagram depicting a configuration example of an embodiment of a recording/reproducing apparatus to which the present technology is applied.

FIG. 1 is a block diagram depicting a configuration example of an embodiment of a recording/reproducing apparatus to which the present technology is applied.

In FIG. 1, the recording/reproducing apparatus has an ECC (Error Correction Coding) processing section 11, a channel coding section 12, a frame configuring section 13, an RUB (Recording Unit Block) configuring section 14, a recording/reproducing system 15, an optical disc 16, a signal processing section 17, a sync detecting section 18, a frame detecting section 19, a DCC deleting section 20, a channel decoding section 21, an ECC processing section 22, and a control section 23.

The ECC processing section 11 is supplied with subject user data to be recorded on the optical disc 16 (image, sound, or other content, a computer program, or various other types of data).

The ECC processing section 11 configures ECC subject data including a predetermined unit of user data. The ECC subject data is subject data of an ECC process. The ECC processing section 11 configures an ECC cluster which is a binary-data string by performing the ECC process of adding parity on the ECC subject data. The ECC processing section 11 supplies the ECC cluster to the channel coding section 12.

The channel coding section 12 codes the ECC cluster from the ECC processing section 11 into a predetermined channel code.

Here, for example, a multilevel code of at least three ML values can be adopted as the channel code. For example, a multilevel code generated according to state transitions as determined by a code generation model described later can be adopted as an ML-value multilevel code.

By the coding by the channel coding section 12, the ECC cluster is coded into an ML-value multilevel code. Hereinafter, (a string of) multilevel codes produced by coding the ECC cluster are also each referred to as a cluster multilevel code. The cluster multilevel code is supplied from the channel coding section 12 to the frame configuring section 13.

The frame configuring section 13 configures frames including the cluster multilevel-code string supplied from the channel coding section 12, and supplies the frames to the RUB configuring section 14.

That is, the frame configuring section 13 divides the cluster multilevel-code string supplied from the channel coding section 12 into DC control units which are units on which DC (Direct Current) control is performed, and performs DC control on each of (strings of) DC-control-unit cluster multilevel codes.

Further, the frame configuring section 13 configures a frame by adding an FS (Frame Sync) representing the beginning (or end) of the frame to a plurality of DC-control-unit cluster multilevel codes that have been subjected to DC control.

DC control is performed by adding DCC (Direct Current Control) cells to the DC-control-unit cluster multilevel codes. Each DCC cell is one multilevel value that assumes a ML value similar to multilevel codes which are channel codes, and can be regarded as one multilevel code.

The frame configuring section 13 is also a DC control section that performs DC control, since it performs DC control, in addition to configuration of frames as described above.

The RUB configuring section 14 configures an RUB as a recording block which serves as a unit of recording on the optical disc 16, by adding a Run-in and a Run-out to the beginning and the end, respectively, of a plurality of frames supplied from the frame configuring section 13, and supplies the RUB to the recording/reproducing system 15.

The Run-in and the Run-out have patterns of multilevel values that assume ML values similar to multilevel codes which are channel codes, and can be regarded as multilevel-code strings. The Run-in and the Run-out represent the start and the end of the RUB, respectively.

When the RUB is configured, APC (Automatic Power Control) SYNCs can be added to frames for which the APC SYNCs are necessary in the plurality of frames included in the RUB.

Each APC SYNC has a pattern of multilevel values that assume ML values similar to multilevel codes which are channel codes, and can be regarded as a multilevel-code string. The APC SYNCs have patterns for timing recovery of a channel clock of the recording/reproducing apparatus or for power control.

The recording/reproducing system 15 includes a pickup and the like which are not depicted. The recording/reproducing system 15 functions as a recording section that records data (multilevel codes) on the optical disc 16 by irradiating the optical disc 16 with light such as laser light to form marks. In addition, the recording/reproducing system 15 functions as a reproducing section that reproduces data recorded on the optical disc 16, by irradiating the optical disc 16 with laser light, receiving reflected light of the laser light from the optical disc 16, and outputting reproduction signals according to the reflected light.

The recording/reproducing system 15 irradiates the optical disc 16 with laser light according to an RUB from the RUB configuring section 14, and records the RUB on the optical disc 16. In addition, the recording/reproducing system 15 reproduces reproduction signals (RF (Radio Frequency) signals) corresponding to a RUB or the like recorded on the optical disc 16, by irradiating the optical disc 16 with laser light, and supplies the reproduction signals to the signal processing section 17.

The optical disc 16 is one type of disc-shaped recording medium, and lands (tracks) and grooves (tracks) are formed adjacent to each other as tracks on the optical disc 16.

Grooves are tracks formed as grooves, and wobble for addressing, for example. Lands are tracks sandwiched by two (adjacent) grooves.

For high-linear-density recording of data, data is recorded (marks are formed) in both lands and groups on the optical disc 16.

In addition to this, a disc-shaped recording medium or the like on which grooves for recording data are not formed (only grooves for applying a servo are formed) and on which what is generally called groove-less mirror surface recording is performed can be adopted as the optical disc 16, for example.

The signal processing section 17 restores multilevel-code strings by performing signal processing on reproduction signals supplied from the recording/reproducing system 15, and supplies the multilevel-code strings to the sync detecting section 18 and the frame detecting section 19. Multilevel-code strings restored by the signal processing section 17 include a multilevel code produced by coding an ECC cluster including user data, (multilevel values as) a Run-in and a Run-out, (multilevel values as) FSs, and (multilevel values as) APC SYNCs.

Here, multilevel codes as channel codes are ML-value (d,k)-RLL codes. All of the Run-in, the FSs, and the APC SYNCs are particular patterns of ML values that include runs of repeated codes which are greater than the maximum run (run) k of multilevel codes as channel codes.

The sync detecting section 18 detects the Run-in, the FSs, and the APC SYNCs as particular patterns from the multilevel-code strings supplied from the signal processing section 17, and supplies the Run-in, the FSs, and the APC SYNCs to the frame detecting section 19 and other blocks for which the Run-in, the FSs, and the APC SYNCs are necessary.

The frame detecting section 19 detects a frame from multilevel-code strings supplied from the signal processing section 17, according to (for example, an FS) in the particular patterns supplied from the sync detecting section 18, and supplies the frame to the DCC deleting section 20.

The DCC deleting section 20 deletes DCC cells from the frame supplied from the frame detecting section 19, and supplies the channel decoding section 21 with a multilevel code (cluster multilevel code) produced by coding an ECC cluster obtained as a result of the deletion.

The channel decoding section 21 decodes (channel-decodes) the cluster multilevel code supplied from the DCC deleting section 20, and supplies the ECC processing section 22 with an ECC cluster obtained by the decoding.

Since the channel decoding section 21 decodes the cluster multilevel code included in the frame detected according to the particular pattern as described above, the channel decoding section 21 can decode the cluster multilevel code according to the particular pattern.

The ECC processing section 22 corrects errors having occurred to ECC subject data included in the ECC cluster supplied from the channel decoding section 21, by performing an ECC process on the ECC cluster, and outputs user data included in the ECC subject data that has been subjected to the error correction.

The control section 23 controls each block included in the recording/reproducing apparatus. That is, the control section 23 has a built-in register group 23A. For example, commands and various other types of information are stored (set) on the register group 23A according to operation on an operation section which is not depicted or the like. The control section 23 controls each block included in the recording/reproducing apparatus, according to stored values (setting values) in the register group 23A.

Note that, in FIG. 1, in addition to being configured as an apparatus that performs both reproduction and recording, the recording/reproducing apparatus can be configured as a reproduction-only apparatus that performs only reproduction or a recording-only apparatus that performs only recording.

In addition, in FIG. 1, the recording/reproducing apparatus can also be configured in a form that it has the optical disc 16 built in in advance or can also be configured in a form that the optical disc 16 is attachable and detachable.

Further, the ECC processing section 11 to the RUB configuring section 14 and the signal processing section 17 to the control section 23 included in the recording/reproducing apparatus in FIG. 1 can be configured with one chip.

Moreover, in addition to a disc-shaped recording medium such as the optical disc 16, a tape-shaped or card-shaped recording medium or a recording medium, such as a memory card, using a semiconductor can be adopted as a recording medium on which multilevel codes are recorded.

<Recording Process>

Figure 2:
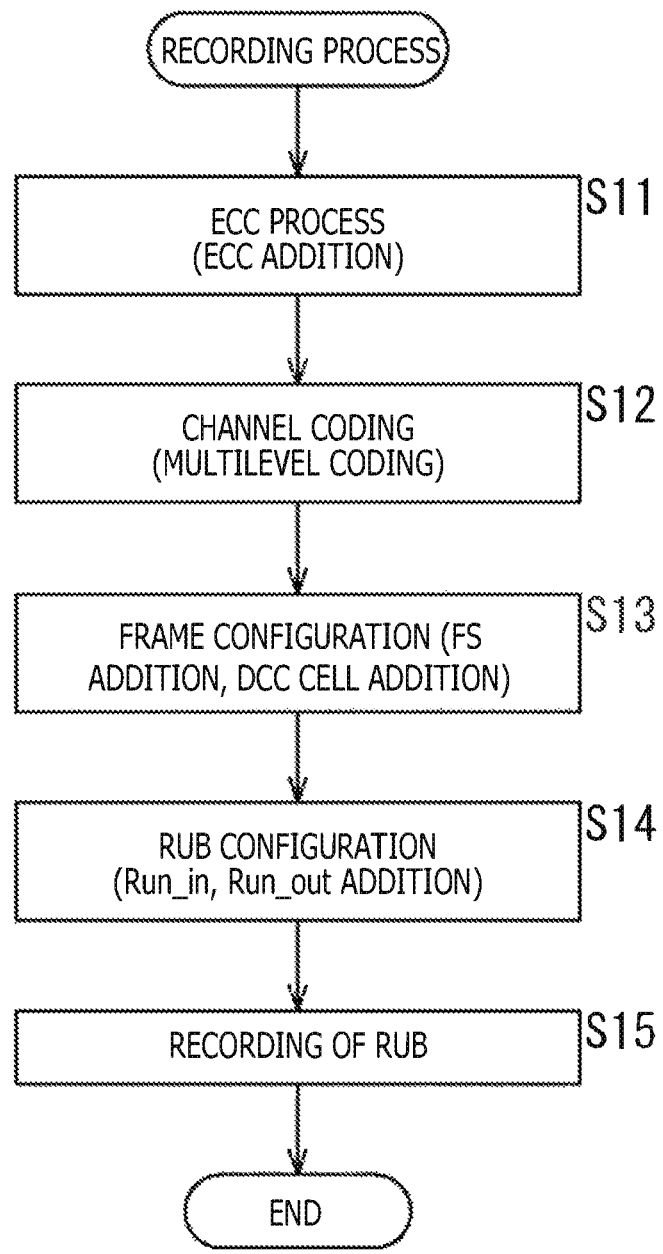
FIG. 2 is a flowchart for explaining an example of a recording process in which the recording/reproducing apparatus records user data on an optical disc 16.

FIG. 2 is a flowchart for explaining an example of a recording process in which the recording/reproducing apparatus depicted in FIG. 1 records user data on the optical disc 16.

In Step S11, the ECC processing section 11 configures ECC subject data including a predetermined unit of user data from user data supplied to the ECC processing section 11. Further, the ECC processing section 11 configures an ECC cluster including the ECC subject data to which parity is added by performing an ECC process on the ECC subject data, and supplies the ECC cluster to the channel coding section 12. Then, from Step S11, the process proceeds to Step S12.

In Step S12, the channel coding section 12 codes the ECC cluster supplied from the ECC processing section 11, into a ML-value multilevel code (cluster multilevel code), and supplies the ML-value multilevel code to the frame configuring section 13. The process then proceeds to Step S13.

In Step S13, the frame configuring section 13 configures frames including the cluster multilevel-code string supplied from the channel coding section 12, and supplies the frames to the RUB configuring section 14. The process then proceeds to Step S14.

The frame configuring section 13 performs DC control by dividing the cluster multilevel-code string supplied from the channel coding section 12, into DC control units, and adding DCC cells to (strings of) DC-control-unit cluster multilevel codes.

Then, the frame configuring section 13 configures frames by adding FSs to a plurality of the DC-control-unit cluster multilevel codes that has been subjected to DC control.

In Step S14, the RUB configuring section 14 receives the frames from the frame configuring section 13, and adds APC SYNCs to frames for which the APC SYNCs are necessary. Further, the RUB configuring section 14 configures an RUB by gathering a plurality of necessary frames and adding a Run-in and a Run-out to the set of the frames. The RUB configuring section 14 supplies the RUB to the recording/reproducing system 15. Then, from Step S14, the process proceeds to Step S15.

In Step S15, the recording/reproducing system 15 records the RUB supplied from the RUB configuring section 14 on the optical disc 16, by irradiating the optical disc 16 with laser light according to the RUB.

Similar processes are performed thereafter, and user data is thereby recorded on the optical disc 16 in the unit of RUBs. That is, recording on the optical disc 16 is performed in the recording unit of RUBs.

<Reproduction Process>

Figure 3:
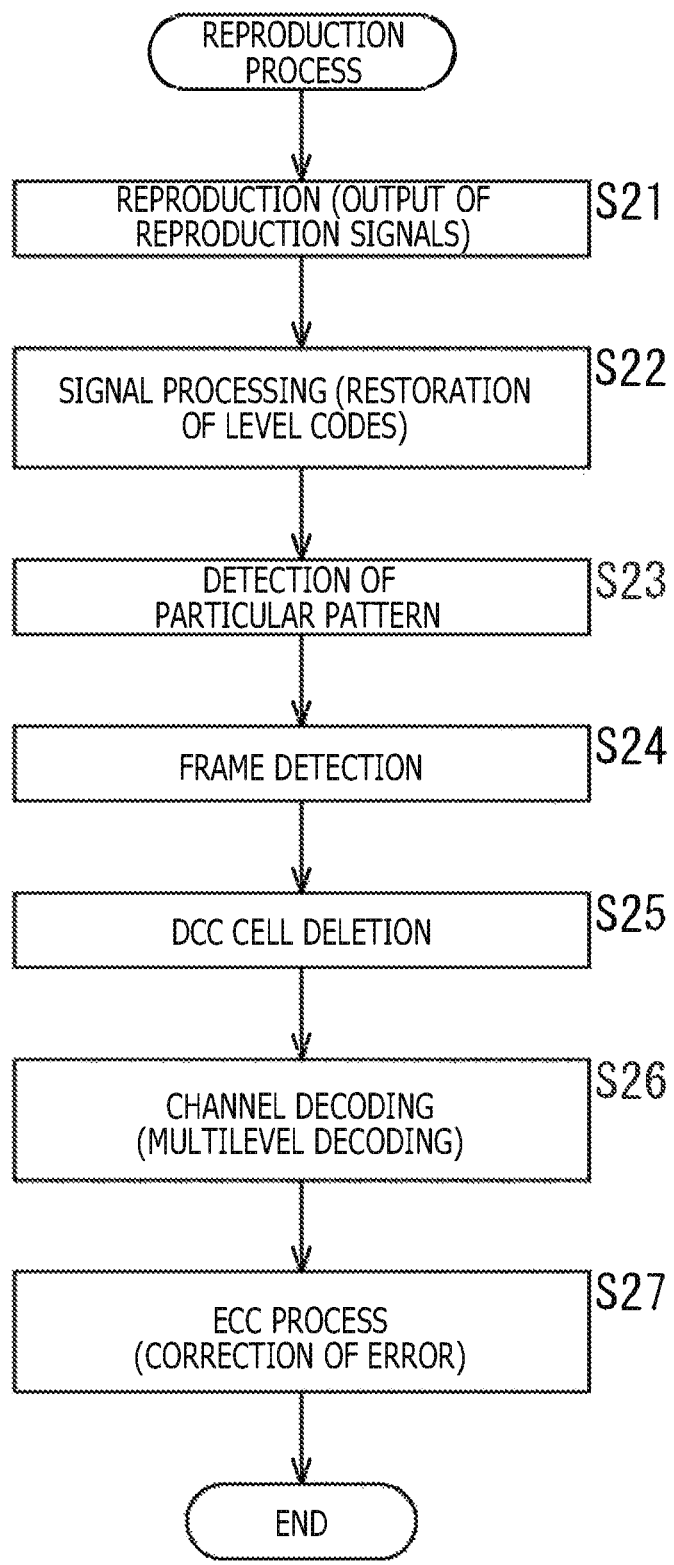
FIG. 3 is a flowchart for explaining an example of a reproduction process in which the recording/reproducing apparatus reproduces user data recorded on the optical disc 16.

FIG. 3 is a flowchart for explaining an example of a reproduction process in which the recording/reproducing apparatus depicted in FIG. 1 reproduces user data recorded on the optical disc 16.

In Step S21, the recording/reproducing system 15 reproduces a reproduction signal corresponding to an RUB recorded on the optical disc 16, by irradiating the optical disc 16 with laser light, and supplies the reproduction signal to the signal processing section 17. The process then proceeds to Step S22.

In Step S22, the signal processing section 17 performs signal processing on the reproduction signal from the recording/reproducing system 15.

In the signal processing on the reproduction signal, equalization of the reproduction signal, restoration of multilevel-code strings as the RUB, and the like are performed.

Multilevel-code strings obtained by the signal processing on the reproduction signal are supplied from the signal processing section 17 to the sync detecting section 18 and the frame detecting section 19. Then, from Step S22, the process proceeds to Step S23.

In Step S23, the sync detecting section 18 detects a Run-in, FSs, and APC SYNCs as particular patterns from the multilevel-code strings from the signal processing section 17, and supplies the Run-in, the FSs, and the APC SYNCs to the frame detecting section 19. The process then proceeds to Step S24.

In Step S24, the frame detecting section 19 detects frames from the multilevel-code strings supplied from the signal processing section 17, according to the particular patterns from the sync detecting section 18, and supplies the frames to the DCC deleting section 20. The process then proceeds to Step S25.

In Step S25, the DCC deleting section 20 deletes DCC cells from the frames supplied from the frame detecting section 19. The DCC deleting section 20 supplies the channel decoding section 21 with cluster multilevel codes obtained by deleting the DCC cells from the frames. Then, from Step S25, the process proceeds to Step S26.

In Step S26, the channel decoding section 21 decodes (channel-decodes) the cluster multilevel codes supplied from the DCC deleting section 20, into an ECC cluster which is a binary-data string, and supplies the ECC cluster to the ECC processing section 22. The process then proceeds to Step S27.

In Step S27, the ECC processing section 22 performs an ECC process on ECC subject data included in the ECC cluster supplied from the channel decoding section 21. The ECC processing section 22 outputs user data included in the ECC subject data that has been subjected to the ECC process.

By similar processes thereafter, user data is reproduced from the optical disc 16 in the unit of RUBs.

<Configuration Example of Channel Coding Section 12>

Figure 4:
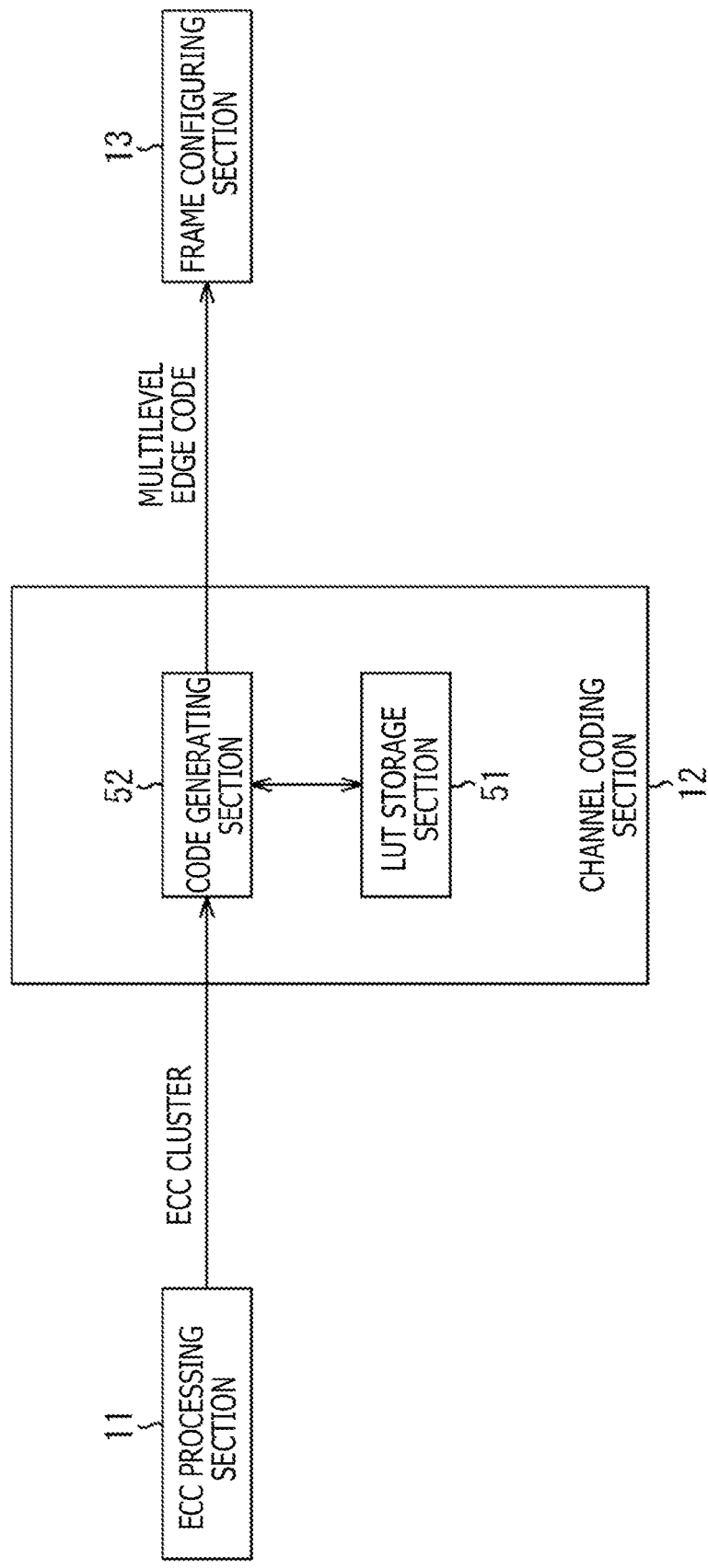
FIG. 4 is a block diagram depicting a configuration example of a channel coding section 12.

FIG. 4 is a block diagram depicting a configuration example of the channel coding section 12 depicted in FIG. 1.

In FIG. 4, the channel coding section 12 has an LUT (Look Up Table) storage section 51 and a code generating section 52.

The LUT storage section 51 has stored therein a code LUT in which block codes including multilevel-edge-code strings generated by a code generation model described later and binary data which is the subject of coding into those multilevel edge codes are registered in association with each other.

The code generating section 52 is supplied with a binary-data ECC cluster from the ECC processing section 11. The code generating section 52 refers to the code LUT stored in the LUT storage section 51, and codes the ECC cluster supplied from the frame configuring section 13.

That is, the code generating section 52 codes the binary-data ECC cluster by converting the ECC cluster in the unit of predetermined numbers of bits into block codes including multilevel-edge-code strings associated with the predetermined numbers of bits of binary data on the code LUT.

Then, the code generating section 52 supplies the frame configuring section 13 with the block codes obtained by the coding, that is, multilevel-edge-code strings.

<Configuration Example of Signal Processing Section 17>

Figure 5:
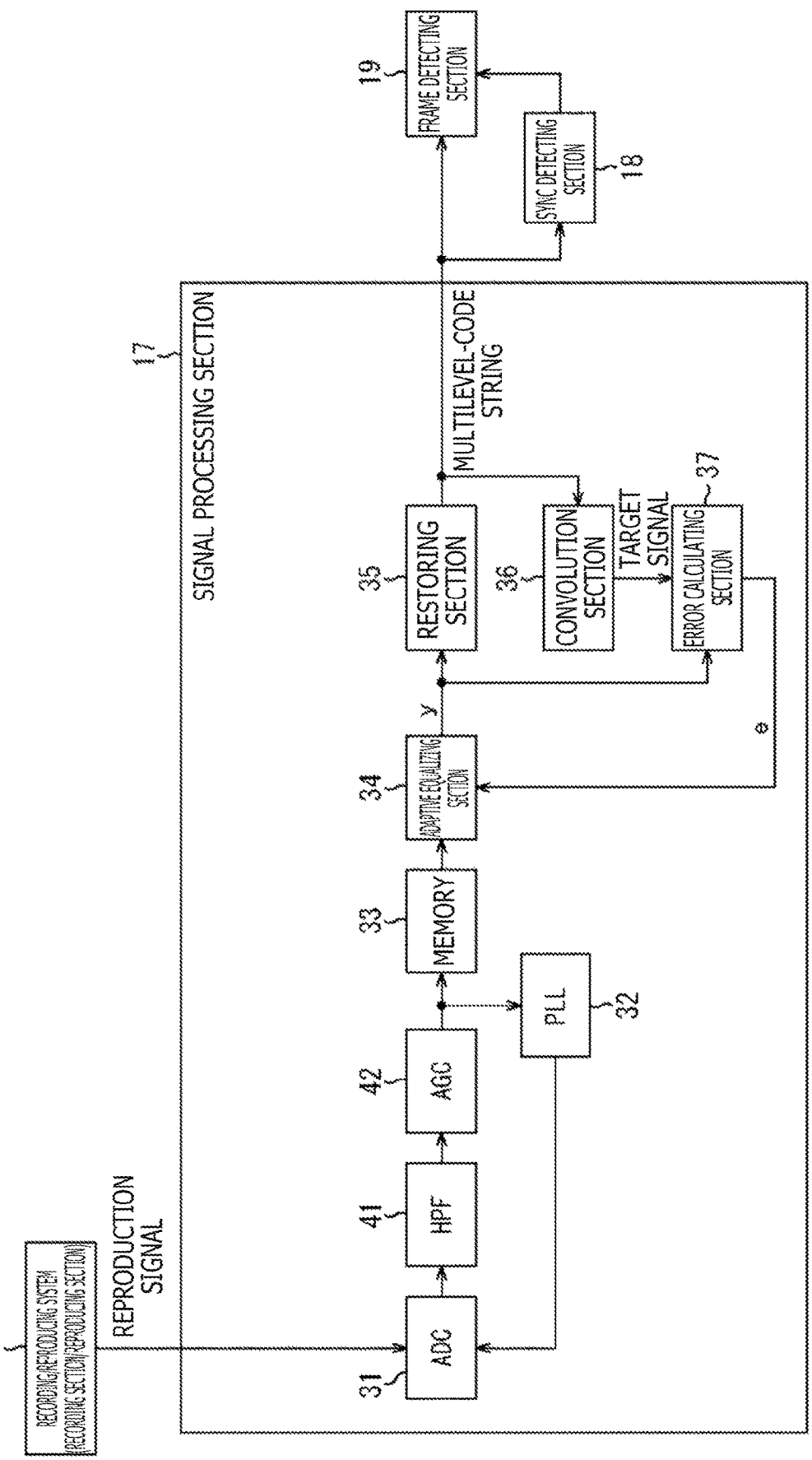
FIG. 5 is a block diagram depicting a configuration example of a signal processing section 17.

FIG. 5 is a block diagram depicting a configuration example of the signal processing section 17 depicted in FIG. 1.

In FIG. 5, the signal processing section 17 has an ADC (Analog to Digital Converter) 31, a PLL (Phase Locked Loop) 32, a memory 33, an adaptive equalizing section 34, a restoring section 35, a convolution section 36, an error calculating section 37, an HPF (High Pass Filter) 41, and an AGC (Auto Gain Controller) 42.

The ADC 31 is supplied with a reproduction signal from the recording/reproducing system 15. The ADC 31 performs AD conversion of the analog reproduction signal supplied from the recording/reproducing system 15 in synchronization with a channel clock supplied from the PLL 32, and outputs a digital reproduction signal obtained as a result of the conversion. The reproduction signal output by the ADC 31 is supplied to the PLL 32 and the memory 33 via the HPF 41 and the AGC 42.

The PLL 32 generates, as a channel clock, a clock synchronized with the reproduction signal supplied from the ADC 31 via the HPF 41 and the AGC 42, and supplies the channel clock to the ADC 31 and other blocks that are included in the recording/reproducing apparatus and for which the channel clock is necessary.

The memory 33 temporarily stores thereon the reproduction signal supplied from the ADC 31 via the HPF 41 and the AGC 42.

The adaptive equalizing section 34 adaptively equalizes the reproduction signal stored on the memory 33, and supplies the restoring section 35 and the error calculating section 37 with an equalized signal y produced by equalizing the reproduction signal like a PR (Partial Response) signal obtained from a desired PR channel.

Here, the adaptive equalizing section 34 is supplied with an error e of the equalized signal y from the error calculating section 37. The equalization of the reproduction signal at the adaptive equalizing section 34 is performed adaptively such that the error e from the error calculating section 37 is reduced.

The restoring section 35 restores a multilevel-code string which is a channel code from the equalized signal y supplied from the adaptive equalizing section 34, by performing maximum likelihood decoding such as Viterbi decoding on the equalized signal y, supplies the multilevel-code string to the sync detecting section 18 and the frame detecting section 19, and also supplies the multilevel-code string to the convolution section 36.

Note that the restoration of the multilevel code at the restoring section 35 can be performed by a method other than maximum likelihood decoding, that is, a threshold process or the like, for example.

The convolution section 36 generates a target signal which is the target of the equalized signal y which is a result of the equalization by the adaptive equalizing section 34, by performing convolution of the multilevel-code string supplied from the restoring section 35 and an impulse response of a desired PR channel, and supplies the target signal to the error calculating section 37.

The error calculating section 37 determines the error e of the equalized signal y supplied from the adaptive equalizing section 34 relative to the target signal supplied from the convolution section 36, and supplies the error e to the adaptive equalizing section 34.

Here, for example, a Run-in and the like included in the RUB recorded on the optical disc 16 have become known patterns. The target signal of the equalized signal y obtained by the equalization of the reproduction signal of such known patterns can be determined by convolution of a restoration result restored from the equalized signal y and the impulse response of the desired PR channel, for example. In addition, the target signal of the equalized signal y obtained by the equalization of the reproduction signal of the known patterns can be determined by convolution of the known pattern and the impulse response of the desired PR channel, for example.

The HPF 41 cuts a DC (Direct Current) component of the reproduction signal output by the ADC 31, by filtering the reproduction signal, and supplies the reproduction signal to the AGC 42.

The AGC 42 performs an AGC (Auto Gain Control) process of adjusting the gain of the reproduction signal from the HPF 41, and supplies the reproduction signal to the PLL 32 and the memory 33.

<Multilevel Code Expression Method>

Figure 6:
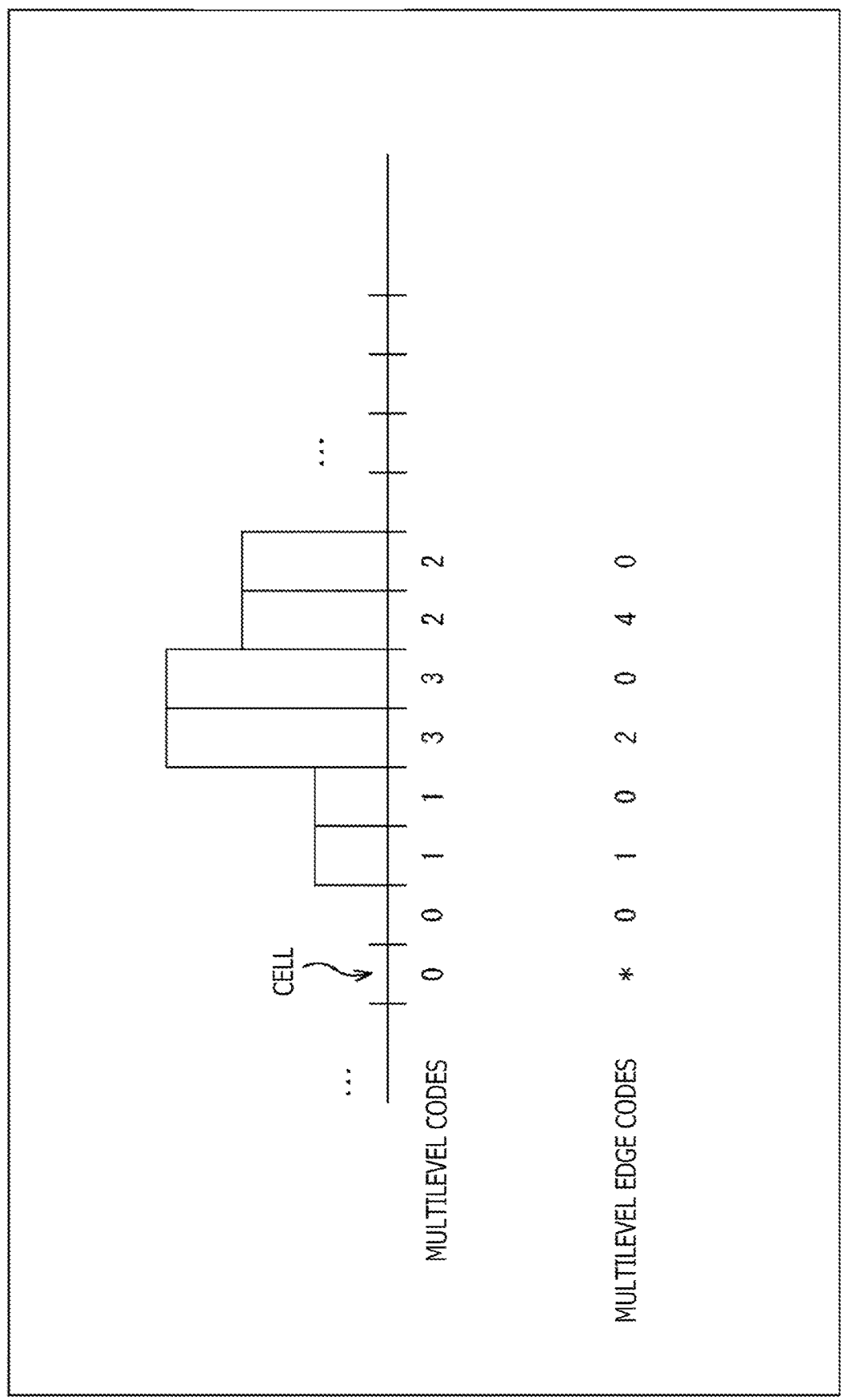
FIG. 6 is a figure for explaining an expression method for expressing multilevel codes.

FIG. 6 is a figure for explaining an expression method for expressing multilevel codes.

Here, one (value) in multilevel codes of at least three ML values is called a cell. n cells are a sequence of n multilevel codes. The code length of the multilevel codes is represented by the number of cells.

An ML-value multilevel code can be expressed by a multilevel level code of ML values, a multilevel edge code, or an NRZ (non-return-to-zero) code.

A multilevel level code is a code that expresses a multilevel code by a value (level), and is hereinafter also referred to as a level code. An ML-value multilevel code includes a value that can assume 0, 1, 2, . . . and ML−1.

Here, a reversal (level reversal) of an ML-value multilevel code means conversion of the level code to a value that is symmetrically opposite to the level code with respect to 0 or the intermediate value of ML−1. Accordingly, a level code L'(t) after a reversal of a level code L(t) at time t (t-th) is represented by a formula L'(t)=ML−1−L(t).

A multilevel edge code is a code that expresses a multilevel code by an edge, and is hereinafter also referred to as an edge code.

An edge represents a change amount of a multilevel code from the previous value, and 0 to ML−1 that the ML-value multilevel code can assume are rotatably used for counting.

For example, in a case where two consecutive ML=5 multilevel-code cells are 00, the edge between those two cells is 0 since the change amount from 0 of the first cell to 0 of the second cell is 0.

For example, in a case where two consecutive ML=5 multilevel-code cells are 01, the edge between those two cells is 1 since the change amount from 0 of the first cell to 1 of the second cell is 1.

For example, in a case where two consecutive ML=5 multilevel-code cells are 13, the edge between those two cells is 2 since the change amount from 1 of the first cell to 3 of the second cell is 2.

For example, in a case where two consecutive ML=5 multilevel-code cells are 32, the edge between those two cells is 4 since the change amount from 3 of the first cell to 2 of the second cell is 4 if it is counted by using 0 to 4=ML−1 rotatingly.

Accordingly, for example, edge codes that express ML=5 level codes 00113322 . . . are *0102040 . . . . * is a value determined from the value immediately before 0 which is the beginning of the level codes 00113322 . . . .

The level code $L(t)$ at time t and the edge code $c(t)$ at time t satisfy a formula $L(t)=(L(t-1)+c(t))$ % ML. % represents a modulo operator, and A % B represents the remainder that is obtained when A is divided by B.

The channel coding section 12 (FIG. 1) codes an ECC cluster (including user data) supplied from the ECC processing section 11, into edge codes that expresses multilevel codes like the ones above, and supplies the edge codes to the frame configuring section 13.

The frame configuring section 13 adds DCC cells to the edge codes supplied from the channel coding section 12 while converting the edge codes into level codes, and configures frames. The conversion from the edge code $c(t)$ to the level code $L(t)$ is performed according to the formula $L(t)=(L(t-1)+c(t))$ % ML described above.

NRZ codes are codes that express multilevel codes (level codes) by values which include 0 as the central value. An NRZ code $N(t)$ at time t is represented by a formula $N(t)=L(t)*2-(ML-1)$ using the level code $L(t)$. The NRZ codes of ML=5 level codes 0, 1, 2, 3, and 4 are −4, −2, 0, +2, and +4.

<Code Generation Model>

Figure 7:
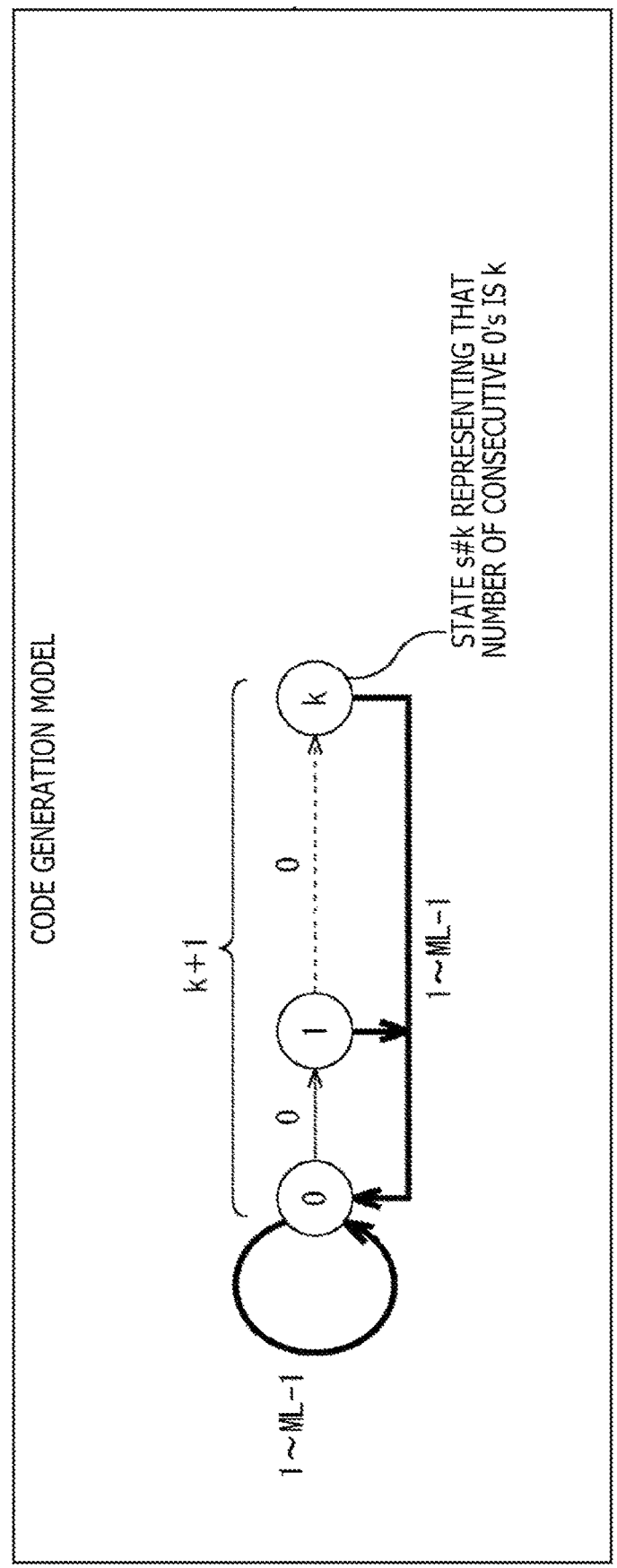
FIG. 7 is a figure depicting a code generation model for generating (multilevel codes expressed by) edge codes.
Figure 10:
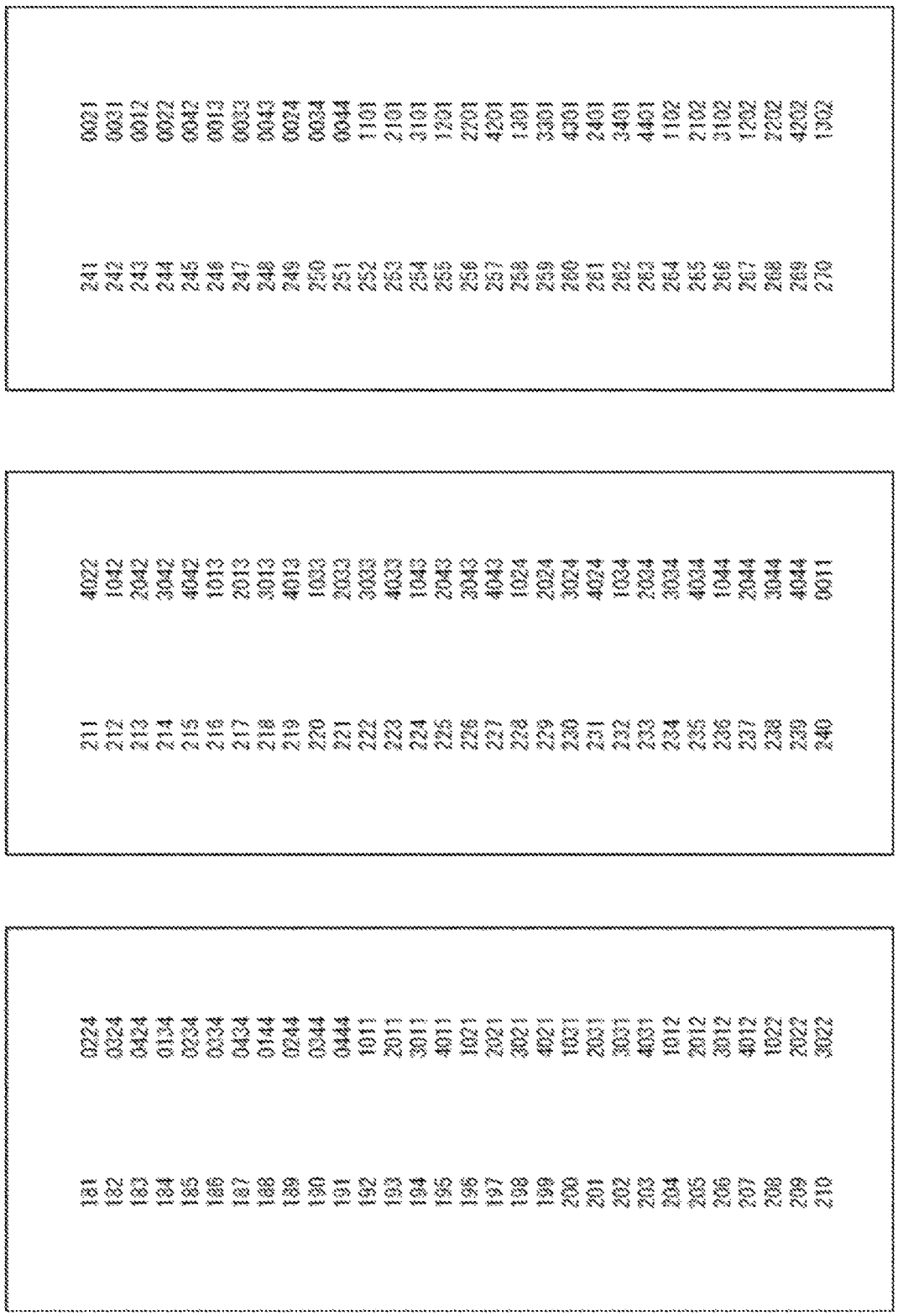
FIG. 10 is a figure depicting the example of the code LUT in which 512 block codes as k=4/ML=5 9-bit/4-cell codes are registered.
Figure 12:
FIG. 12 is a figure depicting the example of the code LUT in which 512 block codes as k=4/ML=5 9-bit/4-cell codes are registered.
Figure 13:
FIG. 13 is a figure depicting the example of the code LUT in which 512 block codes as k=4/ML=5 9-bit/4-cell codes are registered.

FIG. 7 is a figure depicting a code generation model for generating (multilevel codes expressed by) edge codes registered in the code LUT in the LUT storage section 51 (FIG. 4).

The code generation model has states representing consecutive-zero counts. The number of the states is equal to the number of cases of consecutive zero edges. Accordingly, if the maximum consecutive repetition count which is the maximum value of consecutive-zero counts is represented by k, the code generation model has k+1 states in total, which are state s0, state s1, . . . and state s #k. State s #i is a state representing that the consecutive-zero count is i.

According to the code generation model, in a case where 0 is output as an edge code, a transition occurs to state s #k' representing the consecutive-zero count k' (<=k) representing the number of consecutive zero edges, including the 0. In addition, according to the code generation model, in a case where any of 1 to ML−1 is output as an edge code, a transition occurs to state s0 representing that the consecutive-zero count is 0. When the state is state s #k representing that the consecutive-zero count is the maximum consecutive repetition count k, only any of 1 to ML−1 other than 0 can be output as an edge code, and a transition occurs to state s0 after the edge code of any of 1 to ML−1 is output.

Edge codes registered in the code LUT can be generated according to state transitions as determined by a code generation model like the one above.

Typically, regarding channel codes (recording modulation codes), it is necessary to ensure that there is a sufficient frequency at which information for detection of a phase error, for example, at the PLL that generates channel clocks, for example, is obtained. That is, it is necessary to ensure that there is a sufficient frequency of transitions (changes) of the values of the channel codes. Accordingly, what is generally called k limitation is performed to limit the maximum value of the number of times of consecutive repetition of the same value.

For example, a code generation model in a case where the maximum consecutive repetition count k is limited to 1 includes state s0 representing that the consecutive-zero count is 0 and state s1 representing that the consecutive-zero count is one.

In a case of state s0, any of values from 0 to ML−1 can be output as an edge code. In state s0, a state transition occurs from state s0 to state s1 in a case where 0 is output as an edge code, and a state transition occurs from state s0 to state s0 in a case where any of values from 1 to ML−1 is output as an edge code.

In a case of state s1, 0 cannot be output as an edge code, and any of values from 1 to ML−1 other than 0 can be output. In state s1, any of values from 1 to ML−1 is output as an edge code, and a state transition occurs from state s1 to state s0.

Multilevel codes (edge codes) generated by a code generation model is explained below taking ML=5 multilevel codes as an example.

Note that details of generation of multilevel codes by a code generation model are described in PTL 1.

In coding (multilevel coding) to multilevel codes, for example, binary data with a certain number of bits is converted into (a string of) multilevel codes which are a sequence of cells of one or more values. Accordingly, the coding rate of coding to multilevel codes is expressed in the unit of bits/cell.

It is supposed that the coding efficiency of multilevel codes is defined as the ratio of the coding rate to a theoretical limit coding rate of multilevel codes in a case where the maximum consecutive repetition count k=∞.

The theoretical limit coding rate of multilevel codes means the theoretical limit coding rate of multilevel codes, that is, the maximum number of bits of binary data that can be theoretically allocated to one cell in multilevel codes. The theoretical limit coding rate of ML=5 multilevel codes in a case where the maximum consecutive repetition count k=1 can be determined as (approximately) $2.271553=\log_2 4.828427$ bits by taking $\log_2$ of the Shannon capacity 4.828427 of ML=5 multilevel codes.

The present inventor has confirmed that, if the maximum consecutive repetition count k is equal to or greater than 2 regarding ML=5 multilevel codes, the coding rate rapidly approaches the theoretical limit coding rate and the coding efficiency becomes equal to or higher than 99%.

It is supposed now that, as a coding method of multilevel coding at the channel coding section 12, for example, a method of converting m-bit binary data into (an edge-code string that expresses) block codes with a fixed length (n cells) including an n-cell multilevel-code string is adopted.

The following explains block codes including (edge codes that express) k=4/ML=5 multilevel codes in block codes with a fixed length including an n-cell multilevel-code string. k=4/ML=5 multilevel codes are ML=5 multilevel codes (expressed by edge codes) in a case where the maximum consecutive repetition count k=4.

The present inventor confirmed that, in block codes including (edge codes that express) k=4/ML=5 multilevel codes, block codes with a code length n of four cells are highly efficient block codes that attain coding efficiency of 97%.

Regarding block codes including k=4/ML=5 multilevel codes with a code length n of four cells, 9-bit binary data is coded into block codes including 4-cell multilevel codes. Here, block codes including k=4/ML=5 multilevel codes with a code length n of four cells into which 9-bit binary data is coded as described above are also described as k=4/ML=5 9-bit/4-cell codes.

(A string of) edge codes included in k=4/ML=5 9-bit/4-cell codes (expressing multilevel codes) can be generated by performing four state transitions starting from a certain state as the initial state in a k=4/ML=5 code generation model.

Since the high-frequency reproduction gain is low in optical recording, the RMTR (Repeated Minimum Transition Run) (repeated minimum transition run) is limited. By limiting the RMTR, high-frequency components of reproduction signals can be reduced. For example, regarding 17PP codes and PCWA110 codes as binary channel codes (binary codes), the RMTR is limited to 6 and 2, respectively.

The RMTR means the number of times of repetition of a minimum transition pattern which is a pattern in a minimum cycle in a case where changes between the same values (levels) repeat in the minimum cycle. For example, 41 or 14 in a case where 41 is repeated or 23 or 32 in a case where 23 is repeated in (block code including) ML=5 edge codes are minimum transition patterns.

Regarding the edge code $c(t)$, a run length that satisfies a formula $c(t)+c(t+1)=ML$ is the RMTR. Regarding the level code $L(t)$, a run length that satisfies a formula $L(t)!=L(t+1)$ and a formula $L(t)=L(t+2)$ is the RMTR. A !=B represents that A and B are not equal.

FIG. 8, FIG. 9, FIG. 10, FIG. 11, FIG. 12, and FIG. 13 are figures depicting an example of a code LUT in which 512 block codes as k=4/ML=5 9-bit/4-cell codes are registered.

(4-cell edge codes included in) block codes and binary data are registered in a code LUT in association with each other. FIG. 8 to FIG. 13 depict 9-bit binary data by decimal numbers. According to the code LUT in FIG. 8 to FIG. 13, for example, binary data 0 (zero expressed by nine bits here) is coded into (a 4-cell edge code included in) a block code 1111.

The RMTR of block codes registered in the code LUT depicted in FIG. 8 to FIG. 13 is limited to 3 (or smaller). In addition, multilevel-code (edge-code) strings obtained by channel coding according to the code LUT depicted in FIG. 8 to FIG. 13 are ML=5 (0,4)-RLL codes.

Note that, when expressed as edge codes, ML-value (d,k)-RLL codes are ML-value multilevel codes whose minimum run is d and maximum run is k. Accordingly, when expressed as level codes, ML-value (d,k)-RLL codes are ML-value multilevel codes whose minimum run is d+1 and maximum run is k+1. For example, when expressed as level codes, ML=5 (0,4)-RLL codes are quinary codes whose minimum run is 1 and maximum run is 5.

Note that (block codes including) multilevel codes used for the recording/reproducing apparatus are not limited to the multilevel codes depicted in FIG. 8 to FIG. 13. That is, other than the multilevel codes depicted in FIG. 8 to FIG. 13, multilevel codes of quinary values generated by using a code generation model can be used for the recording/reproducing apparatus. In addition, multilevel codes of ternary values, multilevel codes of quaternary values, or multilevel codes of senary values or beyond senary values generated by using a code generation model can be used for the recording/reproducing apparatus.

<ECC Cluster>

Figure 14:
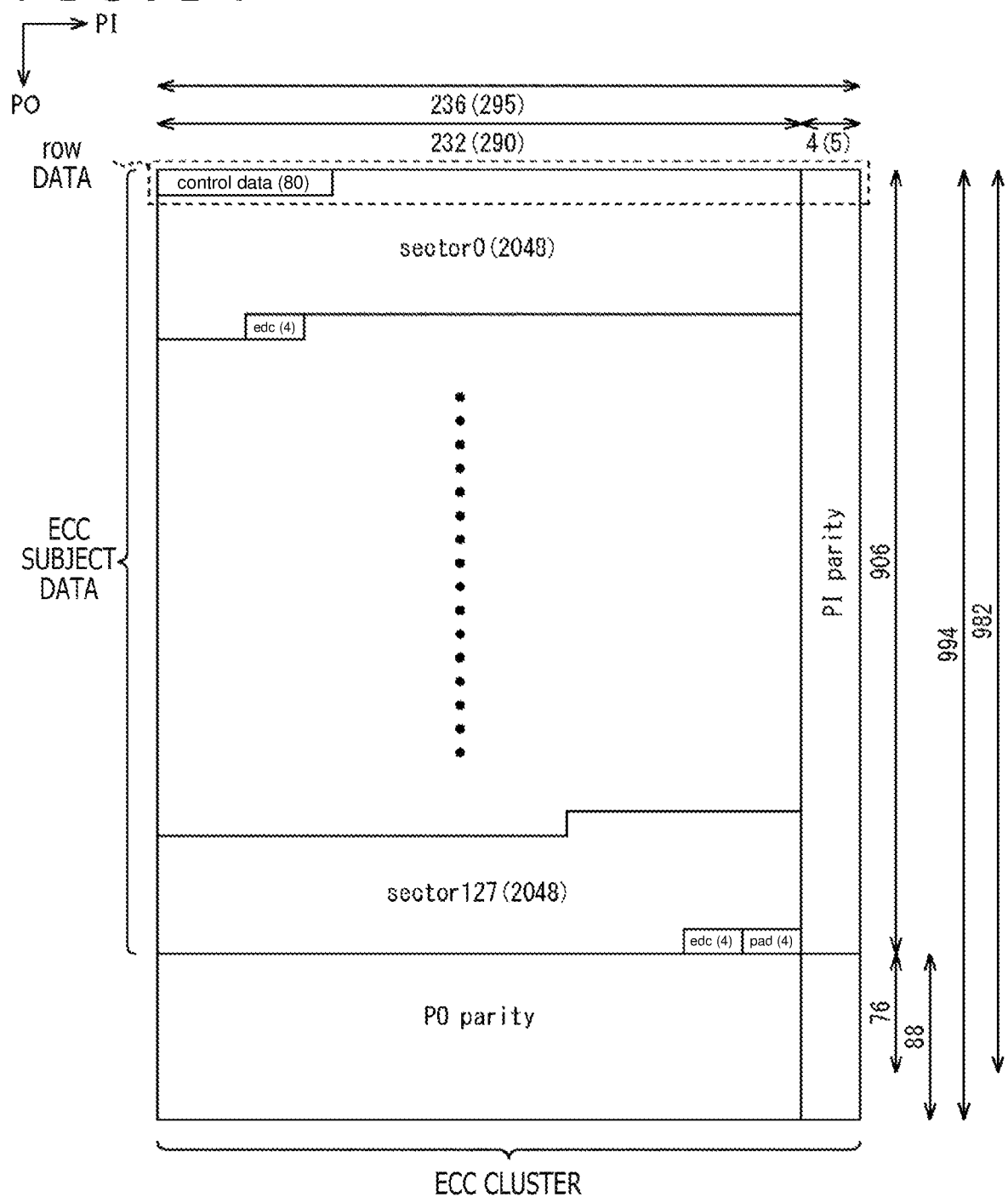
FIG. 14 is a figure for explaining an example of an ECC cluster configured at an ECC processing section 11.

FIG. 14 is a figure for explaining an example of an ECC cluster configured at the ECC processing section 11 depicted in FIG. 1.

For example, the ECC processing section 11 configures ECC subject data including 256-kB (kilo Byte) user data, and configures an ECC cluster including the ECC subject data.

The ECC processing section 11 includes and scrambles EDCs (Error Detection Codes) in the 256-kB user data, and adds control data including an address of an RUB and padding (pad.) to the result of the scrambling to thereby configure 262,740-B (Byte) data as the ECC subject data.

Here, the ECC processing section 11 configures 128 (=256 kB/2 kB) sectors from 256-kB user data treating 2048-B (=2 kB) user data as one sector.

The ECC subject data includes one piece of 80-B (Byte) control data arranged at the beginning, 128 2048-B sectors arranged after the control data, 4-B EDCs arranged immediately after each sector, and 4-B padding arranged at the end.

In FIG. 14, numbers in parentheses represent byte counts, and numbers not in parentheses represent symbol counts. Here, in the ECC process, one symbol is equal to 10 bits.

The ECC processing section 11 configures ECC subject data with 232×906 symbols in the left-right direction and up-down direction. As described above, the 232×906-symbol ECC subject data is data with the size of 262,740B=232 symbols×10 bits×906 rows/8 bits.

For example, the ECC processing section 11 configures a 236×994-symbol ECC cluster by adding 4-symbol parity (PI (Parity Inner)) to each row of 232-906-symbol ECC subject data and also adding 88-symbol parity (PO (Parity Outer)) to each column of the 232×906-symbol ECC subject data. The ECC cluster configured at the ECC processing section 11 is a product code with PO [994,906]×PI [236,232] of 10-bit symbols (2^10 Galois fields).

Supposing that one row of a symbol string of the ECC cluster is data with the size of 2,360 dbit (data bit)=236 symbols×10 bits and that this one row of data with the size of 2,360 dbit is row data, the ECC cluster is divided into row data. Further, frames are configured from a data string including pieces of row data that are arranged next to each other in the left-right direction, and an RUB including the frames are configured. Then, the RUB is recorded in the track direction of the optical disc 16.

Note that the ECC cluster can be configured by adding 4-symbol parity (PI) and also adding 76-symbol parity (PO) to each row and each column of the 232×906-symbol ECC subject data. In this case, a 236×982-symbol ECC cluster is configured.

Whether to configure a 236×994-symbol ECC cluster or to configure a 236×982-symbol ECC cluster can be selected (set) according to stored values of the register group 23A.

<Frames>

Figure 15:
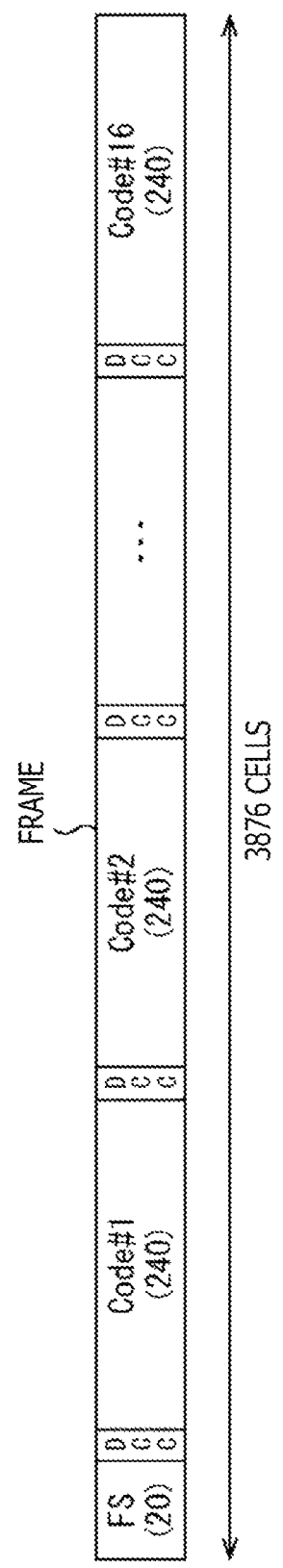
FIG. 15 is a figure for explaining an example of frames configured at a frame configuring section 13.

FIG. 15 is a figure for explaining an example of frames configured at the frame configuring section 13 depicted in FIG. 1.

The frame configuring section 13 is supplied, from the channel coding section 12, with (a string of) cluster multilevel codes that are obtained by channel-coding (multilevel-coding) an ECC cluster according to the code LUT depicted in FIG. 8 to FIG. 13, for example.

That is, at the channel coding section 12, a data string including row data of an ECC cluster that is arranged next to each other in the left-right direction (one row) is coded into block codes as k=4/ML=5 9-bit/4-cell codes according to the code LUT depicted in FIG. 8 to FIG. 13. This block-code string is supplied from the channel coding section 12 to the frame configuring section 13 as a cluster multilevel-code string.

Cluster multilevel codes supplied from the channel coding section 12 to the frame configuring section 13 have become edge codes. The frame configuring section 13 configures frames including level codes while converting edge codes as cluster multilevel codes into level codes and performing DC control.

The frame configuring section 13 arranges, in frames, a level-code string as cluster multilevel codes in the unit of, for example, 240 cells as DC control units in which DC control is performed. This 240-cell level-code string as a DC control unit is also called a code string, and an i-th code string from the beginning of a frame is also described as a code string Code #i.

The frame configuring section 13 arranges a 20-cell FS at the beginning of a frame. Then, after the FS, the frame configuring section 13 arranges sixteen code strings Code #1, Code #2, . . . , and Code #16.

When arranging each code string Code #i, DC control to add, to the beginning of the code string Code #i, a ML=5 multilevel code as a 1-cell DCC cell that minimizes the absolute value of the DSV (Digital Sum Value) from the beginning of the frame to the end of the code string Code #i is performed. This DC control reduces DC components of the frame.

The DSV is an integrated value of NRZ codes computed about a multilevel-code string, and serves an index of DC components included in the multilevel-code string about which the integrated value is computed.

If the DSV of multilevel codes from the beginning of a multilevel-code string to a K-th multilevel code (K-th cell) is represented as DSV(K) and also the NRZ code of an i-th multilevel code is represented as N(i), the DSV(K) can be computed according to a formula DSV(K)=ΣN(i), for example. Σ represents the summation that varies as i changes from 1 to K.

The frame configuring section 13 adds, to the beginning of the code string Code #1 arranged immediately after the FS, a DCC cell that minimizes the absolute value of the DSV from the beginning of the frame to the end of the code string Code #1.

Then, the frame configuring section 13 arranges, immediately after the FS, the code string Code #1 to which the DCC cell that minimizes the DSV is added at the beginning.

Thereafter, the frame configuring section 13 adds, to the beginning of the code string Code #2, a DCC cell that minimizes the absolute value of the DSV from the beginning of the frame to the end of the code string Code #2.

Then, the frame configuring section 13 arranges, immediately after the code string Code #1, the code string Code #2 to which the DCC cell that minimizes the DSV is added at the beginning.

Similar rules apply to the rest, and the frame configuring section 13 configures the frame by arranging the code strings Code #3 to Code #16 to which DCC cells are added at the beginnings.

Accordingly, the frame includes the one FS, the sixteen code strings Code #1 to Code #16, and the sixteen DCC cells. The FS, a code string Code #i, and a DCC cell include twenty cells, 240 cells, and one cell, respectively. Hence, the frame includes 3876 (=20+16×240+16×1) cells. The portions of the frame excluding the FS include 3856 (=3876−20) cells.

Note that the DSV of the FS is 0. Accordingly, computation of the DSV from the beginning of the frame to the end of the code string Code #i can be performed by computation of the DSV from the portion immediately after the FS to the end of the code string Code #i.

<FS>

FIG. 16 is a figure depicting an example of the FS in FIG. 15.

FIG. 16 depicts an example of level codes as a 20-cell FS in a case where the k=4/ML=5 9-bit/4-cell codes depicted in FIG. 8 to FIG. 13 are adopted for channel coding.

The FS has either a + pattern or a − pattern. The + pattern and the − pattern are in a level-reversed relation.

The FS has a pattern in which there are eight consecutive cells of each of level codes 0 and 4. Accordingly, the FS has an ML=5 particular pattern that includes a run of repeated codes greater than 5, which is the maximum run in level codes of the k=4/ML=5 9-bit/4-cell codes depicted in FIG. 8 to FIG. 13, that is, ML=5 (0,4)-RLL codes, used for channel coding of user data. As a result, it is possible to make it easier to detect the FS by making a distinction between the FS and user data and correctly reproduce multilevel codes recorded at high density.

Note that the TR (Transition Run) is equal to or shorter than 1 in the k=4/ML=5 9-bit/4-cell codes depicted in FIG. 8 to FIG. 13.

The TR represents a run length of a different level code sandwiched between the same level codes.

For example, in a level-code string . . . 2311030, there is only one instance of a different level code 3 being sandwiched between the same level codes 0 in 030 at the terminating position. Accordingly, TR=1.

In addition, for example, in a level-code string . . . 23410303, there are consecutive instances of a different level code 3 being sandwiched between the same level codes 0 and a different level code 0 being sandwiched between the same level codes 3 in 0303 at the terminating position. Accordingly, TR=2.

As the FS to be included in the frame, a pattern that provides a smaller TR is selected from the + pattern and the − pattern.

For example, for a frame arranged after a TR=1 multi-level-code string . . . 030 at the terminating position, an FS with a − pattern that provides a smaller TR is selected in the following manner.

That is, in a case where an FS with a + pattern is arranged after a multilevel-code string . . . 030, a multilevel-code string at the connecting portion is . . . 030 34444 . . . , the connecting portion is 0303, and TR=2.

On the other hand, in a case where an FS with a − pattern is arranged after a multilevel-code string . . . 030, a multi-level-code string at the connecting portion is . . . 030 10000 . . . , the connecting portion is 030, and TR=1.

Accordingly, the FS with the − pattern provides a smaller TR than the FS with the + pattern does. Hence, the FS with the − pattern is selected.

In the k=4/ML=5 9-bit/4-cell codes (edge codes) depicted in FIG. 8 to FIG. 13, level codes are multilevel-code strings with the TR which is equal to or smaller than 1.

In addition, in multilevel-code strings as a frame configured by arranging an FS depicted in FIG. 16, the rule regarding an RMTR-related limitation (RMTR=3) is followed, similarly to the k=4/ML=5 9-bit/4-cell codes depicted in FIG. 8 to FIG. 13.

<RUB>

Figure 17:
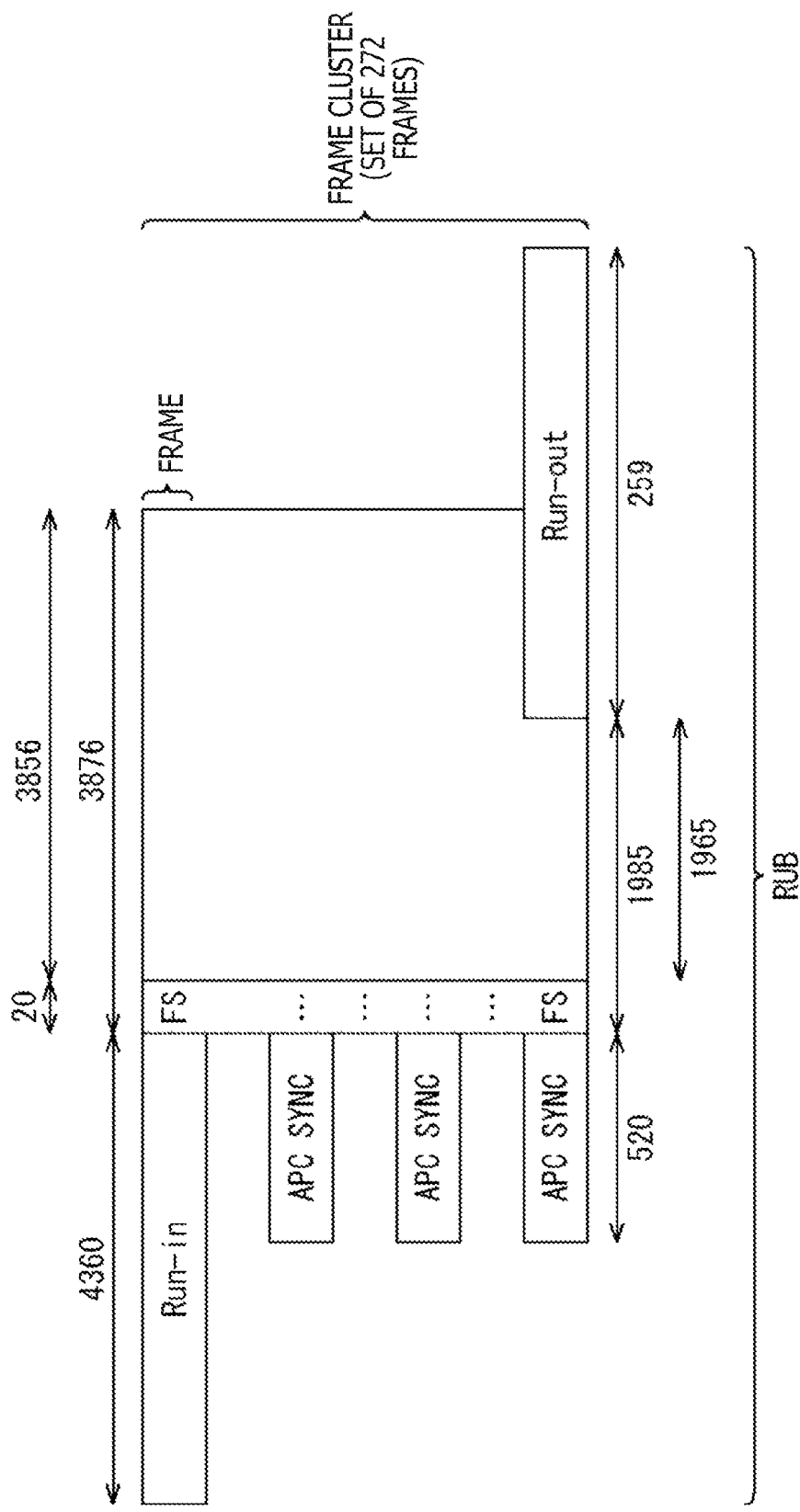
FIG. 17 is a figure for explaining an example of an RUB configured at an RUB configuring section 14.

FIG. 17 is a figure for explaining an example of an RUB configured at the RUB configuring section 14 depicted in FIG. 1.

The RUB configuring section 14 configures a frame cluster from a plurality of frames supplied from the frame configuring section 13 and APC SYNCs, and configures an RUB by adding a Run-in and a Run-out to the beginning and the end of the frame cluster, respectively.

The RUB configuring section 14 acquires, from the frame configuring section 13, 272 frames to be included in one RUB, as frames to be included in a frame cluster.

Note that, as depicted in FIG. 15, the first to 271st frames in the 272 frames to be included in the RUB include 3876 cells, but the last 272nd frame includes 1985 cells.

As depicted in FIG. 15, in each of the first to 271st frames, a 20-cell FS is arranged at the beginning, and thereafter, sixteen sets of a 1-cell DCC cell and a 240-cell code string are arranged.

On the other hand, in the 272nd frame, a 20-cell FS is arranged at the beginning, and thereafter, eight sets of a 1-cell DCC cell and a 240-cell code string are arranged. Further, thereafter, one set of a 1-cell DCC cell and a 36-cell code string is arranged.

As described above, the 272nd frame includes 1985 (=20+8×1+8×240+1×1+1×36) cells including one 20-cell FS and nine 1-cell DCC cells as well as eight 240-cell code strings and one 36-cell code string. The portions excluding the FS of the 272nd frame include 1965 (=1985−20) cells.

As the 272 frames to be included in the one RUB, the frame configuring section 13 configures 271 3876-cell frames and one 1985-cell frame.

The RUB configuring section 14 configures a frame cluster by adding three 520-cell APC SYNCs to the set of the 272 frames to be included in the one RUB.

The three APC SYNCs are added to the set of the 272 frames to be included in the one RUB, such that they are arranged at substantially constant intervals.

For example, the three APC SYNCs are added to the ends of the 68th, 136th, and 204th frames (the beginnings of the 69th, 137th, and 205th frames), respectively, in the 272 frames to be included in the one RUB.

Since the APC SYNCs are arranged at substantially constant intervals, timings at which timing recovery or the like is performed for the frame cluster can be made uniform.

The RUB configuring section 14 configures the RUB by adding a 4360-cell Run-in to the beginning of the frame cluster and also adding a 259-cell Run-out to the end of the frame cluster.

<Run-In>

Figure 18:
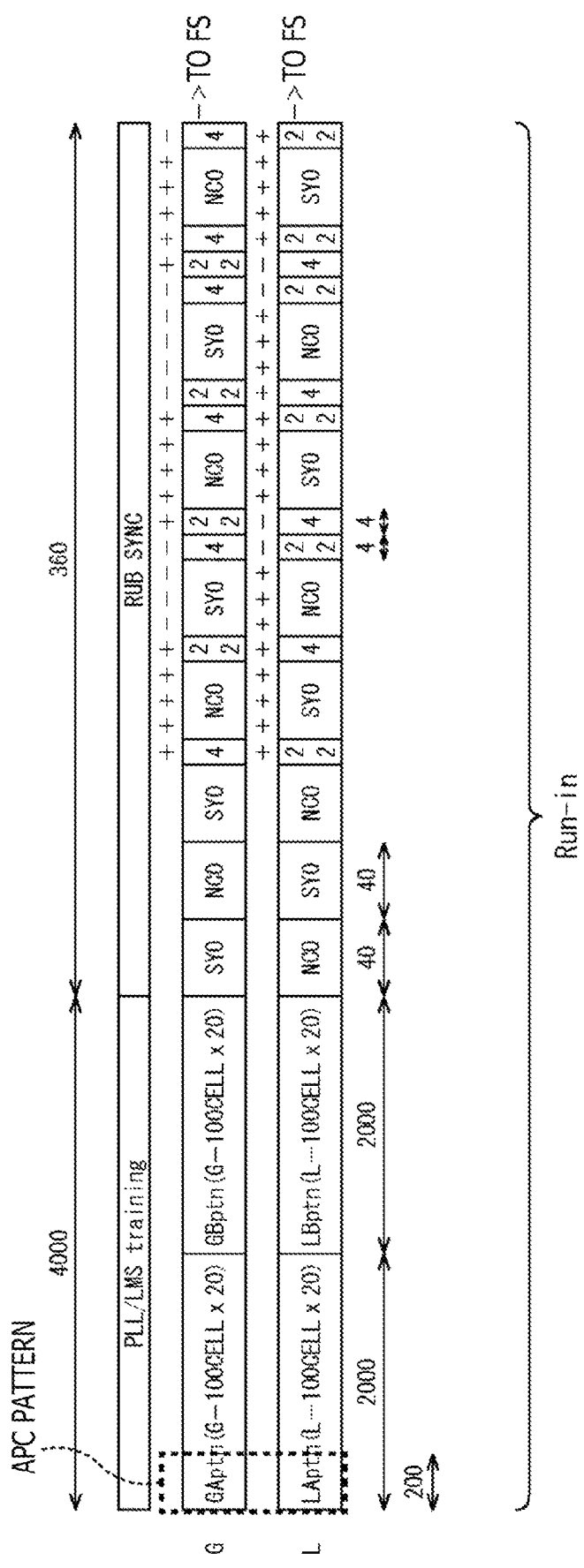

FIG. 18 is a figure depicting configuration examples of the Run-in in FIG. 17.

That is, FIG. 18 depicts examples of Run-ins recorded in two adjacent tracks of the optical disc 16.

FIG. 18 depicts a Run-in recorded in a land L and a Run-in recorded in a groove G on one of the inner-circumference side and the outer-circumference side of the land L.

On the optical disc 16, the land L and the groove G on at least one of the inner-circumference side and the outer-circumference side of the land L form a pair. The Run-ins (and, in turn, RUBs) are recorded in the pair of the land L and the groove G in a form that the Run-ins lie next to each other at the same position in the track direction. FIG. 18 depicts the Run-ins for the pair of the land L and the groove G.

A Run-in is a 4360-cell pattern as explained with reference to FIG. 17, and includes, from the beginning, a PLL/LMS training which is a 4000-cell ML=5 pattern and an RUB SYNC which is a 360-cell ML=5 pattern that are arranged therein.

For example, the PLL/LMS training is used for learning XTC (Cross Talk Cancel), performing gain recovery (adjustment of the gain at the AGC 42 (FIG. 5)), drawing in the PLL 32 (FIG. 5), and performing timing recovery (adjustment of a channel clock at the PLL 32).

XTC is a process of cancelling cross-talk components in reproduction signals by adaptive equalization of the reproduction signals performed at the adaptive equalizing section 34 (FIG. 5).

For example, XTC is performed by filtering reproduction signals at an FIR (Finite Impulse Response) filter. The learning of XTC is learning of a tap coefficient of the FIR filter used in XTC, and the tap coefficient is adjusted adaptively such that the error e of the equalized signal y output by the error calculating section 37 is reduced.

In the learning of XTC, the adjustment of the tap coefficient is performed such that the square error of the equalized signal y relative to a target signal is reduced. Accordingly, the learning of XTC is LMS (Least Mean Square) learning.

The PLL/LMS training for the groove G includes, from the beginning thereof, a GAptn which is a 2000-cell ML=5 pattern and a GBptn which is a 2000-cell ML=5 pattern that are arranged therein. The PLL/LMS training for the land L includes, from the beginning thereof, an LAptn which is a 2000-cell ML=5 pattern, and an LBptn which is a 2000-cell ML=5 pattern that are arranged therein.

For example, the GAptn can be configured by arranging twenty G-100CELLs which are 100-cell ML=5 patterns next to each other. For example, similarly to the GAptn, the GBptn can be configured by arranging twenty G-100CELLs next to each other. In this case, the GAptn and the GBptn have identical patterns.

Note that different patterns can be adopted for the GAptn and the GBptn.

For example, the LAptn can be configured by arranging twenty L-100CELLs which are 100-cell ML=5 patterns next to each other. For example, similarly to the LAptn, the LBptn can be configured by arranging twenty L-100CELLs next to each other. In this case, the LAptn and the LBptn have identical patterns.

Note that different patterns can be adopted for the LAptn and the LBptn.

As the G-100CELLs to be included in the GAptn and the GBptn and the L-100CELLs to be included in the LAptn and the LBptn, patterns that give the magnitudes of cross-correlation values which are computed by using NRZ codes and which are equal to or lower than a threshold and that, for example, give 0 can be adopted.

A cross-correlation value XC(K) of two ML-value multilevel-code strings A and B represents correlation between the multilevel-code strings A and B.

i-th NRZ codes in the multilevel-code strings A and B with the lengths (number of cells) of K are defined as NA(i) and NB(i), respectively. The cross-correlation value XC(K) of the multilevel-code strings A and B can be computed according to a formula XC(K)=Σ(NA(i)×NB(i)), for example. Σ represents the summation that varies as i changes from 1 to K.

By adopting, as the G-100CELLs and the L-100CELLs, patterns that give the magnitudes of cross-correlation values of 0, the magnitude of the cross-correlation value between the entire PLL/LMS trainings of the adjacent groove G and land L also is 0.

As a result, the PLL/LMS trainings can be detected with reduced influence of cross talk.

As the G-100CELLs and the L-100CELLs, Further, patterns that give the magnitudes of DSVs which are equal to or smaller than a threshold and that, for example, give 0 can be adopted.

By adopting, as the G-100CELLs and the L-100CELLs, patterns that give the magnitudes of DSVs which are 0, the magnitude of the DSV of the entire PLL/LMS trainings also is 0.

As a result, the PLL/LMS trainings can be detected with reduced DC components.

Note that, in the first 200 cells in the GAptn surrounded by a dotted line in FIG. 18, an APC pattern for APC can be arranged instead of G-100CELLs. Whether to arrange G-100CELLs or to arrange an APC pattern in the first 200 cells in the GAptn can be selected for each RUB, for example. Similarly, also in the first 200 cells in the LAptn, an APC pattern can be arranged selectively instead of L-100CELLs.

The RUB SYNC is used for detection of an FS of a frame in the RUB including the RUB SYNC or the like.

The RUB SYNC for the groove G includes, from the beginning thereof, a 40-cell SY0, a 40-cell NC0, an SY0, a 4-cell 4-cell pattern, an NC0, a 4-cell 2-2 cell pattern, an SY0, a 4-cell pattern, a 2-2 cell pattern, an NC0, a 4-cell pattern, a 2-2 cell pattern, an SY0, a 4-cell pattern, a 2-2 cell pattern, a 4-cell pattern, an NC0, and a 4-cell pattern that are arranged therein.

All of the SY0's, the NC0's, the 4-cell patterns, and the 2-2 cell patterns are ML=5 patterns.

The RUB SYNC for the land L includes, from the beginning thereof, an NC0, an SY0, an NC0, a 2-2 cell pattern, an SY0, a 4-cell pattern, an NC0, a 2-2 pattern, a 4-cell pattern, an SY0, a 2-2 cell pattern, a 4-cell pattern, an NC0, a 2-2 cell pattern, a 4-cell pattern, a 2-2 cell pattern, an SY0, and a 2-2 cell pattern that are arranged therein.

Similarly to the FS explained with reference to FIG. 16, the SY0's, the NC0's, the 4-cell patterns, and the 2-2 cell patterns have either + patterns or − patterns.

The SY0's, the NC0's, the 4-cell patterns, and the 2-2 cell patterns above which + is written in FIG. 18 are + patterns. The SY0's, the NC0's, the 4-cell patterns, and the 2-2 cell patterns above which − is written are − patterns. The SY0's and the NC0's above which none of + and − are written are + patterns.

As the RUB SYNCs for the groove G and the land L, patterns that give the magnitudes of cross-correlation values which are equal to or smaller than a threshold and that, for example, give 0 can be adopted.

As a result, (the SY0's and the like included in) the RUB SYNCs can be detected with reduced influence of cross talk.

In addition, as the RUB SYNCs for the groove G and the land L, patterns that give the magnitudes of DSVs which are equal to or smaller than a threshold and that, for example, give 0 can be adopted.

As a result, (the SY0's and the like included in) the RUB SYNCs can be detected with reduced DC components.

Note that, if the DSVs of the PLL/LMS trainings and the RUB SYNCs are 0, the DSV of the entire Run-ins is also 0.

FIG. 19 is a figure depicting configuration examples of the G-100CELLs included in the GAptn and the GBptn and the L-100CELLs included in the LAptn and the LBptn depicted in FIG. 18.

A in FIG. 19 depicts an example of level codes as a 100-cell G-100CELL. B in FIG. 19 depicts an example of level codes as a 100-cell L-100CELL.

As explained with reference to FIG. 18, the G-100CELLs and the L-100CELLs have patterns that give cross-correlation values which are 0. Further, the G-100CELLs and the L-100CELLs have patterns that give the magnitudes of DSVs which are 0.

Figure 20:
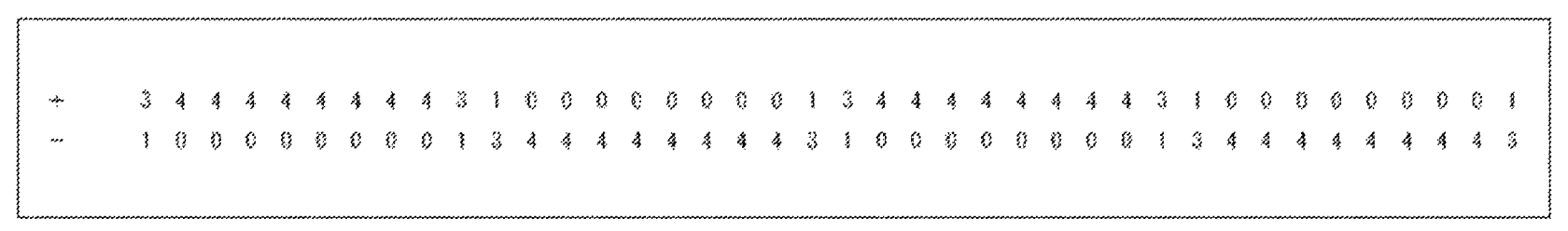

FIG. 20 is a figure depicting configuration examples of the SY0's depicted in FIG. 18.

FIG. 20 depicts examples of level codes as 40-cell SY0's.

The SY0's have either + patterns or − patterns as explained with reference to FIG. 18.

Each SY0 has a pattern in which there are eight consecutive cells of each of level codes 0 and 4. Accordingly, the SY0 has an ML=5 pattern that includes a run of repeated codes greater than 5, which is the maximum run in level codes of the k=4/ML=5 9-bit/4-cell codes depicted in FIG. 8 to FIG. 13, that is, ML=5 (0,4)-RLL codes, used for channel coding of user data.

The RUB SYNC including the SY0's and, in turn, the Run-in also have an ML=5 particular pattern that includes a run of repeated codes greater than 5, which is the maximum run in level codes of ML=5 (0,4)-RLL codes used for channel coding of user data. As a result, it is possible to make it easier to detect (the SY0's included in) the RUB SYNC by making a distinction between the RUB SYNC and user data and correctly reproduce multilevel codes recorded at high density.

Figure 21:
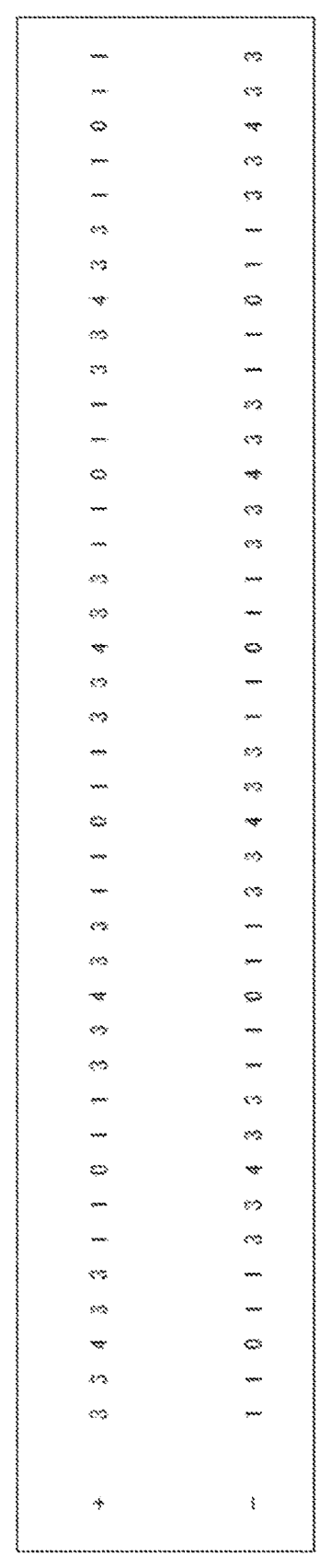

FIG. 21 is a figure depicting configuration examples of the NC0's depicted in FIG. 18.

FIG. 21 depicts examples of level codes as 40-cell NC0's.

The NC0's have either + patterns or − patterns as explained with reference to FIG. 18.

(The magnitude of) the cross-correlation value of a SY0 depicted in FIG. 20 and an NC0 depicted in FIG. 21 is 0.

As depicted in FIG. 18, in the Run-ins for the groove G and the land L, the SY0's and the NC0's are arranged at opposite positions (adjacent positions). Accordingly, in the zones of the SY0's and the zones of the NC0's in the groove G and the land L, the cross-correlation values become 0.

Figure 22:
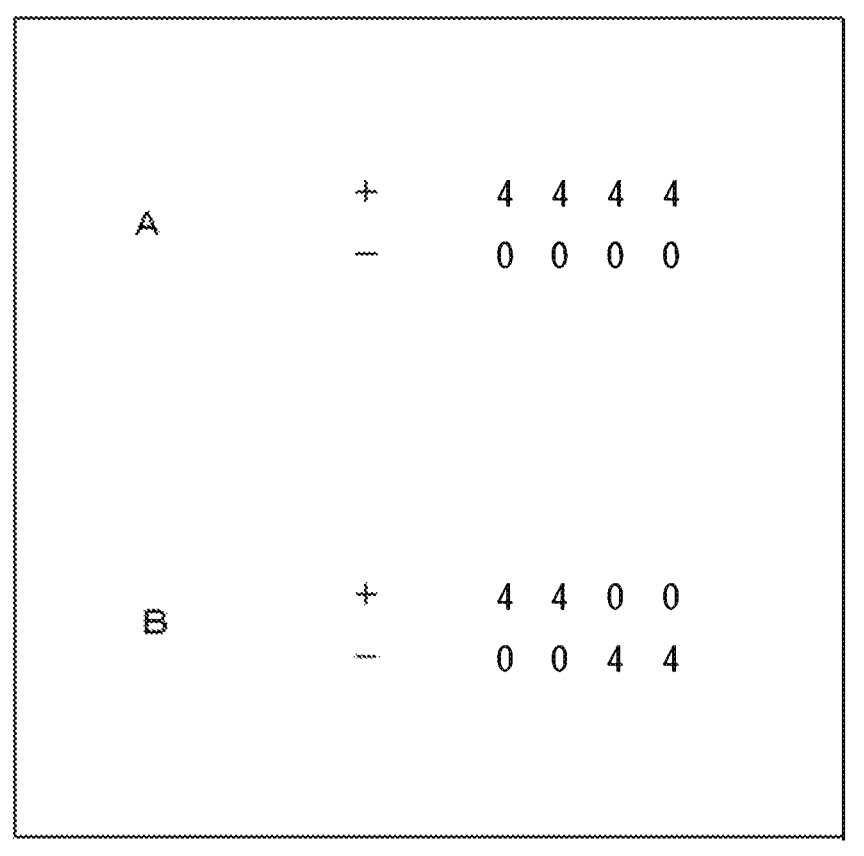

FIG. 22 is a figure depicting configuration examples of the 4-cell patterns and the 2-2 cell patterns depicted in FIG. 18.

A in FIG. 22 depicts examples of level codes as 4-cell 4-cell patterns. B in FIG. 22 depicts examples of level codes as 4-cell 2-2 patterns.

As explained with reference to FIG. 18, the 4-cell patterns and the 2-2 cell patterns have either + patterns or − patterns.

A 4-cell pattern is a pattern including four consecutive cells that have the same value. A 2-2 cell pattern is a pattern including two consecutive cells that have a first value and two consecutive cells that follow them and that have a second value which is different from the first value.

The cross-correlation value of a 4-cell pattern and a 2-2 cell pattern is 0.

As depicted in FIG. 18, in the Run-ins for the groove G and the land L, the 4-cell patterns and the 2-2 cell patterns are arranged at opposite positions. Accordingly, in the zones of the 4-cell patterns and the zones of the 2-2 cell patterns in the groove G and the land L, the cross-correlation values become 0.

As described above, in the zones of the SY0's and the zones of the NC0's in the groove G and the land L, the cross-correlation values become 0, and, also in the zones of the 4-cell patterns and the zones of the 2-2 cell patterns, the cross-correlation values become 0.

As a result, as explained with reference to FIG. 18, the cross-correlation value of the RUB SYNCs for the groove G and the land L is 0.

<APC SYNCs>

Figure 23:
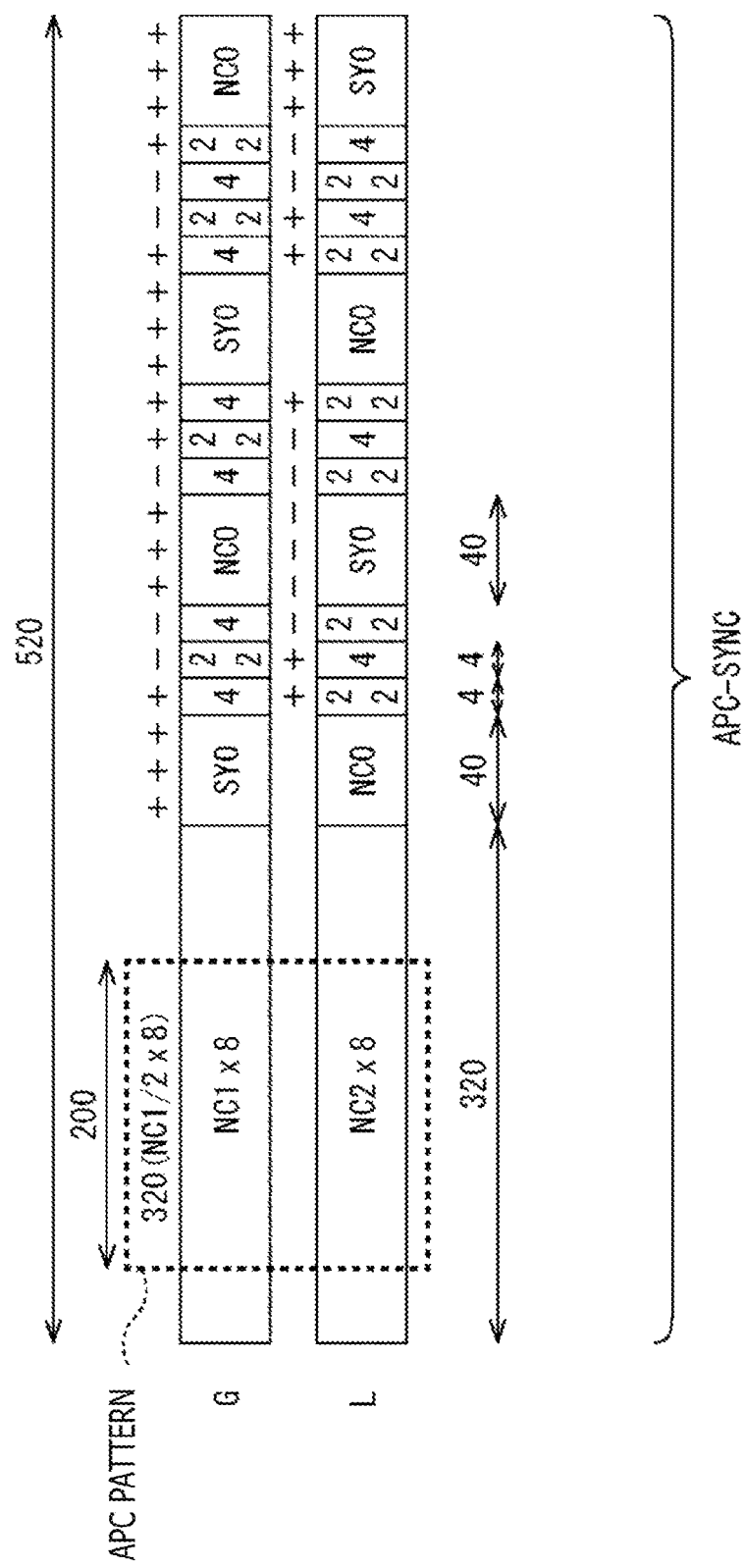
FIG. 23 is a figure depicting configuration examples of APC SYNCs.

FIG. 23 is a figure depicting configuration examples of the APC SYNCs depicted in FIG. 17.

That is, FIG. 23 depicts examples of APC SYNCs recorded in the groove G and the land L as two adjacent tracks of the optical disc 16.

The APC SYNC for the groove G includes, from the beginning thereof, eight 40-cell NC1's, an SY0, a 4-cell pattern, a 2-2 cell pattern, a 4-cell pattern, an NC0, a 4-cell pattern, a 2-2 cell pattern, a 4-cell pattern, an SY0, a 4-cell pattern, a 2-2 cell pattern, a 4-cell pattern, a 2-2 cell pattern, and an NC0 that are arranged therein.

The APC SYNC for the land L includes, from the beginning thereof, eight 40-cell NC2's, an NC0, a 2-2 cell pattern, a 4-cell pattern, a 2-2 cell pattern, an SY0, a 2-2 cell pattern, a 4-cell pattern, a 2-2 cell pattern, an NC0, a 2-2 cell pattern, a 4-cell pattern, a 2-2 cell pattern, a 4-cell pattern, and an SY0 that are arranged therein.

All of the NC1's and the NC2's are ML=5 patterns.

The APC SYNCs are configured as patterns that give the DSVs which are 0.

In addition, as explained with reference to FIG. 20, the SY0's have ML=5 patterns that include runs of repeated codes which are greater than 5, which is the maximum run in level codes of ML=5 (0,4)-RLL codes used for channel coding of user data.

The APC SYNCs including the SY0's also have ML=5 particular patterns that include runs of repeated codes which are greater than 5, which is the maximum run in level codes of ML=5 (0,4)-RLL codes used for channel coding of user data. As a result, it is possible to make it easier to detect (the SY0's included in) the APC SYNCs by making a distinction between the APC SYNCs and user data and correctly reproduce multilevel codes recorded at high density.

Note that, in 200 cells which are surrounded by a dotted line in FIG. 23 and are part of the eight NC1's at the beginning of the APC SYNC for the groove G, an APC pattern for APC can be arranged instead of the NC1's. Whether to arrange NC1's or to arrange an APC pattern can be selected for each APC SYNC or RUB, for example. Similarly, also in 200 cells which are part of the eight NC2's at the beginning of the APC SYNC for the land L, an APC pattern can be arranged selectively.

In addition, in the APC SYNCs for the groove G and the land L, the SY0's and the NC0's that give the cross-correlation values which are 0 are arranged at opposite positions. Similarly, the 4-cell patterns and the 2-2 cell patterns that give the cross-correlation values which are 0 are also arranged at opposite positions.

Accordingly, the cross-correlation value of the zone from immediately after the eight NC1's to the end of the APC SYNC in the APC SYNC for the groove G is 0. Similarly, the cross-correlation value of the zone from immediately after the eight NC2's to the end of the APC SYNC in the APC SYNC for the land L is 0.

Figure 24:
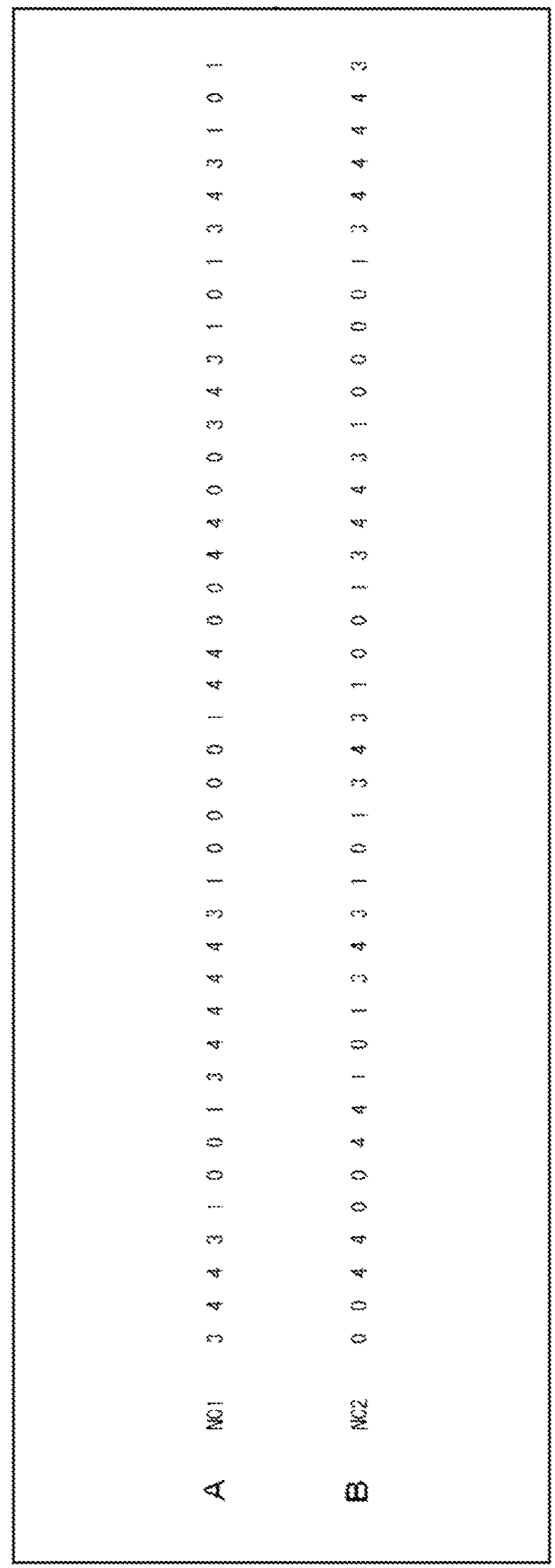
FIG. 24 is a figure depicting configuration examples of NC1's and NC2's.

FIG. 24 is a figure depicting configuration examples of the NC1's and the NC2's depicted in FIG. 23.

A in FIG. 24 depicts an example of level codes as 40-cell NC1's. B in FIG. 24 depicts an example of level codes as 40-cell NC2's.

The cross-correlation value of the NC1 and the NC2 is 0. In addition, both the NC1 and the NC2 have patterns that give the DSVs which are 0.

As explained with reference to FIG. 23, both the cross-correlation value of the zone from immediately after the eight NC1's of the APC SYNC for the groove G to the end of the APC SYNC and the cross-correlation value of the zone from immediately after the eight NC2's of the APC SYNC for the land L to the end of the APC SYNC are 0.

Then, since the cross-correlation value of the NC1's and the NC2's is also 0, the cross-correlation value of the APC SYNCs for the groove G and the land L is 0.

<Run-Out>

Figure 25:
FIG. 25 is a figure depicting a configuration example of a Run-out.

FIG. 25 is a figure depicting a configuration example of the Run-out in FIG. 17.

That is, FIG. 25 depicts an example of Run-outs recorded in the groove G and the land L as two adjacent tracks of the optical disc 16.

Each of the Run-outs for the groove G and the land L is configured by arranging a 60-cell SY1 and a 199-cell PoA, from the beginning thereof.

The SY1 is configured by arranging three 20-cell FSs (FIG. 16) next to each other.

The PoA for the groove G is configured as a 199-cell level-code string excluding only the last one cell from a 200-cell level-code string configured by arranging next to each other two 100-cell G-100CELLs included in the GAptn (FIG. 18) for the groove G.

The PoA for the land L is configured as a 199-cell level-code string excluding only the last one cell from a 200-cell level-code string configured by arranging next to each other two 100-cell L-100CELLs included in the LAptn (FIG. 18) for the land L.

The cross-correlation value of the PoAs for the groove G and the land L is 0.

If the magnitude of the cross-correlation value of two SY1's is used as a threshold, the magnitude of the cross-correlation value of the Run-outs for the groove G and the land L is equal to or smaller than the threshold.

By making the magnitude of the cross-correlation value of the Run-outs for the groove G and the land L equal to or smaller than the threshold as described above, the Run-outs can be detected with minimum influence of cross talk.

<Specific Examples of Frame Configuration and DC Control by Frame Configuring Section 13>

FIG. 26 is a figure depicting specific examples of frame configuration and DC control performed by the frame configuring section 13.

For example, it is supposed here that a row-data string of an ECC cluster supplied from the ECC processing section 11 to the channel coding section 12 is 0x006 0x199 0x1c5 . . . . 0x represents that values that follow thereafter are hexadecimal.

In the present embodiment, one symbol includes 10 bits, and, if the row-data string 0x006 0x199 0x1c5 . . . is represented in the unit of symbols, that is, in the unit of 10 bits, the string is a row-data bit string 0000000110 0110011001 0111000101 . . . .

At the channel coding section 12, the row data is channel-coded into k=4/ML=5 9-bit/4-cell codes in the unit of 9 bits according to the code LUT depicted in FIG. 8 to FIG. 13.

In view of this, if the row-data bit string 0000000110 0110011001 0111000101 . . . is represented in the unit of 9 bits, it becomes 000000011 001100110 010111000 . . . .

The 9-bit-unit row-data bit string 000000011 001100110 010111000 . . . is represented as 3 102 184 . . . in the decimal notation.

The 9-bit-unit row-data string 3 102 184 . . . is channel-coded into k=4/ML=5 9-bit/4-cell codes according to the code LUT depicted in FIG. 8 to FIG. 13. According to the channel coding, the row-data string 3 102 184 . . . is coded into an edge-code string 1211 1343 0134 . . . as cluster multilevel codes.

The edge-code string 1211 1343 0134 . . . as cluster multilevel codes like the one above is supplied from the channel coding section 12 to the frame configuring section 13.

The frame configuring section 13 arranges a 20-cell FS at the beginning of a frame. In addition, the frame configuring section 13 converts the edge codes as cluster multilevel codes into level codes.

Then, the frame configuring section 13 arranges level codes as cluster multilevel codes which are sixteen 240-cell code strings Code #1, Code #2, . . . , and Code #16 after the FS while performing DC control.

In DC control, when arranging each code string Code #i, a ML=5 multilevel code as a DCC cell that minimizes the absolute value of the DSV from the beginning of the frame to the end of the code string Code #i is added to the beginning of the code string Code #i.

The frame configuring section 13 performs DC control by using a built-in memory (not depicted) of the frame configuring section 13.

FIG. 26 depicts an example of storage content of the built-in memory of the frame configuring section 13 used for DC control.

In FIG. 26, an address ADDR represents, by the number of cells, a position as measured relative to the address ADDR of the beginning of a frame as the position of 0. The address ADDR of an (i+1)-th position (cell) from the beginning of a frame is i.

Since a 20-cell FS is arranged at the beginning of a frame, a DCC cell to be added to the beginning of a code string Code #1 being at the beginning is arranged at the address ADDR=20. Then, the code string Code #1 is arranged in 240 cells whose beginning is at the address ADDR=21, that is, at the addresses ADDR=21 to 260.

A level LVL #j represents a level code in a case where (the value of) a DCC cell is j. For example, in the column of the address ADDR=21, a level LVL0 is 1340. This 1340 represents that a 4-cell level code whose beginning is in the cell with the address ADDR=21 is 1340 in a case where the DCC cell is 0.

Note that an address ADDR represents the position of a level code being at the beginning of a level-code string as the level LVL #j described in the column of the address ADDR. For example, the level LVL0 is 2220 in the column of the address ADDR=257, and the address ADDR=257 represents the position of 2 in the first cell of 2220. Accordingly, the address ADDR of 0 in the last cell of 2220 is 260.

DCC #p represents a p-th DCC cell from the beginning of the frame. In the column of DCC #p, the level LVL #j represents the value (level code) j of the DCC cell #p.

DSV immediately below the level LVL #j represents the DSV in a case where the DCC cell is j.

In DC control, the frame configuring section 13 writes quinary values 0, 1, 2, 3, and 4 which are candidates of a DCC cell to be added to the beginning of the code string Code #1 being at the beginning, into the rows of the levels LVL0, LVL1, LVL2, LVL3, and LVL4, respectively, in the column of the address ADDR=20 immediately after the FS.

Thereafter, supposing that the DCC cell to be added to the beginning of the code string Code #1 is j, the frame configuring section 13 converts 240 cells from the first to 240th cells of an edge-code string as cluster multilevel codes into level codes as candidates of the code string Code #1.

As a result, regarding each of the candidates 0 to 4 of a DCC cell to be added to the beginning of the code string Code #1, a 240-cell level-code string as a candidate of the code string Code #1 is obtained.

The frame configuring section 13 writes the 240-cell level-code string as the candidates of the code string Code #1 regarding each of the DCC-cell candidates 0 to 4, at the addresses ADDR=21 to 260 in the rows of the levels LVL0 to LVL4.

For example, regarding the DCC-cell candidate 0 (LVL0), the edge-code string 1211 1343 0134 . . . as a cluster multilevel code described above is converted into a level-code string 1340 1431 1204 . . . , and written at the addresses ADDR=21 to 260 in the row of the level LVL0.

Specifically, for example, since the level code immediately before the first cell of the edge-code string 1211 is the DCC-cell candidate 0, the edge code 1 in the first cell is converted into the level code 1 counted rotatively by one from 0.

Since the level code immediately before the second cell of the edge-code string 1211 is the level code 1 obtained in the previous conversion, the edge code 2 in the second cell is converted into the counted level code 3 rotatingly by two from 1.

Since the level code immediately before the third cell of the edge-code string 1211 is the level code 3 obtained in the previous conversion, the edge code 1 in the third cell is converted into the level code 4 counted rotatingly by one from 3.

Since the level code immediately before the fourth cell of the edge-code string 1211 is the level code 4 obtained in the previous conversion, the edge code 1 in the fourth cell is converted into the counted level code 0 rotatingly by one from 4.

Also regarding the DCC-cell candidates 1 to 4 (LVL1 to LVL4) other than the DCC-cell candidate 0, similarly, the edge-code string 1211 1343 0134 . . . as a cluster multilevel code is converted into a level-code string as candidates of the code string Code #1. Then, the level codes as candidates of the code string Code #1 regarding each of the DCC-cell candidates 1 to 4 (LVL 1 to LVL 4) are written at the addresses ADDR=21 to 260 in the rows of the levels LVL1 to LVL4.

The frame configuring section 13 computes the DSV of each level LVL #j from the beginning of the frame to the level code written at the address ADDR=260.

Here, the DSV of an FS is 0 as explained with reference to FIG. 15. Accordingly, the DSVs of the DCC-cell candidates 0 to 4 written at the address ADDR=20 immediately after an FS (from the beginning of the frame) regarding each of the levels LVL0 to LVL4 are equal to NRZ codes −4, −2, 0, +2, and +4 of the DCC-cell candidates 0 to 4.

The frame configuring section 13 detects a level (hereinafter, also referred to as a minimum DSV level) LVL #j having the smallest absolute value of the DSV until the level code written at the address ADDR=260.

The frame configuring section 13 fixes a DCC-cell candidate j of the minimum DSV level LVL #j as a DCC cell to be added to the beginning of the code string Code #1. Further, the frame configuring section 13 fixes, as the code string Code #1, the level codes as the candidates of the code string Code #1 written at the addresses ADDR=21 to 260 of the minimum DSV level LVL #j.

Then, the frame configuring section 13 adds the fixed DCC cell to the beginning of the fixed code string Code #1, and arranges them after the FS.

In FIG. 26, the DSVs until the level codes written at the address ADDR=260 regarding the levels LVL0 to LVL4 are −76, −4, 58, 30, and −8. Accordingly, since the DSV having the smallest absolute value is −4 of the level LVL1, the level LVL1 is detected as the minimum DSV level.

Then, the DCC-cell candidate 1 of the minimum DSV level LV1 is fixed as a DCC cell to be added to the beginning of the code string Code #1. Further, the level codes as the candidates of the code string Code #1 written at the addresses ADDR=21 to 260 of the minimum DSV level LVL1 are fixed as the code string Code #1.

Next, the frame configuring section 13 writes quinary values 0 to 4 which are candidates of a DCC cell to be added to the beginning of the second code string Code #2, into the rows of the levels LVL0 to LVL4, respectively, in the column of the address ADDR=261 immediately after the code string #1.

Supposing that the DCC cell to be added to the beginning of the code string Code #2 is j, the frame configuring section 13 converts 240 cells from the 241st to 480th cells of an edge-code string as cluster multilevel codes into level codes as candidates of the code string Code #2.

As a result, regarding each of the candidates 0 to 4 of a DCC cell to be added to the beginning of the code string Code #2, a 240-cell level-code string as a candidate of the code string Code #2 is obtained.

The frame configuring section 13 writes the 240-cell level-code string as the candidates of the code string Code #2 regarding each of the DCC-cell candidates 0 to 4, at the addresses ADDR=262 to 501 in the rows of the levels LVL0 to LVL4.

The frame configuring section 13 computes the DSV of each level LVL #j from the beginning of the frame to a level code written at the address ADDR=501.

The computation of the DSV is performed by using, as a reference, DSV=−4 until the last cell of the code string Code #1 fixed immediately before, that is, the level code written at the address ADDR=260.

Accordingly, the DSVs of the DCC-cell candidates 0 to 4 written at the address ADDR=261 immediately after the code string Code #1 fixed immediately before regarding each of the levels LVL0 to LVL4 are −8, −6, −4, −2, and 0 that are obtained by adding the NRZ codes −4, −2, 0, +2, and +4 of the DCC-cell candidates 0 to 4, respectively, to DSV=−4 which serves as the reference.

The frame configuring section 13 detects the minimum DSV level LVL #j having the smallest absolute value of the DSV until the level code written at the address ADDR=501.

The frame configuring section 13 fixes a DCC-cell candidate j of the minimum DSV level LVL #j as a DCC cell to be added to the beginning of the code string Code #2. Further, the frame configuring section 13 fixes, as the code string Code #2, the level codes as the candidates of the code string Code #2 written at the addresses ADDR=262 to 501 of the minimum DSV level LVL #j.

Then, the frame configuring section 13 adds the fixed DCC cell to the beginning of the fixed code string Code #2, and arranges them after the code string Code #1.

In FIG. 26, the DSVs until the level codes written at the address ADDR=501 regarding the levels LVL0 to LVL4 are −10, −38, 84, −24, and −32. Accordingly, since the DSV having the smallest absolute value is −10 of the level LVL0, the level LVL0 is detected as the minimum DSV level.

Then, the DCC-cell candidate 0 of the minimum DSV level LVL0 is fixed as a DCC cell to be added to the beginning of the code string Code #2. Further, the level codes as the candidates of the code string Code #2 written at the addresses ADDR=262 to 501 of the minimum DSV level LVL0 are fixed as the code string Code #2.

Thereafter, similarly, the frame configuring section 13 arranges the code strings Code #3 to Code #16, and configures the frame while performing addition of DCC cells as DC control.

<Detection of Particular Patterns>

Figure 27:
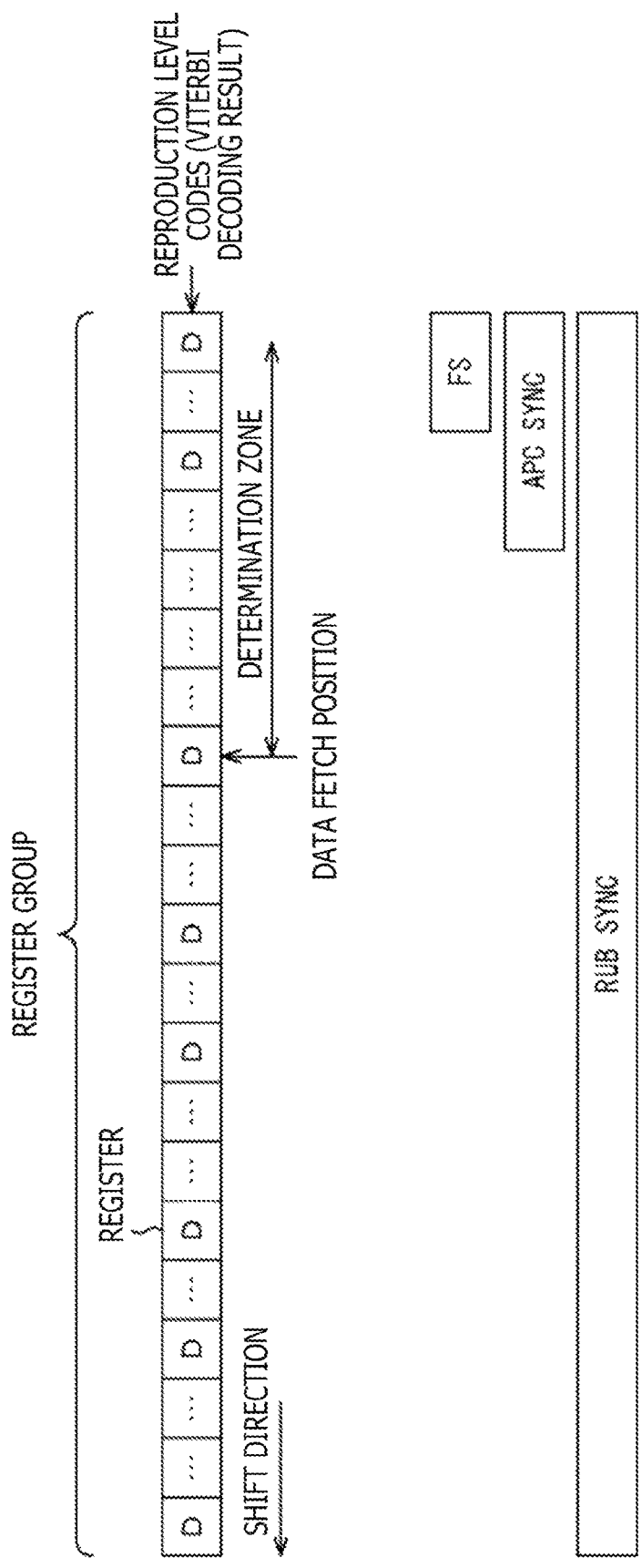
FIG. 27 is a figure for explaining an example of detection of particular patterns at a sync detecting section 18.

FIG. 27 is a figure for explaining an example of detection of particular patterns at the sync detecting section 18.

The sync detecting section 18 is supplied, from the signal processing section 17, with a multilevel-code level-code string as a Viterbi decoding result of a reproduction signal, for example. The sync detecting section 18 detects, as particular patterns, an RUB SYNC in a Run-in, an FS, and an APC SYNC from the level-code string supplied from the signal processing section 17.

The sync detecting section 18 has the register group depicted in FIG. 27. The register group includes a plurality of registers D that stores thereon ML=5 level codes and is connected sequentially.

The number of the registers D included in the register group is equal to or greater than the number of cells of the longest particular pattern to be detected at the sync detecting section 18. In FIG. 27, the number of registers D included in the register group is equal to the number of cells of the RUB SYNC which is 360.

At the register group, the register D at the first stage (the rightmost register D in FIG. 27) is supplied with a level code (hereinafter, also referred to as a reproduction level code) from the signal processing section 17.

The register D at the first stage latches the latest reproduction level code supplied from the signal processing section 17, and each of the other registers D latches a stored value of the previous register D (the register D next to it on the right in FIG. 27). The reproduction-level-code string supplied to the register group from the signal processing section 17 thereby shifts from the rightmost register D to the leftmost register D. As a result, the reproduction-level-code string from the signal processing section 17 is stored on the registers D included, in the register group in chronological order from the leftmost register D to the rightmost register D.

When the latest reproduction level code is stored on the rightmost register D, the sync detecting section 18 computes the dissimilarity between a reproduction-level-code string $C(t-(L-1))$, $C(t-(L-2))$, . . . , and $C(t)$ stored on L registers including the rightmost register D and registers that follow, L being equal to the number L of cells of a particular pattern, and a level-code string $S(0)$, $S(1)$, . . . , and $S(L-1)$ as the particular pattern.

$C(t)$ represents the latest reproduction level code stored on the rightmost register D, that is, a reproduction level code of the latest time t.

The dissimilarity represents the degree of dissimilarity between two multilevel-code strings. The value of the dissimilarity assumes a predetermined minimum value, for example, 0, in a case where the two strings are the same, and increases as the degree of dissimilarity increases.

The dissimilarity $IXC(t)$ between the reproduction-level-code string $C(t-(L-1))$ to $C(t)$ and the level-code string $S(0)$ to $S(L-1)$ as a particular pattern can be computed according to a formula $IXC(t)=\Sigma abs(ZC(t-i)-ZS(i))$, for example.

In the formula $IXC(t)=\Sigma abs(ZC(t-i)-ZS(i))$, $\Sigma$ represents the summation that varies as i changes from 0 to L−1. In addition, $abs()$ represents the absolute value of a value in the parentheses. $ZC(t-i)$ and $ZS(i)$ represent NRZ codes of a reproduction level code $C(t-i)$ and a level code $S(i)$ as a particular pattern, respectively.

Note that, according to the formula $IXC(t)=\Sigma abs(ZC(t-i)-ZS(i))$, the dissimilarity is computed as the sum of absolute values of the difference $ZC(t-i)-ZS(i)$ between the NRZ codes of the reproduction level code $C(t-i)$ and the level code $S(i)$ included in the particular pattern. In addition to the sum of absolute values of the difference $ZC(t-i)-ZS$ (i), a value corresponding to the magnitude of the difference $ZC(t-i)-ZS(i)$, such as the sum of squares of the difference $ZC(t-i)-ZS(i)$, can be adopted as the dissimilarity.

The sync detecting section 18 detects a particular pattern according to the dissimilarity $IXC(t)$ between the reproduction-level-code string $C(t-(L-1))$ to $C(t)$ and the level-code string $S(0)$ to $S(L-1)$ as a particular pattern.

That is, in a case where dissimilarity $IXC(t)$ which is equal to or lower than a threshold is detected, the sync detecting section 18 detects, as the terminating position of a particular pattern, the position of the reproduction level code $C(t)$ at which the dissimilarity $IXC(t)$ is detected, and detects, as the level-code string $S(0)$ to $S(L-1)$ of the particular pattern, the L-cell reproduction-level-code string $C(t-(L-1))$ to $C(t)$.

Note that, in a case where dissimilarity v which is equal to or lower than the threshold is detected and thereafter dissimilarity lower than the dissimilarity v is not detected in a determination zone (predetermined zone) as a length of time corresponding to a predetermined number of cells, the sync detecting section 18 can detect a particular pattern determining, as the terminating position of the particular pattern, the position of the reproduction level code at which the dissimilarity v is detected.

The position of a register D which is (the number of cells corresponding to) the determination zone apart from the rightmost register D is defined as a data fetch position. When the position of a reproduction level code at which the dissimilarity v is detected is detected as the (terminating) position of a particular pattern in a case where dissimilarity lower than the dissimilarity v which is equal to or lower than the threshold is not detected in the determination zone, the position of a reproduction level code at which the minimum value of the dissimilarity is detected in a zone which is twice as large as the determination zone centered on the data fetch position is detected as the position of the particular pattern in a case where the minimum value of the dissimilarity is equal to or lower than the threshold.

In this case, when dissimilarity v2 which is equal to or lower than the threshold but is higher than dissimilarity v1 which is equal to or lower than the threshold is obtained near the dissimilarity v1, it is possible to prevent incorrect detection, as the position of a particular pattern, of the position of a reproduction level code at which the dissimilarity v2 is detected.

Figure 28:
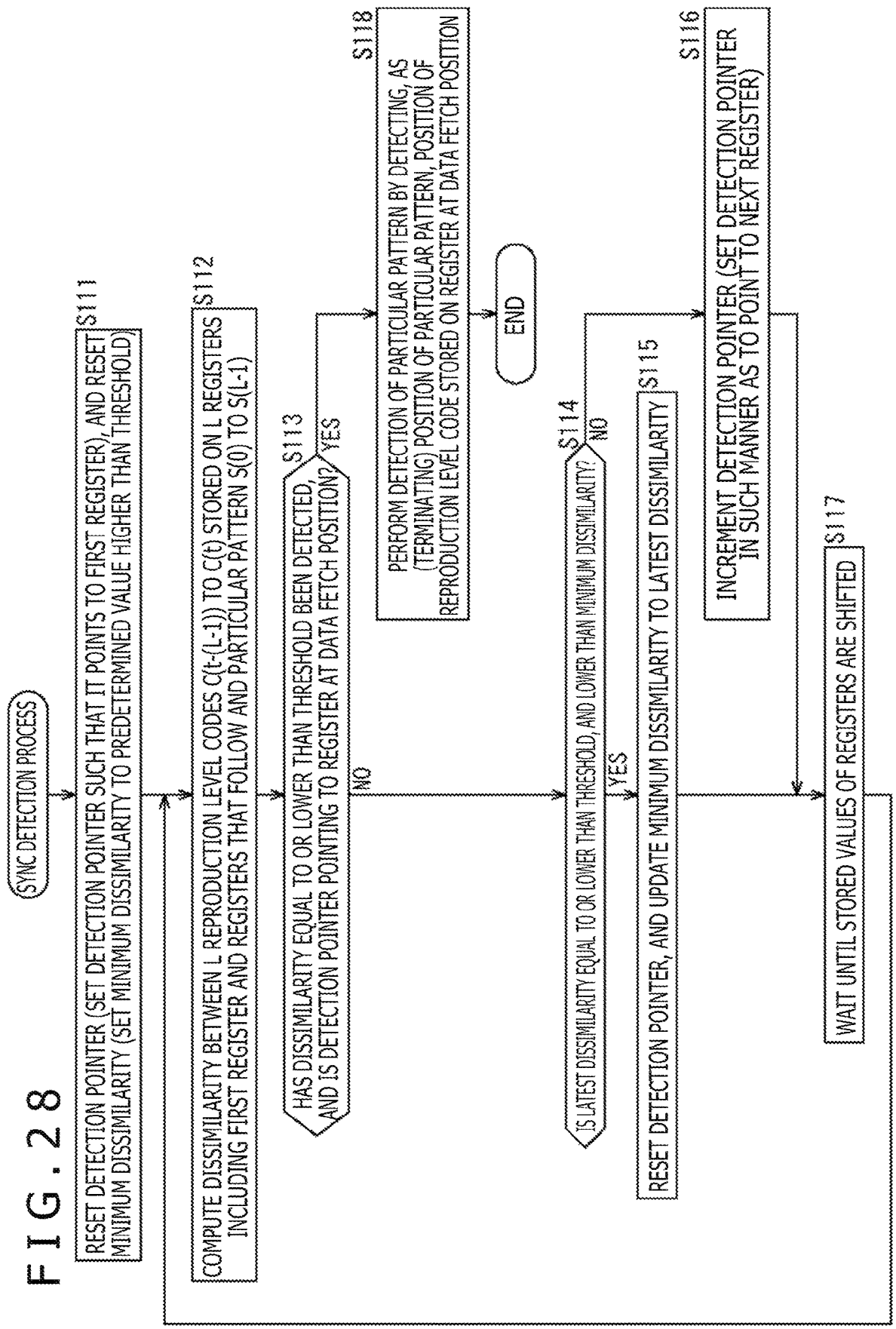
FIG. 28 is a flowchart for explaining an example of a detection process of detecting a particular pattern.

FIG. 28 is a flowchart for explaining an example of a detection process of detecting a particular pattern.

In Step S111, the sync detecting section 18 resets a detection pointer pointing to the position of a register D in the built-in register group (FIG. 27). When the detection pointer is reset, the detection pointer is set in such a manner as to point to the register D at the beginning (at the rightmost position) in the register group.

Further, in Step S111, the sync detecting section 18 resets minimum dissimilarity representing the minimum value of the dissimilarity, and the process proceeds to Step S112. When the minimum dissimilarity is reset, the minimum dissimilarity is set to a predetermined value greater than a threshold (a similarity threshold).

In Step S112, the sync detecting section 18 computes the dissimilarity $IXC(t)$ between the string $C(t-(L-1))$ to $C(t)$ including L reproduction level codes and being stored on L registers D including the register D at the beginning of the register group and registers that follow and the level-code string $S(0)$ to $S(L-1)$ of a particular pattern with the number of cells which is equal to L, and the process proceeds to Step S113.

In Step S113, the sync detecting section 18 determines whether or not dissimilarity which is equal to or lower than the threshold has already been detected (computed) in the detection process being currently executed and the detection pointer points to a register D at the data fetch position.

In a case where it is determined in Step S113 that dissimilarity which is equal to or lower than the threshold has not been detected or that the detection pointer is not pointing to the register D at the data fetch position, the process proceeds to Step S114.

In Step S114, the sync detecting section 18 determines whether or not the latest dissimilarity $IXC(t)$ is equal to or lower than the threshold and is lower than the minimum dissimilarity.

In a case where it is determined in Step S114 that the latest dissimilarity $IXC(t)$ is equal to or lower than the threshold and is lower than the minimum dissimilarity, that is, in a case where dissimilarity $IXC(t)$ which is equal to or lower than the threshold and is lower than the minimum dissimilarity is computed, the process proceeds to Step S115.

In Step S115, the sync detecting section 18 resets the detection pointer as in Step S111. Further, in Step S115, the sync detecting section 18 updates the minimum dissimilarity to the latest dissimilarity $IXC(t)$, and the process proceeds to Step S117.

In addition, in a case where it is determined in Step S114 that the latest dissimilarity $IXC(t)$ is not equal to or lower than the threshold or is not lower than the minimum dissimilarity, the process proceeds to Step S116.

That is, for example, in a case where the dissimilarity $IXC(t)$ is not equal to or lower than the threshold or in a case where the dissimilarity $IXC(t)$ is equal to or lower than the threshold but not lower than the minimum dissimilarity, the process proceeds from Step S114 to Step S116.

In Step S116, the sync detecting section 18 increments the detection pointer, and the process proceeds to Step S117. When the detection pointer is incremented, the detection pointer is set in such a manner as to point to the register D next to (the register D next to and on the left of) the current register D.

In Step S117, a reproduction level code is newly supplied to the register D at the beginning of the register group, the process waits until the stored value (reproduction level code) of each register D is shifted, and returns to Step S112, and similar processes are repeated thereafter.

Then, in a case where it is determined in Step S113 that dissimilarity which is equal to or lower than the threshold has been detected and the detection pointer points to a register D at the data fetch position, the process proceeds to Step S118.

That is, in a case where the determination zone has passed after detection of dissimilarity which is equal to or lower than the threshold, the process proceeds from Step S113 to Step S118.

In Step S118, the sync detecting section 18 detects a particular pattern by detecting, as the (terminating) position of the particular pattern, the position of a reproduction level code stored on the register D at the data fetch position, and the particular pattern detection process is ended. The particular pattern detection process is executed again after it is ended.

According to the detection process in FIG. 28, in a case where the dissimilarity v which is equal to or lower than the threshold is detected, if there is not dissimilarity which is lower than the dissimilarity v in a determination zone centered on the position (time) of a reproduction level code at which the dissimilarity v is obtained, the position of the reproduction level code at which the dissimilarity v is obtained is detected as the position of a particular pattern.

Accordingly, in a case where dissimilarity which is equal to or lower than the threshold is detected at a position other than the position of the particular pattern, it is possible to inhibit incorrect detection of the position as the position of a particular pattern.

Note that, in the present embodiment, as dissimilarity representing the degree of dissimilarity between two multi-level-code strings, a value corresponding to the magnitude of the difference between NRZ codes of a reproduction-level-code string and a particular pattern is adopted, and a particular pattern is detected according to such dissimilarity.

Detection of a particular pattern can be performed by other manners, for example, according to similarity representing the degree of similarity between a reproduction-level-code string and a particular pattern.

For example, a cross-correlation value $XC(K)=Z(NA(i) \times NB(i))$ of the multilevel-code strings A and B explained in FIG. 18 can be adopted as similarity between a reproduction-level-code string and a particular pattern.

Since the cross-correlation value $XC(K)$ increases as the similarity between a reproduction-level-code string and a particular pattern increases, the position of a level code having similarity which is equal to or greater than a threshold can be detected as the position of a particular pattern in a case where the cross-correlation value $XC(K)$ is adopted as similarity.

However, since the maximum value that can be assumed by the cross-correlation value $XC(K)$ of a reproduction-level-code string and a particular pattern changes depending on particular patterns and their lengths (numbers of cells), it is not easy to set an appropriate threshold in a case where such a cross-correlation value $XC(K)$ is adopted as similarity.

Meanwhile, as explained with reference to FIG. 27, the value of the dissimilarity $IXC(t)$ computed according to the formula $IXC(t)=\Sigma abs(ZC(t-i)-ZS(i))$ assumes 0, which is the minimum value, in a case where the reproduction-level-code string $C(t-(L-1))$ to $C(t)$ and the level-code string $S(0)$ to $S(L-1)$ as a particular pattern match, and increases as the degree of dissimilarity between the reproduction-level-code string $C(t-(L-1))$ to $C(t)$ and the level-code string $S(0)$ to $S(L-1)$ as the particular pattern increases.

Accordingly, the dissimilarity threshold for detecting a particular pattern can be set easily by using 0, which is the minimum value, as a reference.

Figure 29:
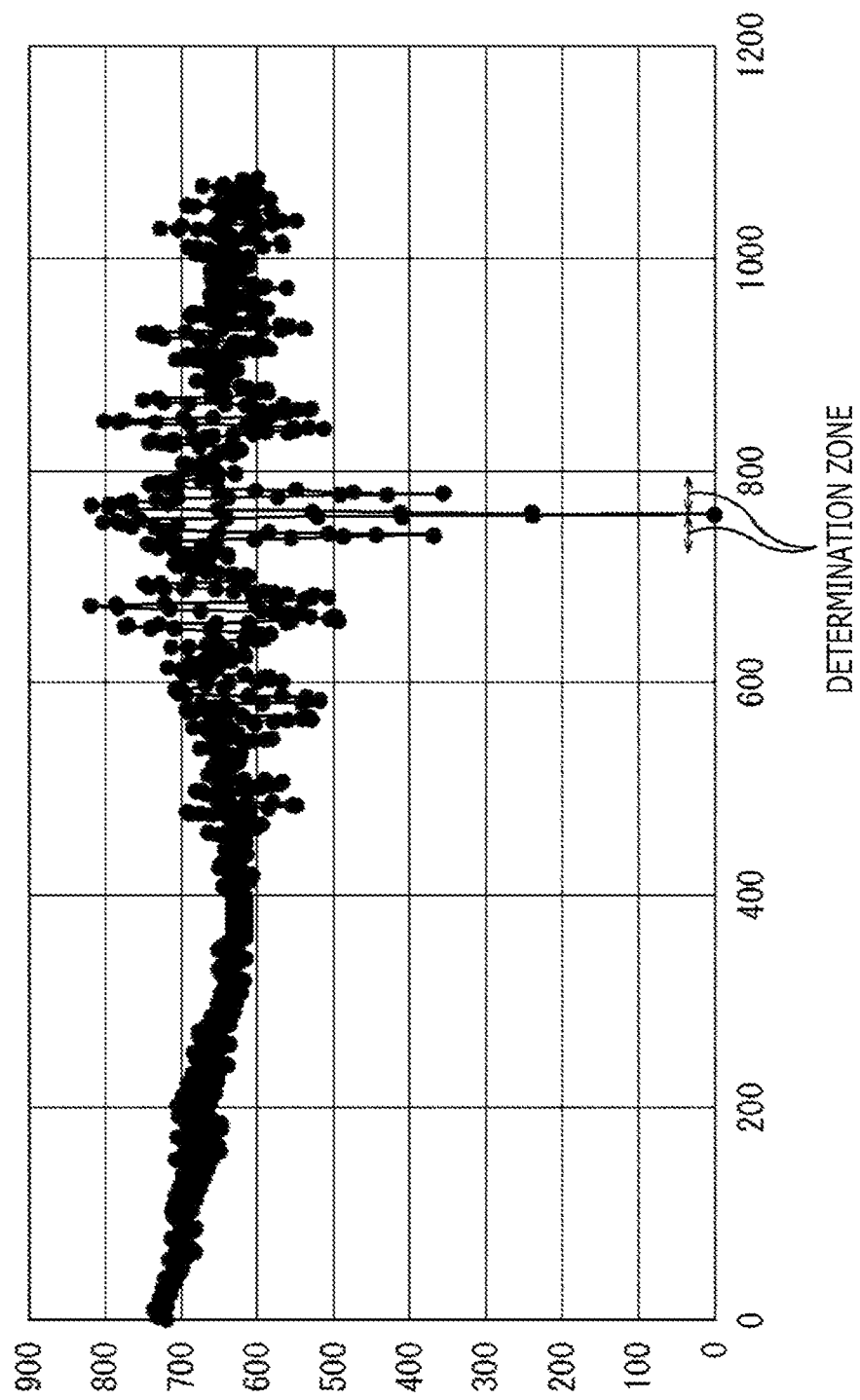
FIG. 29 is a figure depicting an example of dissimilarity computed in a simulation.

FIG. 29 is a figure depicting an example of dissimilarity computed in a simulation.

In FIG. 29, the horizontal axis represents time (the number of cells of a reproduction level code) t, and the vertical axis represents dissimilarity $IXC(t)$.

In the simulation, a detection process of detecting an RUB SYNC as a particular pattern from a reproduction-level-code string obtained by Viterbi decoding of a reproduction signal of the groove G was executed.

FIG. 29 depicts dissimilarity in a case where the cER (cell error rate) of the reproduction level code is 0.

In the simulation, the position of (the termination of) the RUB SYNC is at time t=759 in the reproduction-level-code string.

In FIG. 29, the dissimilarity $IXC(759)$ is 0, which is the minimum value, at the certain time t=759 which corresponds to the position of the RUB SYNC.

Near time t=759, there are negative peaks (downward-pointing peaks) of the dissimilarity $IXC(t)$ also before and after time t=759, in addition to at time t=759. It should be noted that the dissimilarity $IXC(t)$ of the negative peaks before and after time t=759 is approximately 350. Accordingly, by setting the threshold of the dissimilarity $IXC(t)$ to approximately 200, for example, the RUB SYNC at the position of time t=759 can be detected correctly.

Note that, in a case where the threshold is set to 400 in FIG. 29, for example, the dissimilarity $IXC(t)$ of approximately 350 before and after time t=759 is also dissimilarity equal to or lower than the threshold, in addition to the dissimilarity $IXC(759)$ at time t=759.

It should be noted that the dissimilarity $IXC(t)$ of approximately 350 before and after time t=759 is in the determination zone from time t=759 where there is the minimum dissimilarity $IXC(759)$. In this case, according to the detection process in FIG. 28, not the positions of the dissimilarity $IXC(t)$ which is approximately 350 before and after time t=759, but time t=759 where there is the minimum dissimilarity $IXC(759)$ is detected correctly as the position of the particular pattern.

Figure 30:
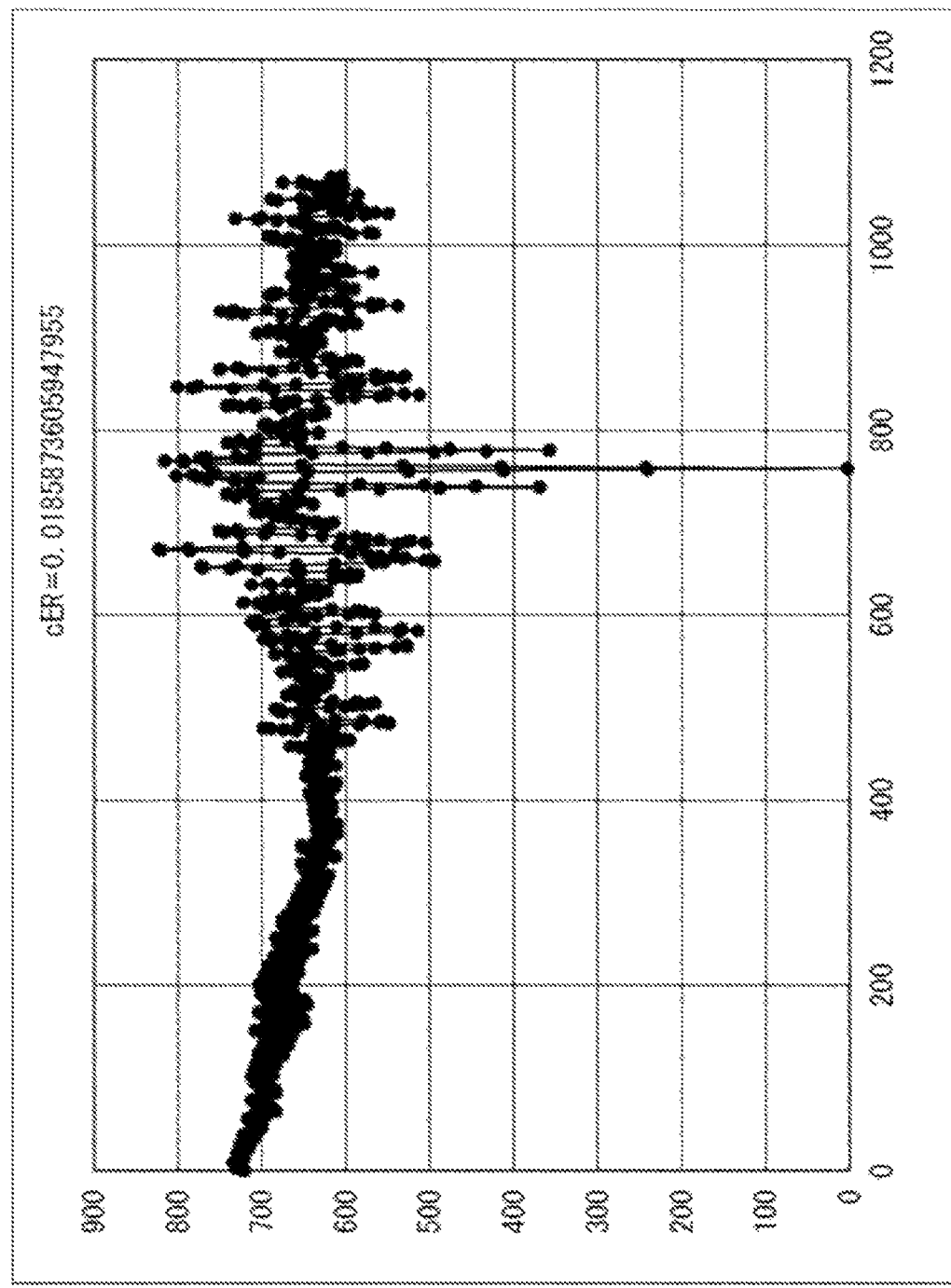
FIG. 30 is a figure depicting a first alternative example of dissimilarity computed in a simulation.
Figure 31:
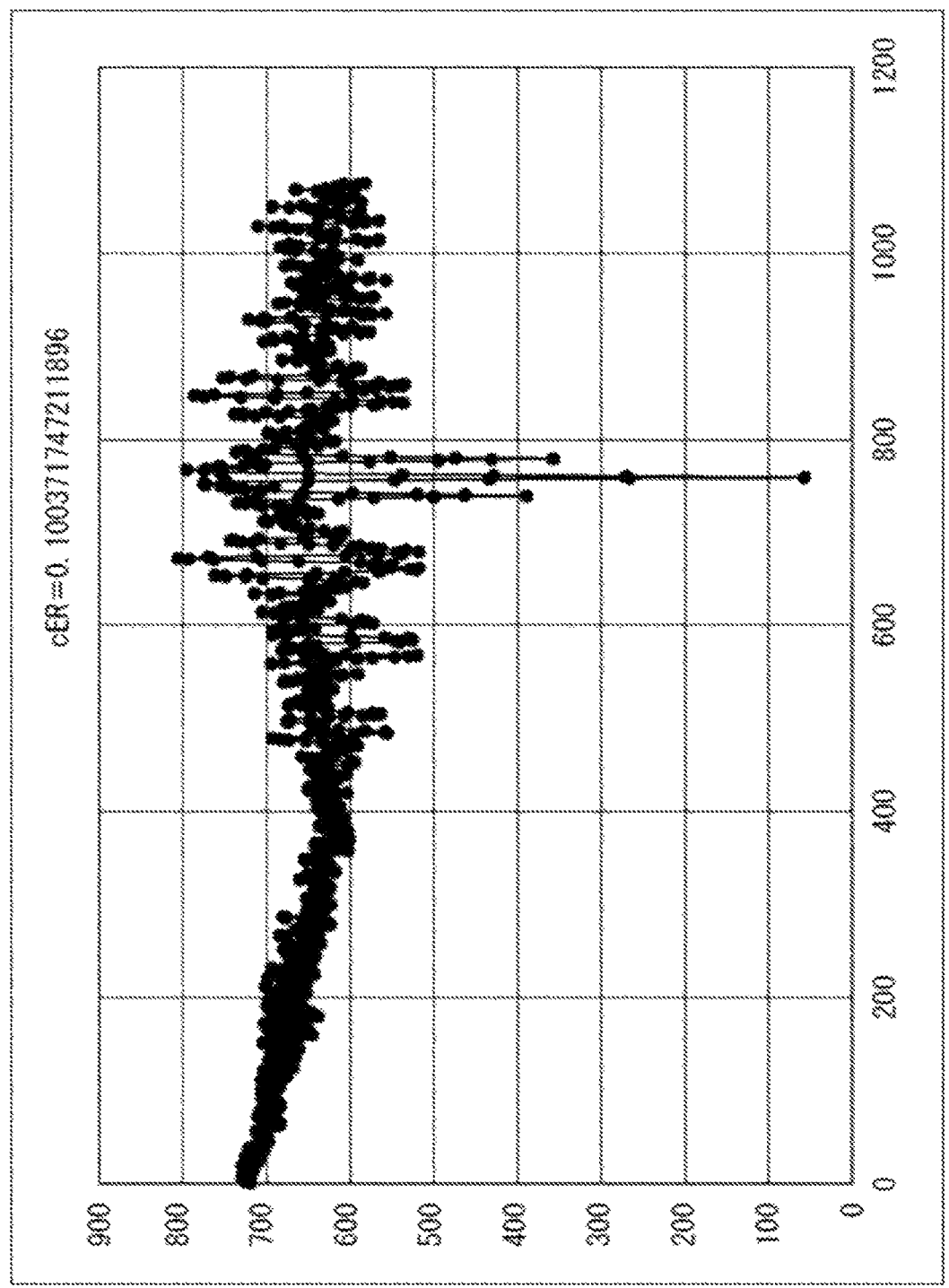
FIG. 31 is a figure depicting a second alternative example of dissimilarity computed in a simulation.
Figure 32:
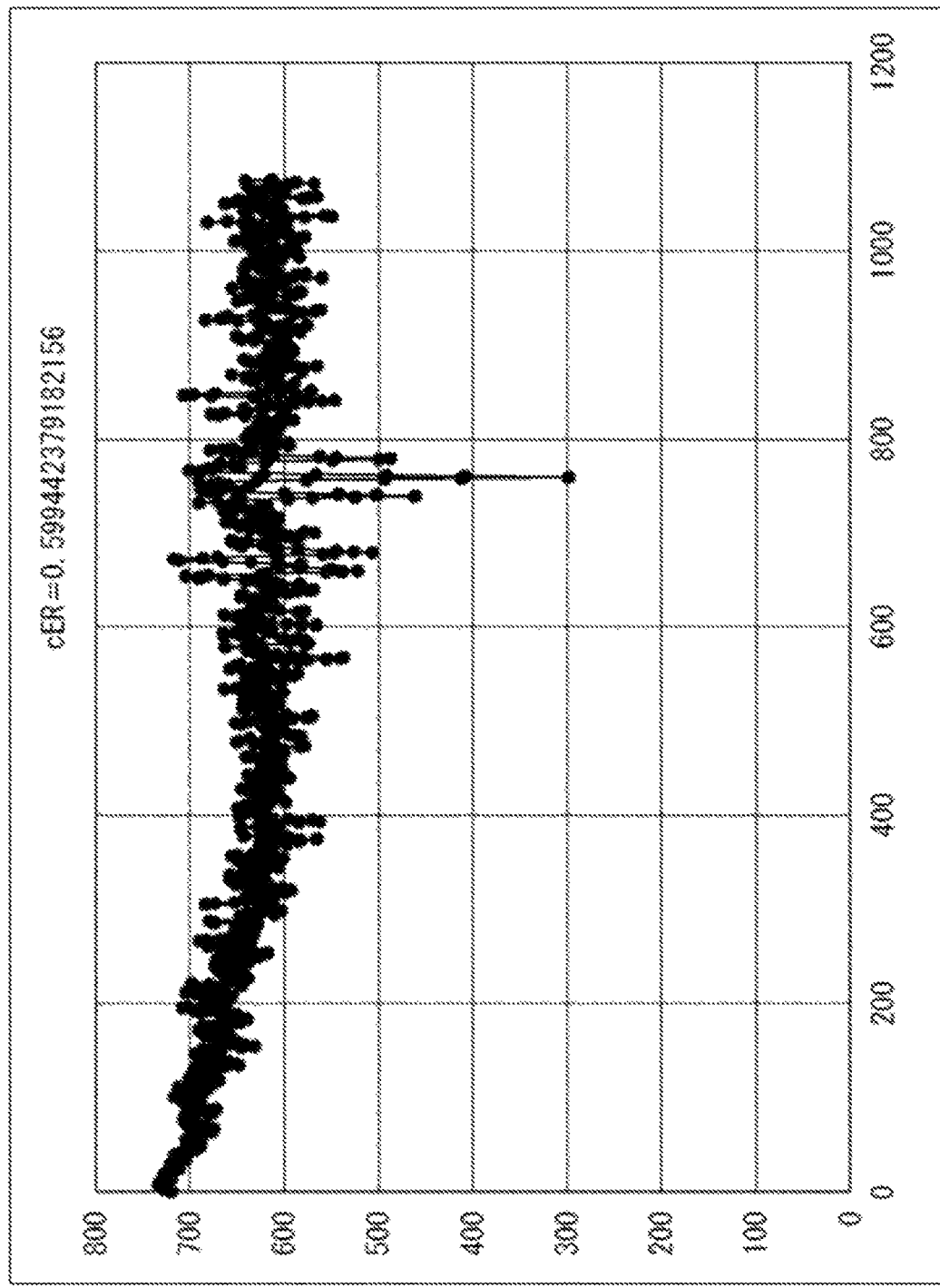
FIG. 32 is a figure depicting a third alternative example of dissimilarity computed in a simulation.

FIG. 30 is a figure depicting a first alternative example of dissimilarity computed in a simulation. FIG. 31 is a figure depicting a second alternative example of dissimilarity computed in a simulation. FIG. 32 is a figure depicting a third alternative example of dissimilarity computed in a simulation.

As in the case of FIG. 29, in the simulations, a detection process of detecting an RUB SYNC as a particular pattern from a reproduction-level-code string obtained by Viterbi decoding of a reproduction signal of the groove G was executed. The position of the RUB SYNC is at time t=759 in the reproduction-level-code string, as in the case of FIG. 29.

In FIG. 30 to FIG. 32, similarly to FIG. 29, the horizontal axis represents time t, and the vertical axis represents dissimilarity $IXC(t)$.

FIG. 30 depicts dissimilarity in a case where the cER of the reproduction level code is approximately 0.018. FIG. 31 depicts dissimilarity in a case where the cER of the reproduction level code is approximately 0.100. FIG. 32 depicts dissimilarity in a case where the cER of the reproduction level code is approximately 0.599.

It can be confirmed according to FIG. 30 to FIG. 32 that, in a case where cER is equal to or lower than approximately 0.1 (FIG. 30 and FIG. 31), the RUB SYNC as the particular pattern can be detected sufficiently accurately by setting the threshold to approximately 200.

In addition, it can be confirmed that, even in a case where cER is considerably low and is approximately 0.5 (FIG. 32), the RUB SYNC as the particular pattern can be detected sufficiently accurately by setting the threshold to approximately 300.

<Advantages of DC Control>

Figure 33:
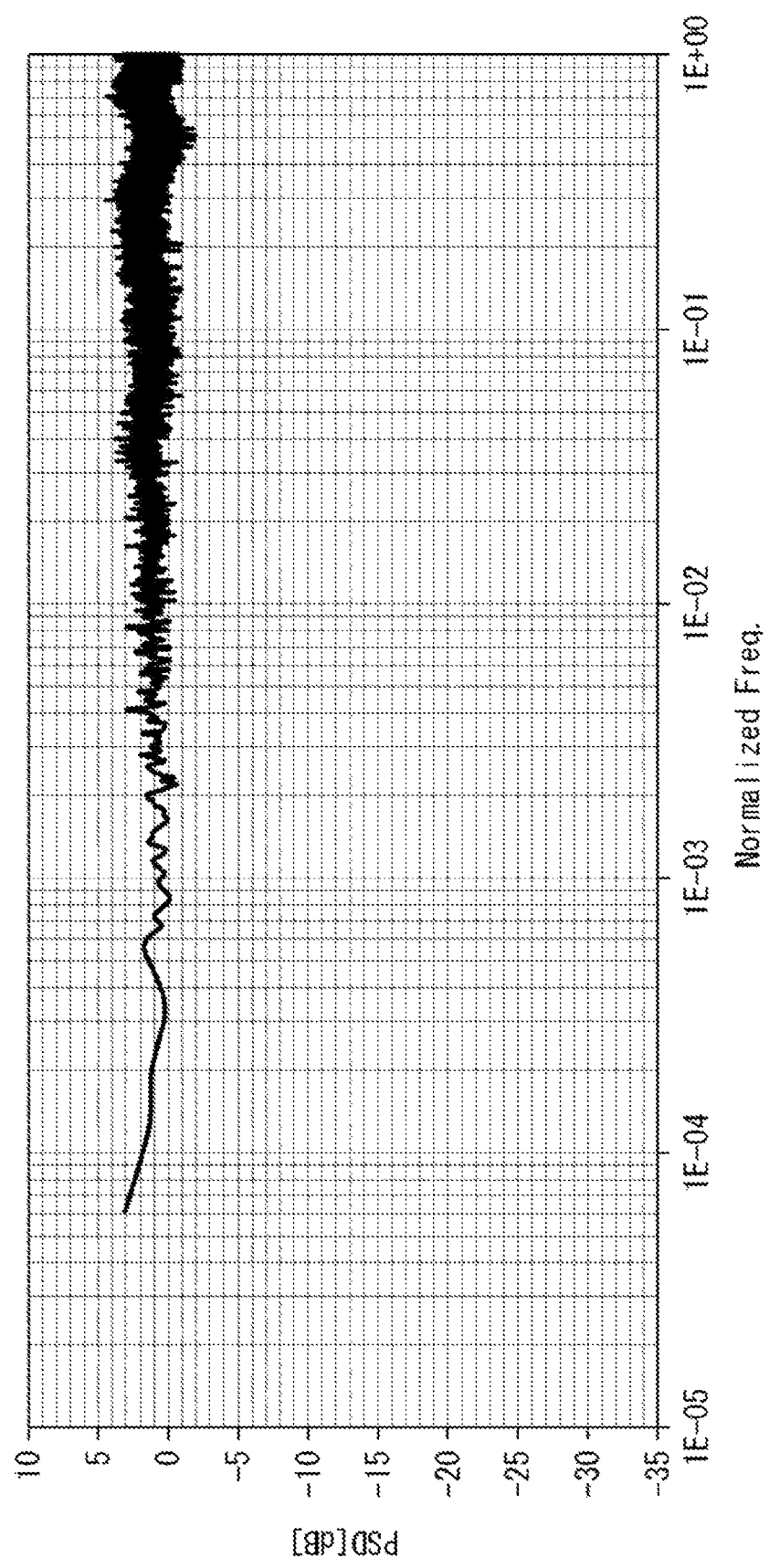
FIG. 33 is a figure for explaining advantages of DC control of multilevel codes.
Figure 34:
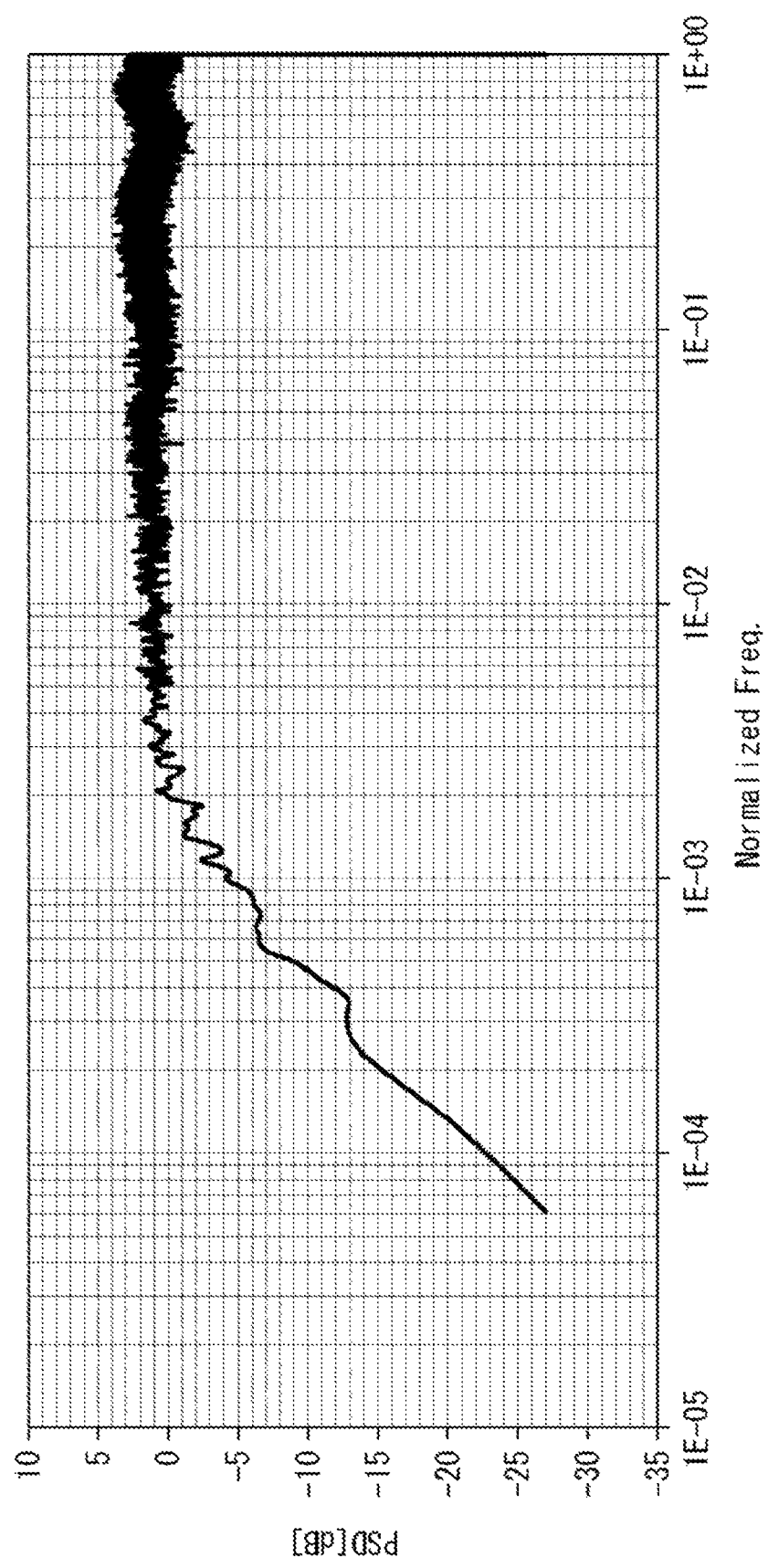
FIG. 34 is a figure for explaining advantages of DC control of multilevel codes.
Figure 35:
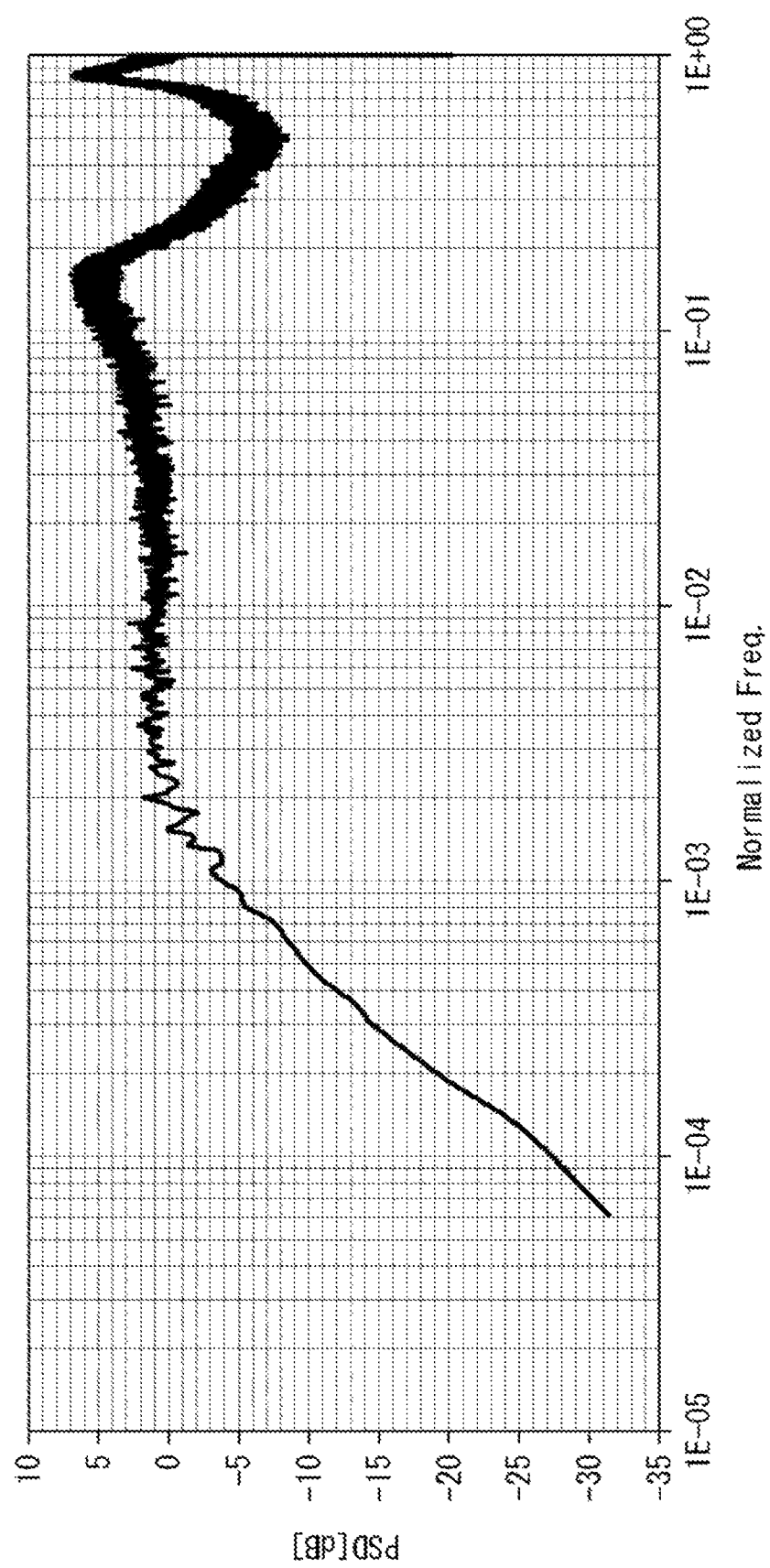
FIG. 35 is a figure for explaining advantages of DC control of multilevel codes.

FIG. 33, FIG. 34, and FIG. 35 are figures for explaining advantages of DC control of multilevel codes.

FIG. 33 depicts power spectrum density (PSD) of an ML=5 multilevel-code string obtained in a case where DC control of multilevel codes is not performed, that is, obtained by configuring a frame by adding, as a DCC cell, for example, 0 as a fixed level code.

In FIG. 33, the horizontal axis represents normalized frequency, and the vertical axis represents PSD. This similarly applies to FIG. 34 and FIG. 35.

It can be confirmed according to FIG. 33 that, in a case where DC control of multilevel codes is not performed, the PSD is approximately 0 dB even with the normalized frequency of approximately 1e-4 (=0.0001), and low-frequency components are not reduced.

FIG. 34 depicts the PSD of an ML=5 multilevel-code string in a case where DC control of multilevel codes is performed.

It can be confirmed according to FIG. 34 that, in a case where DC control of multilevel codes is performed, the PSD is approximately −23 dB with the normalized frequency of approximately 1e-4 and low-frequency components are reduced.

FIG. 35 depicts the PSD of a string of binary PCWA (Parity-Complementary Word Assignment) 100 codes adopted as channel codes for AD (Archival Disc) 2.

AD2 is an optical disc standard capable of high-density recording of data, and details are described in "White Paper: Archival Disc Technology 2nd Edition," July 2018, for example.

In AD2, PCWA110 codes which are binary codes with a coding rate of 2/3 are adopted as channel codes. PCWA110 codes are described in Japanese Patent No. 4998472, for example.

In AD2, DC control is performed by adding 1-bit DCC bit to every 59-bit user data. Accordingly, for a PCWA110-code string obtained by channel-coding user data into PCWA110 codes with the coding rate of 2/3, DC control is performed in the unit of PCWA110-code strings of 90 T (90 bits). T represents the cycle of a channel clock.

It can be confirmed according to FIG. 34 and FIG. 35 that DC control of multilevel codes (FIG. 34) attains advantages of reduction of low-frequency components equivalent to AD2 (FIG. 35).

In the present technology, DC control of multilevel codes is performed in the unit of multilevel-code strings of 240 cells (240 T) as explained with reference to FIG. 15 and FIG. 26.

Accordingly, DC control of multilevel codes according to the present technology can be performed more efficiently than in a case of AD2.

That is, with DC control of multilevel codes according to the present technology, it is possible to attain performance regarding reduction of low-frequency components which is equivalent to that of DC control of binary PCWA110 codes, by DC control performed at a cycle longer than (with frequency lower than) that of DC control of binary PCWA110 codes.

<Required SNR>

Figure 36:
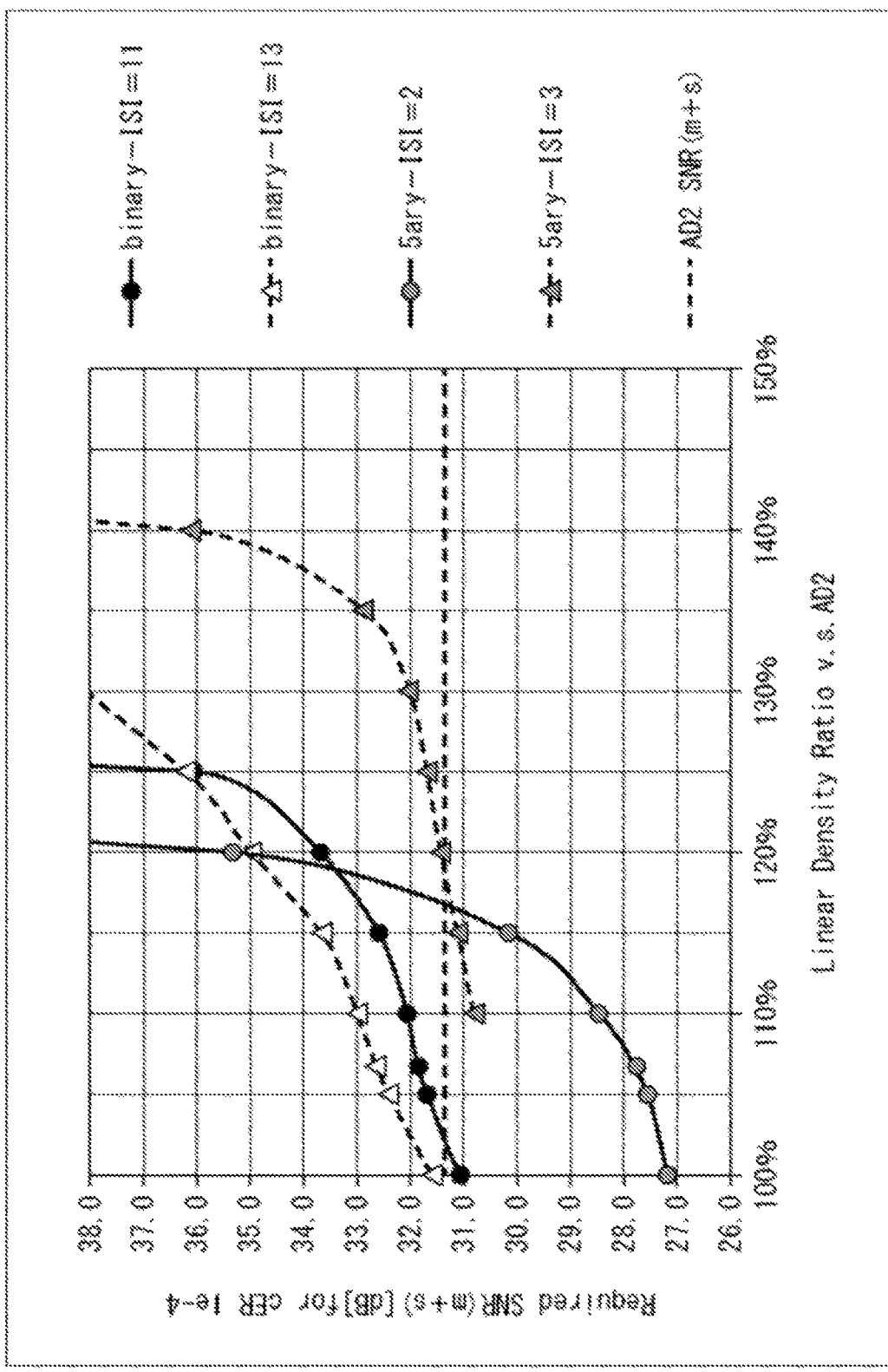
FIG. 36 is a figure depicting an example of a required SNR as decoding performance of multilevel codes.

FIG. 36 is a figure depicting an example of a required SNR as decoding performance of multilevel codes.

In FIG. 36, the horizontal axis represents linear density of recording on the optical disc 16 as a ratio to linear density of AD2. The vertical axis represents a required SNR which is an SNR (Signal to Noise Ratio) required to obtain cER of 1e-4 (=0.0001).

As the required SNR decreases, the amount of noise in a reproduction signal that can be tolerated for obtaining a desired cER increases. Accordingly, a low required SNR represents good code (information) decoding performance.

In FIG. 36, required SNRs obtained by a simulation performed by the present inventor about binary PCWA110 codes and ML=5 multilevel codes (quinary codes) are plotted.

In FIG. 36, binary-ISI=11 represents a required SNR of PCWA110 codes in a case where the ISI (Inter-Symbol Interference) length which is a length of inter-code interference is 11 T. binary-ISI=13 represents a required SNR of PCWA110 codes in a case where the ISI length is 13 T. 5-ary-ISI=2 represents a required SNR of quinary codes in a case where the ISI length is 2 T (2-cell). 5-ary-ISI=3 represents a required SNR of quinary codes in a case where the ISI length is 3 T.

In addition, in FIG. 5, a required SNR of AD2 is represented by a dotted line.

It can be confirmed according to FIG. 36 that quinary codes (5-ary-ISI=3) with the ISI length of 3 T can achieve the decoding performance equivalent to that of AD2, with linear density which is 120% of that of AD2.

Accordingly, according to quinary codes (5-ary-ISI=3) with the ISI length of 3 T, the linear density can be enhanced by 20% when it is aimed to realize decoding performance which is equivalent to that of AD2.

Here, the ratio of the amount of data of user data included in an RUB to the amount of data of the RUB is defined as format efficiency.

While the format efficiency of an RUB of AD2 is approximately 87.9%, the format efficiency of an RUB in FIG. 17 configured with quinary codes is approximately 88.051%. Accordingly, with the RUB of quinary codes, the format efficiency improves by approximately 0.2% over AD2.

Accordingly, by using quinary codes, the linear density can be enhanced by 20% as compared with AD2, without deterioration of the format efficiency.

Whereas, in the case explained thus far, k=4/ML=5 9-bit/4-cell codes are used as block codes including multilevel codes of at least three ML values used for channel coding, block codes used for channel coding are not limited to k=4/ML=5 9-bit/4-cell codes.

That is, for example, block codes including 1-cell multilevel codes, 2-cell multilevel codes, or multilevel codes each with two cells or more generated by any k/ML code generation model such as k=5/ML=4 9-bit/5-cell codes can be adopted as block codes used for channel coding.

<Explanation of Computer to which Present Technology is Applied>

Next, the series of processing by some or all of the ECC processing section 11 to the RUB configuring section 14 and the signal processing section 17 to the ECC processing section 22 described above can be performed by hardware or can be performed by software. In a case where the series of processing is performed by software, a program included in the software is installed on a general-purpose computer or the like.

Figure 37:
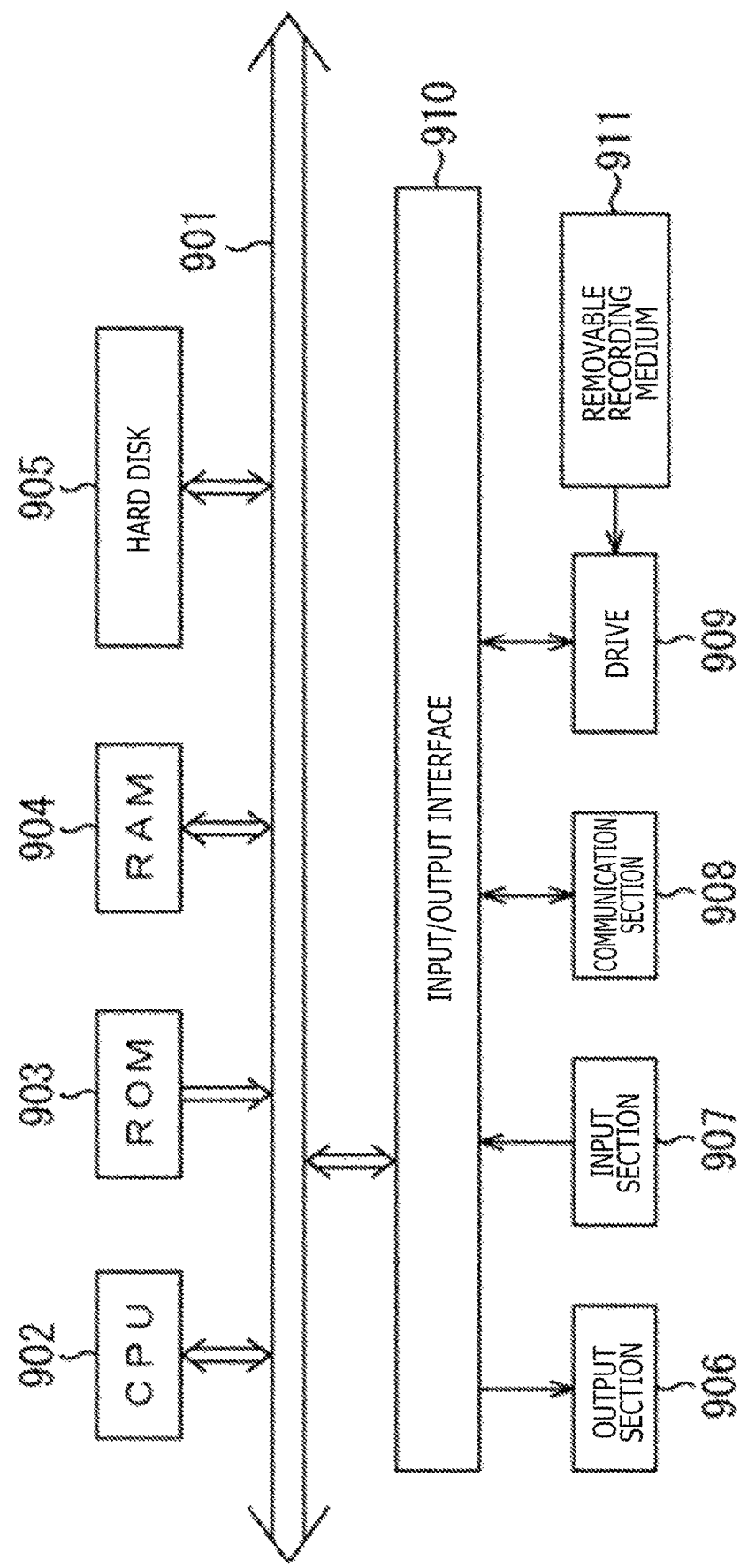
FIG. 37 is a block diagram depicting a configuration example of the embodiment of a computer.

FIG. 37 is a block diagram depicting a configuration example of one embodiment of a computer on which the program that executes the series of processing described above is installed.

The program can be recorded in advance on a hard disk 905 or a ROM 903 as a recording medium built in a computer.

Alternatively, the program can be stored (recorded) on a removable recording medium 911 driven by a drive 909. Such a removable recording medium 911 can be provided as what is generally called package software. Here, examples of the removable recording medium 911 include, for example, a flexible disc, a CD-ROM (Compact Disc Read Only Memory), an MO (Magneto Optical) disc, a DVD (Digital Versatile Disc), a magnetic disc, a semiconductor memory, and the like.

Note that, in addition to being installed on the computer from the removable recording medium 911 like the one described above, the program can be downloaded onto the computer via a communication network or a broadcast network and installed on the built-in hard disk 905. That is, for example, the program can be transferred wirelessly from a download site to the computer via an artificial satellite for digital satellite broadcasting, or transferred through cables to the computer via a network like a LAN (Local Area Network) or the Internet.

The computer has a built-in CPU (Central Processing Unit) 902, and the CPU 902 is connected with an input/output interface 910 via a bus 901.

Upon reception of input of a command according to operation of an input section 907 by a user, for example, via the input/output interface 910, the CPU 902 executes the program stored on the ROM (Read Only Memory) 903, according to the command. Alternatively, the CPU 902 executes the program stored on the hard disk 905, by loading it onto a RAM (Random Access Memory) 904.

In this manner, the CPU 902 performs processes according to flowcharts described above or processes performed by the configuration in block diagrams described above. Then, the CPU 902 causes results of the processes to be output, for example, via the input/output interface 910, from an output section 906, transmitted from a communication section 908, recorded on the hard disk 905, as necessary, for example.

Note that the input section 907 includes a keyboard, a mouse, a microphone, and the like. In addition, the output section 906 includes an LCD (Liquid Crystal Display), a speaker, and the like.

Here, in the present specification, processes performed by the computer according to the program need not necessarily be performed in a temporal sequence along the orders described as the flowcharts. That is, processes performed by the computer according to the program also include processes (e.g., parallel processes or processes by objects) executed in parallel or individually.

In addition, the program may be one that is processed by a single computer (processor), or may be one that is processed in a distributed manner by a plurality of computers. Further, the program may be one that is transferred to a remote computer and executed thereon.

Note that embodiments of the present technology are not limited to the embodiment described above, and can be changed in various manners within the scope not departing from the gist of the present technology.

In addition, advantages described in the present specification are illustrated merely as examples and are not the sole examples, and there may be other advantages.

Note that the present technology can adopt the following configuration.

<1>
A recording medium, in which
the recording medium has recorded thereon
a multilevel code of at least three ML values produced by coding user data into a (d,k)-RLL code of the ML values, and
a particular pattern of the ML values that includes a run of repeated codes which is greater than a maximum run k of the multilevel code.

<2>
The recording medium according to <1>, in which
the recording medium has recorded thereon the multilevel code produced by coding a binary ECC (Error Correction Coding) cluster including the user data and parity used for an ECC process.

<3>
The recording medium according to <1> or <2>, in which
the recording medium has recorded thereon the multilevel code having been subjected to DC (Direct Current) control to minimize an absolute value of a DSV (Digital Sum Value) which is a cumulative value of an NRZ (Non Return to Zero) code that expresses the multilevel code by the ML values which include 0 as a central value.

<4>
The recording medium according to <3>, in which
the DC control is performed by adding a DCC (Direct Current Control) cell of the ML values to a string of the multilevel codes.

<5>
The recording medium according to any one of <1> to <4>, in which
the recording medium includes a disc-shaped recording medium.

<6>
The recording medium according to <5>, in which patterns of the ML values whose magnitude of a cross-correlation value computed by using an NRZ (Non Return to Zero) code expressing the multilevel code by using the ML values which include 0 as a center value is equal to or lower than a threshold are recorded in adjacent tracks.

<7>
The recording medium according to <6>, in which patterns of the ML values whose cross-correlation value is 0 are recorded in adjacent tracks.

<8>
The recording medium according to any one of <1> to <7>, in which recording on the recording medium is performed in a
recording unit of an RUB (Recording Unit Block), the RUB includes
a Run-in which has a pattern representing a start of the RUB,
a plurality of frames including the multilevel code produced by coding a binary ECC (Error Correction Coding) cluster including the user data and parity used for an ECC process, and
a Run-out which has a pattern representing an end of the RUB, and
the particular pattern is the Run-in.

<9>
The recording medium according to <8>, in which
the RUB includes an FS (Frame Sync) which has a pattern representing a beginning of the frame, and
the particular pattern is the FS.

<10>
The recording medium according to <8> or <9>, in which
the RUB includes an APC (Automatic Power Control) SYNC which has a pattern for APC, and
the particular pattern is the APC SYNC.

<11>
A recording apparatus including:
a coding section that codes user data into a multilevel code which is a (d,k)-RLL code of at least three ML values; and
a recording section that records, on a recording medium, the multilevel code and a particular pattern of the ML values that includes a run of repeated codes which is greater than a maximum run k of the multilevel code.

<12>
The recording apparatus according to <11>, further including:
a DC (Direct Current) control section that performs DC control to minimize an absolute value of a DSV (Digital Sum Value) which is a cumulative value of an NRZ (Non Return to Zero) code that expresses the multilevel code by the ML values which include 0 as a central value.

<13>
The recording apparatus according to <12>, in which
the DC control section performs the DC control by adding a DCC (Direct Current Control) cell of the ML values to a string of the multilevel code.

<14>
A recording method including:
coding user data into a multilevel code which is a (d,k)-RLL code of at least three ML values; and
recording, on a recording medium, the multilevel code and a particular pattern of the ML values that includes a run of repeated codes which is greater than a maximum run k of the multilevel code.

<15>
A reproducing apparatus including:
a reproducing section that performs reproduction from a recording medium having recorded thereon a multilevel code of at least three ML values produced by coding user data into a (d,k)-RLL code of the ML values, and a particular pattern of the ML values that includes a run of repeated codes which is greater than a maximum run k of the multilevel code; and
a decoding section that decodes the multilevel code according to the particular pattern.

<16>
The reproducing apparatus according to <15>, further including:
a detecting section that detects the particular pattern from a string of the multilevel code reproduced from the recording medium, in which
the decoding section decodes the multilevel code produced by coding the user data according to the particular pattern.

<17>
The reproducing apparatus according to <16>, in which
the detecting section detects the particular pattern according to dissimilarity representing a degree of dissimilarity between the string of the multilevel code reproduced from the recording medium and the particular pattern.

<18>
The reproducing apparatus according to <17>, in which
the detecting section computes, as the dissimilarity, a value corresponding to a magnitude of a difference between NRZ (Non Return to Zero) codes of the string of the multilevel code reproduced from the recording medium and the particular pattern, the NRZ codes expressing the multilevel code by the ML values which include 0 as a central value.

<19>
The reproducing apparatus according to <18>, in which
the detecting section detects, as a position of the particular pattern, a position of the multilevel code where a minimum value of the dissimilarity is detected in a predetermined zone in a case where the minimum value of the dissimilarity is equal to or lower than a threshold.

<20>
A reproduction method including:
performing reproduction from a recording medium having recorded thereon a multilevel code of at least three ML values produced by coding user data into a (d,k)-RLL code of the ML values, and a particular pattern of the ML values that includes a run of repeated codes which is greater than a maximum run k of the multilevel code; and
decoding the multilevel code according to the particular pattern.

REFERENCE SIGNS LIST

11: ECC processing section
12: Channel coding section
13: Frame configuring section
14: RUB configuring section
15: Recording/reproducing system
16: Optical disc
17: Signal processing section
18: Sync detecting section
19: Frame detecting section
20: DCC deleting section
21: Channel decoding section
22: ECC processing section
23: Control section
23A: Register group
51: LUT storage section
52: Code generating section
31: ADC
32: PLL
33: Memory
34: Adaptive equalizing section
35: Restoring section
36: Convolution section
37: Error calculating section
41: HPF
42: AGC
901: Bus
902: CPU
903: ROM
904: RAM
905: Hard disk
906: Output section
907: Input section
908: Communication section
909: Drive
910: Input/output interface
911: Removable recording medium

The invention claimed is:

1. A recording medium, wherein
the recording medium has recorded thereon
a multilevel code of at least three ML values produced by coding user data into a (d,k)-RLL code of the ML values, and
a particular pattern of the ML values that includes a run of repeated codes which is greater than a maximum run k of the multilevel code, and
patterns of the ML values whose magnitude of a cross-correlation value computed by using an NRZ (Non Return to Zero) code expressing the multilevel code by using the ML values which include 0 as a center value is equal to or lower than a threshold are recorded in adjacent tracks.

2. The recording medium according to claim 1, wherein the recording medium has recorded thereon the multilevel code produced by coding a binary ECC (Error Correction Coding) cluster including the user data and parity used for an ECC process.

3. The recording medium according to claim 1, wherein the recording medium includes a disc-shaped recording medium.

4. The recording medium according to claim 1, wherein patterns of the ML values whose cross-correlation value is 0 are recorded in adjacent tracks.

5. The recording medium according to claim 1, wherein recording on the recording medium is performed in a recording unit of an RUB (Recording Unit Block), the RUB includes
- a Run-in which has a pattern representing a start of the RUB,
- a plurality of frames including the multilevel code produced by coding a binary ECC (Error Correction Coding) cluster including the user data and parity used for an ECC process, and
- a Run-out which has a pattern representing an end of the RUB, and the particular pattern is the Run-in.

6. The recording medium according to claim 5, wherein the RUB includes an FS (Frame Sync) which has a pattern representing a beginning of the frame, and
the particular pattern is the FS.

7. The recording medium according to claim 5, wherein the RUB includes an APC (Automatic Power Control) SYNC which has a pattern for APC, and
the particular pattern is the APC SYNC.

8. A recording apparatus comprising:
a coding section that codes user data into a multilevel code which is a (d,k)-RLL code of at least three ML values; and
a recording section that records a particular pattern of the ML values that includes a run of repeated codes which is greater than a maximum run k of the multilevel code, and records, in adjacent tracks, patterns of the ML values whose magnitude of a cross-correlation value computed by using an NRZ (Non Return to Zero) code expressing the multilevel code by using the ML values which include 0 as a center value is equal to or lower than a threshold.

9. A recording method comprising:
coding user data into a multilevel code which is a (d,k)-RLL code of at least three ML values; and
recording a particular pattern of the ML values that includes a run of repeated codes which is greater than a maximum run k of the multilevel code, and recording, in adjacent tracks, patterns of the ML values whose magnitude of a cross-correlation value computed by using an NRZ (Non Return to Zero) code expressing the multilevel code by using the ML values which include 0 as a center value is equal to or lower than a threshold.

10. A reproducing apparatus comprising:
a reproducing section that performs reproduction from a recording medium having recorded thereon a multilevel code of at least three ML values produced by coding user data into a (d,k)-RLL code of the ML values, and a particular pattern of the ML values that includes a run of repeated codes which is greater than a maximum run k of the multilevel code;
a detecting section that detects the particular pattern from a string of the multilevel code reproduced from the recording medium; and
a decoding section that decodes the multilevel code according to the particular pattern, wherein
the detecting section
detects the particular pattern according to dissimilarity representing a degree of dissimilarity between the string of the multilevel code reproduced from the recording medium and the particular pattern, and
computes, as the dissimilarity, a value corresponding to a magnitude of a difference between NRZ (Non Return to Zero) codes of the string of the multilevel code reproduced from the recording medium and the particular pattern, the NRZ codes expressing the multilevel code by the ML values which include 0 as a central value.

11. The reproducing apparatus according to claim 10, wherein
the decoding section decodes the multilevel code produced by coding the user data according to the particular pattern.

12. The reproducing apparatus according to claim 10, wherein
the detecting section detects, as a position of the particular pattern, a position of the multilevel code where a minimum value of the dissimilarity is detected in a predetermined zone in a case where the minimum value of the dissimilarity is equal to or lower than a threshold.

13. A reproduction method comprising:
performing reproduction from a recording medium having recorded thereon a multilevel code of at least three ML values produced by coding user data into a (d,k)-RLL code of the ML values, and a particular pattern of the ML values that includes a run of repeated codes which is greater than a maximum run k of the multilevel code;
detecting the particular pattern from a string of the multilevel code reproduced from the recording medium; and
decoding the multilevel code according to the particular pattern, wherein
the detecting
detects the particular pattern according to dissimilarity representing a degree of dissimilarity between the string of the multilevel code reproduced from the recording medium and the particular pattern, and
computes, as the dissimilarity, a value corresponding to a magnitude of a difference between NRZ (Non Return to Zero) codes of the string of the multilevel code reproduced from the recording medium and the particular pattern, the NRZ codes expressing the multilevel code by the ML values which include 0 as a central value.

* * * * *